(12) United States Patent
Maari

(10) Patent No.: US 7,636,691 B2
(45) Date of Patent: Dec. 22, 2009

(54) METHOD OF CONTROLLING DIGITAL CONTENT DISTRIBUTION, A METHOD OF REPRODUCING DIGITAL CONTENT, AND AN APPARATUS USING THE SAME

(75) Inventor: Koichi Maari, Kanagawa (JP)

(73) Assignee: Sony Corporation (JP)

( * ) Notice: Subject to any disclaimer, the term of this patent is extended or adjusted under 35 U.S.C. 154(b) by 650 days.

(21) Appl. No.: 10/690,911

(22) Filed: Oct. 22, 2003

(65) Prior Publication Data
US 2004/0073451 A1    Apr. 15, 2004

Related U.S. Application Data

(62) Division of application No. 09/046,693, filed on Mar. 24, 1998, now abandoned.

(30) Foreign Application Priority Data
Mar. 26, 1997    (JP)    ............... P09-074182

(51) Int. Cl.
*G06F 21/00*    (2006.01)
(52) U.S. Cl. ............... 705/51; 705/26; 705/59; 705/64; 705/67; 705/71; 713/161; 713/176; 713/182; 380/200; 380/201; 380/202; 380/203; 707/9; 707/10
(58) Field of Classification Search ............... 705/50, 705/51
See application file for complete search history.

(56) References Cited

U.S. PATENT DOCUMENTS 4,302,750 A * 11/1981 Wadhwani et al. ..... 340/870.02
4,796,297 A * 1/1989 Okamoto ..................... 380/232
5,384,847 A * 1/1995 Hendrickson et al. ....... 380/247

(Continued)

FOREIGN PATENT DOCUMENTS

EP    0 478 969 A2    4/1992

(Continued)

OTHER PUBLICATIONS

"Applied Cryptography" Bruce Schneier, p. 33, 1996.*

(Continued)

*Primary Examiner*—Andrew J. Fischer
*Assistant Examiner*—Mamon Obeid
(74) *Attorney, Agent, or Firm*—Lerner, David, Littenberg, Krumholz & Mentlik, LLP

(57) ABSTRACT

A digital content distribution control method, a digital content reproducing method, and a digital content reproducing apparatus. The digital content distributing side manipulates digital content by encrypting and compressing the same, transmits the manipulated digital content, an encrypted content key, and encrypted billing information to the other party of communication, and distributes to digital content proprietors the digital content usage fees collected based on digital content usage information received from the other party. On the other hand, the digital content reproducing side decrypts, in a single portable terminal, the manipulated digital content by the digital key and decompresses the decrypted digital content for reproduction. At the same time, the reproducing side decrements the billing information according to the use of the content and generates content usage information to be transmitted to the content distributing side. The digital content reproducing apparatus associated with the present invention is made portable to solve the above-mentioned problems.

10 Claims, 42 Drawing Sheets

U.S. PATENT DOCUMENTS

| | | | |
|---|---|---|---|
| 5,509,071 A * | 4/1996 | Petrie et al. | 705/53 |
| 5,629,980 A * | 5/1997 | Stefik et al. | 705/54 |
| 5,845,281 A | 12/1998 | Benson et al. | |
| 5,892,900 A * | 4/1999 | Ginter et al. | 726/26 |

FOREIGN PATENT DOCUMENTS

| | | |
|---|---|---|
| JP | 07-288519 | 10/1995 |
| JP | 08-008851 | 1/1996 |
| JP | 08-160855 | 6/1996 |
| JP | 08-314451 | 11/1996 |
| JP | 09-006608 | 1/1997 |
| JP | 09-073337 | 3/1997 |
| JP | 09-073487 | 3/1997 |
| WO | WO 96/41315 | 12/1996 |

OTHER PUBLICATIONS

Microsoft Press Computer Dicitionary 3rd Edition, 1997, p. 199.*
DigiBox: A Self-Protecting Container for Information Commerce, by Olin Sibert, David Bernstein, and David Van Wie and published in the Proceedings of the First USENIX Workshop on Electronic Commerce New York, New York, Jul. 1995.*
Denning, "To Tap or Not to Tap", Communications of the ACM v36n3, pp. 24-33, Mar. 1993, ISSN:0001-0782.

* cited by examiner

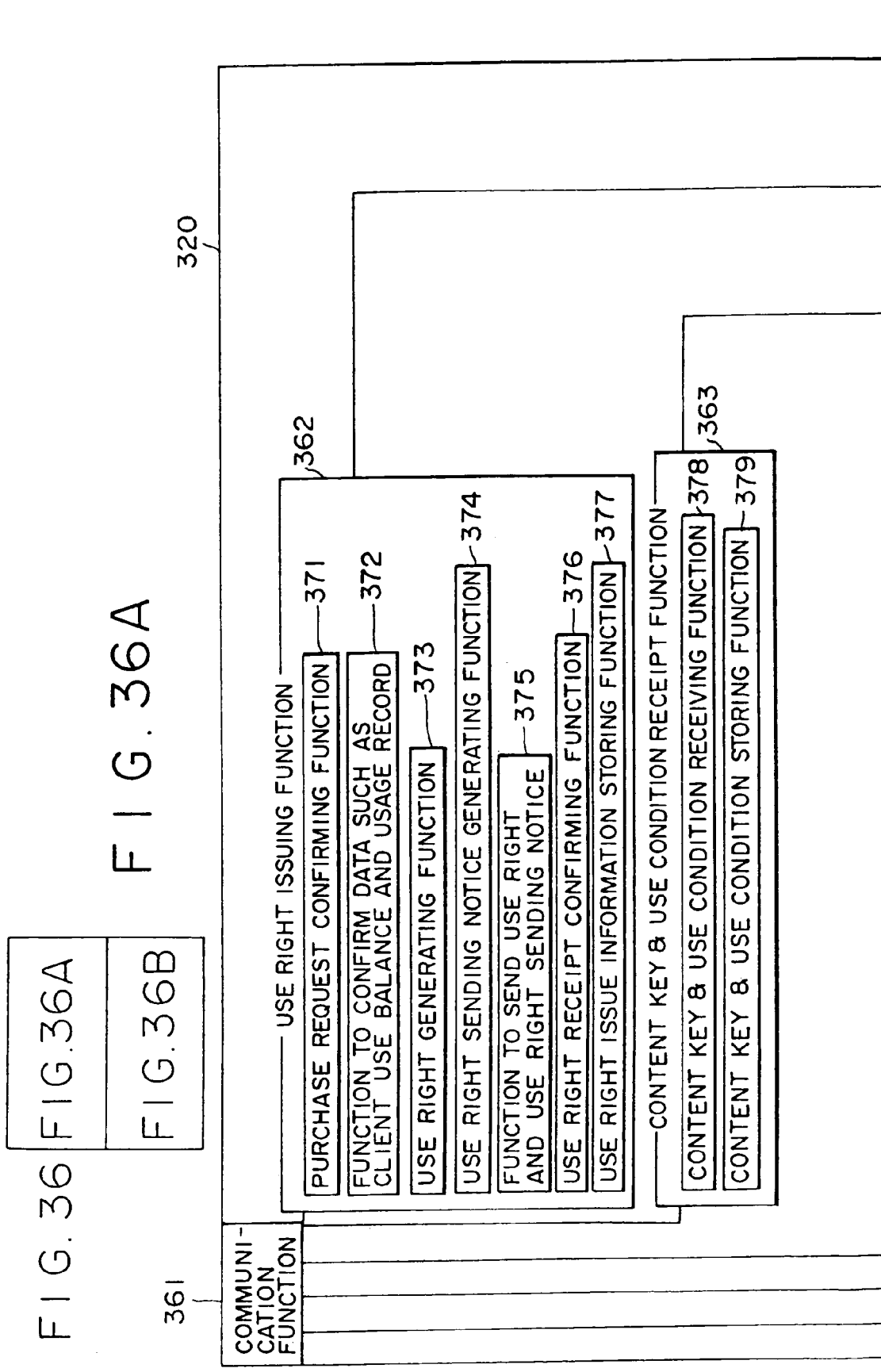

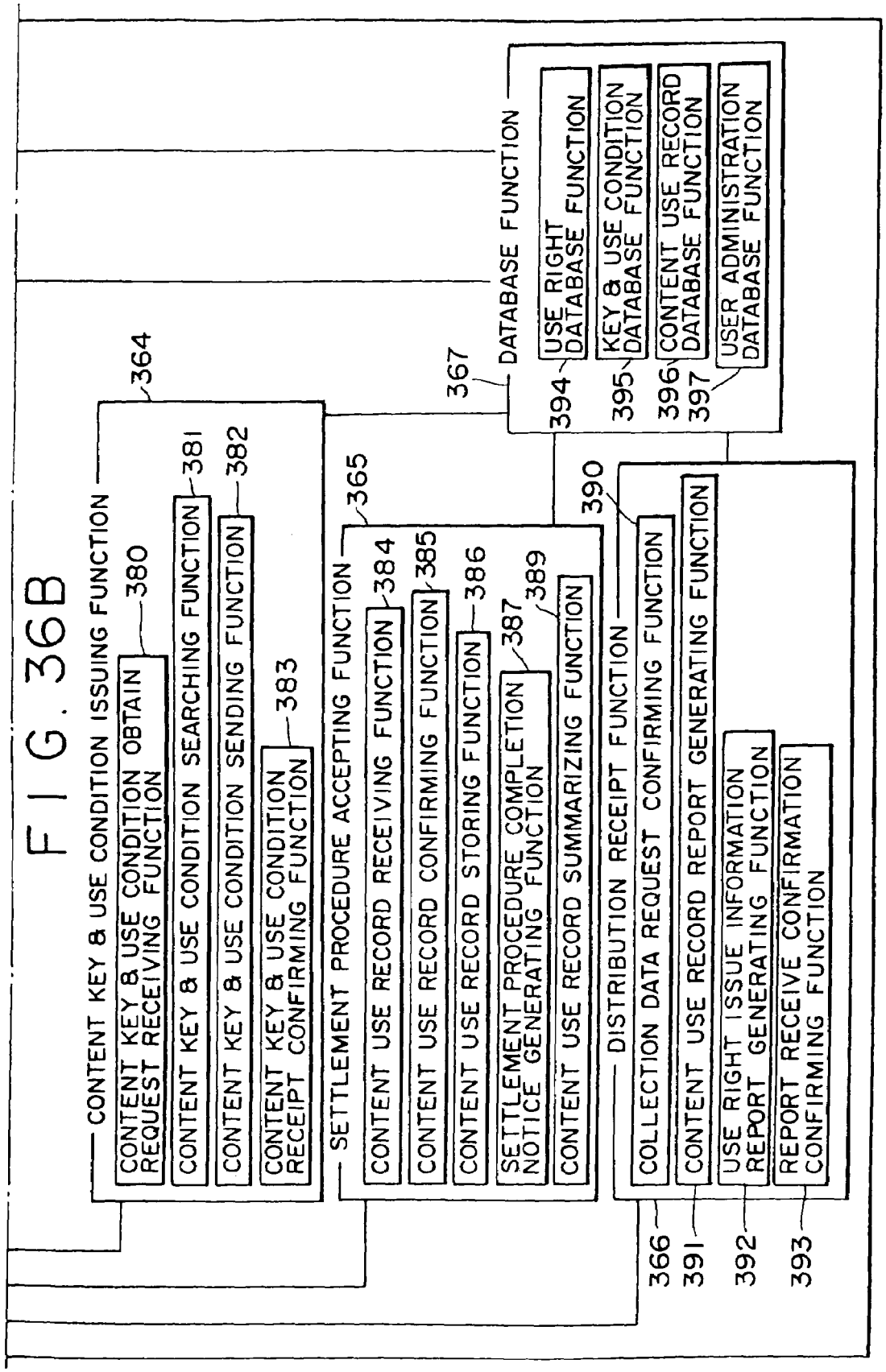

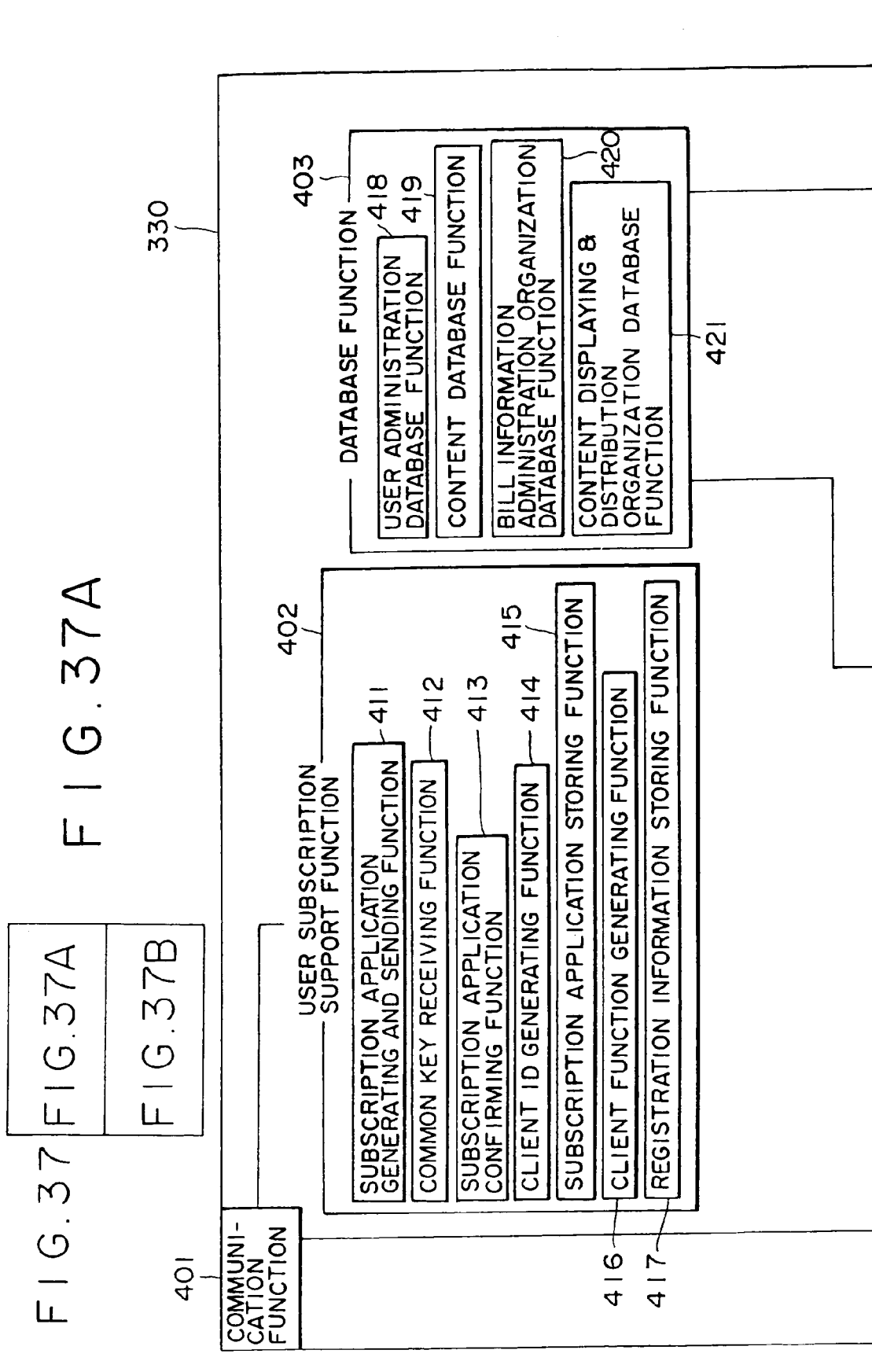

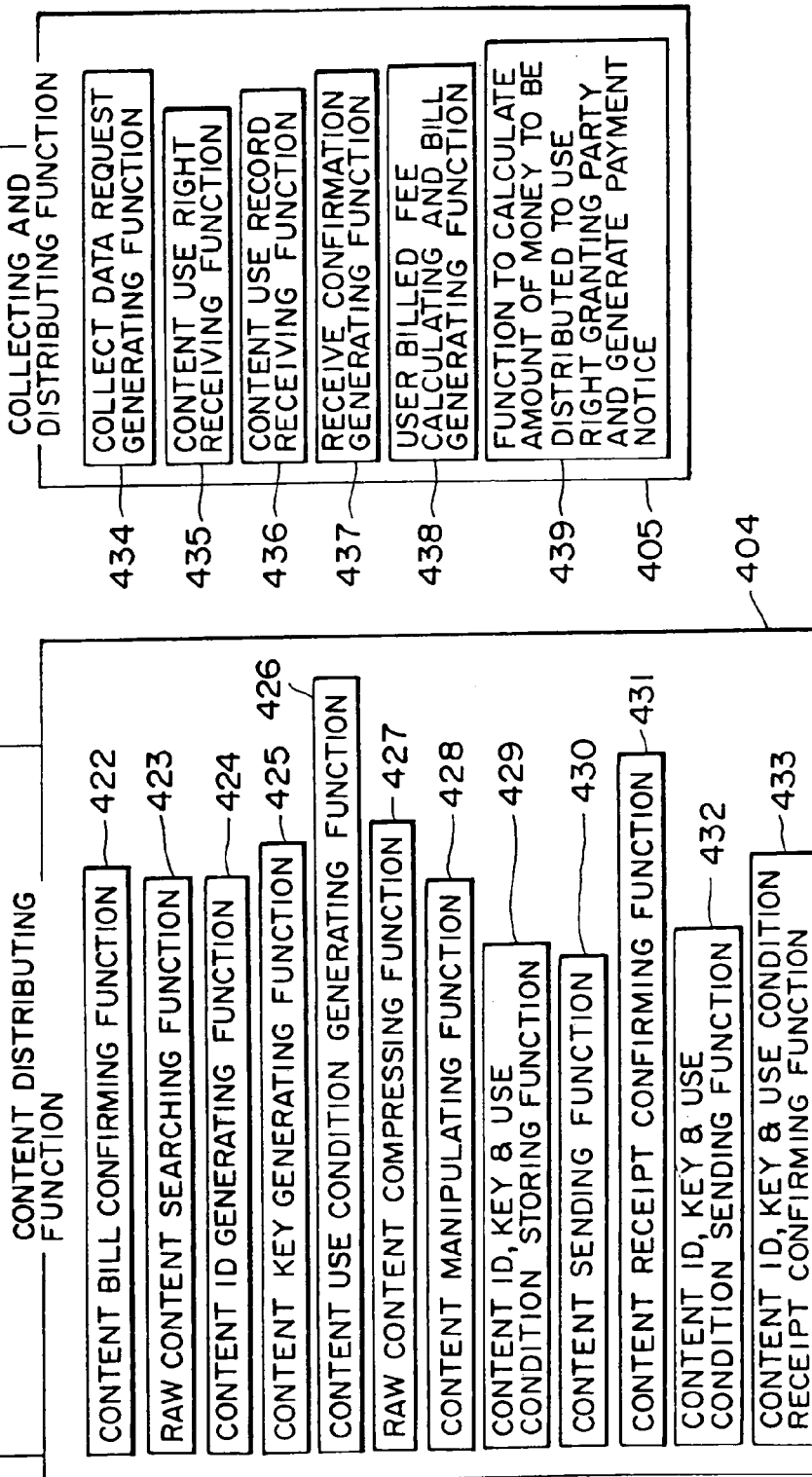

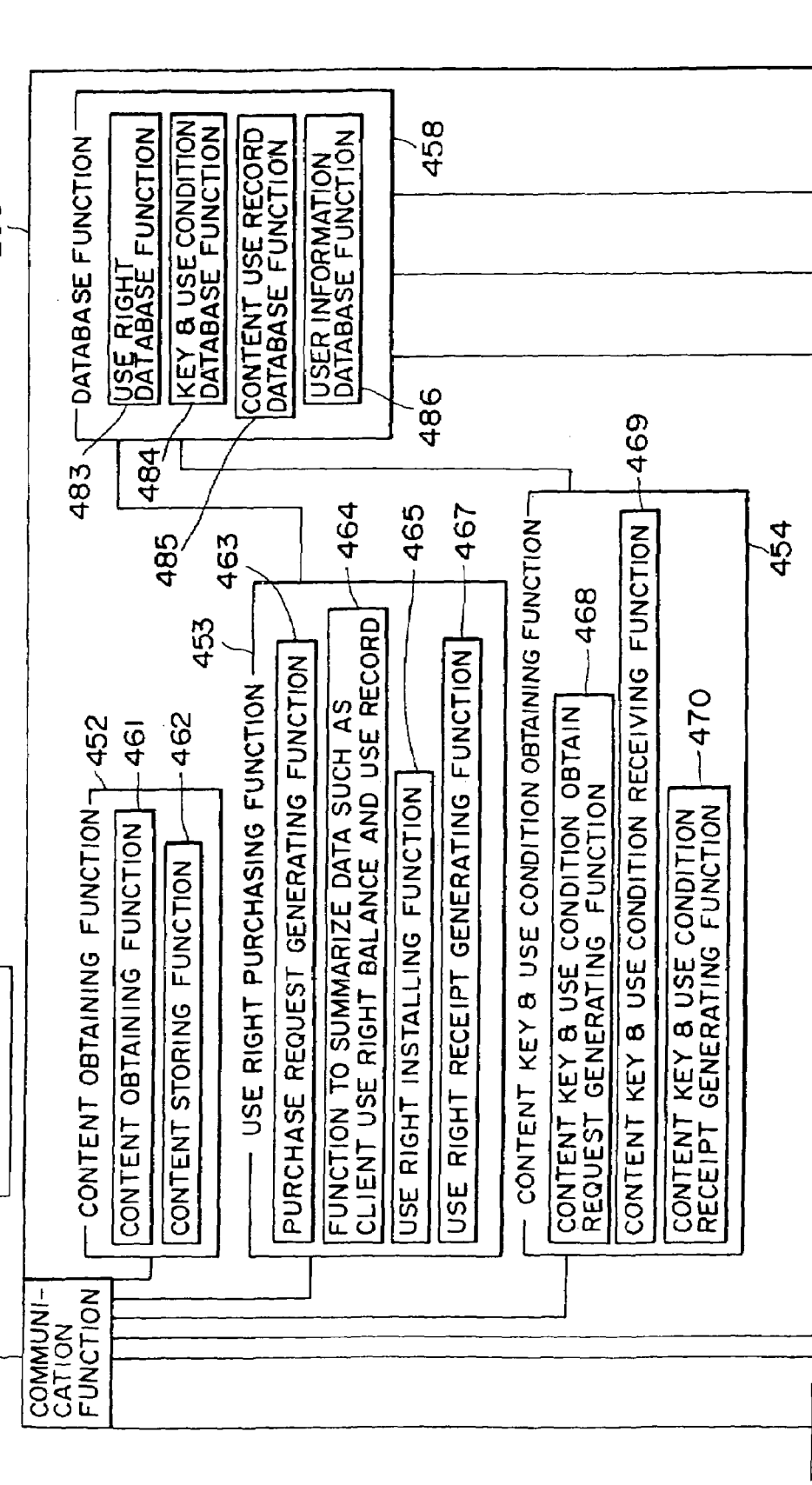

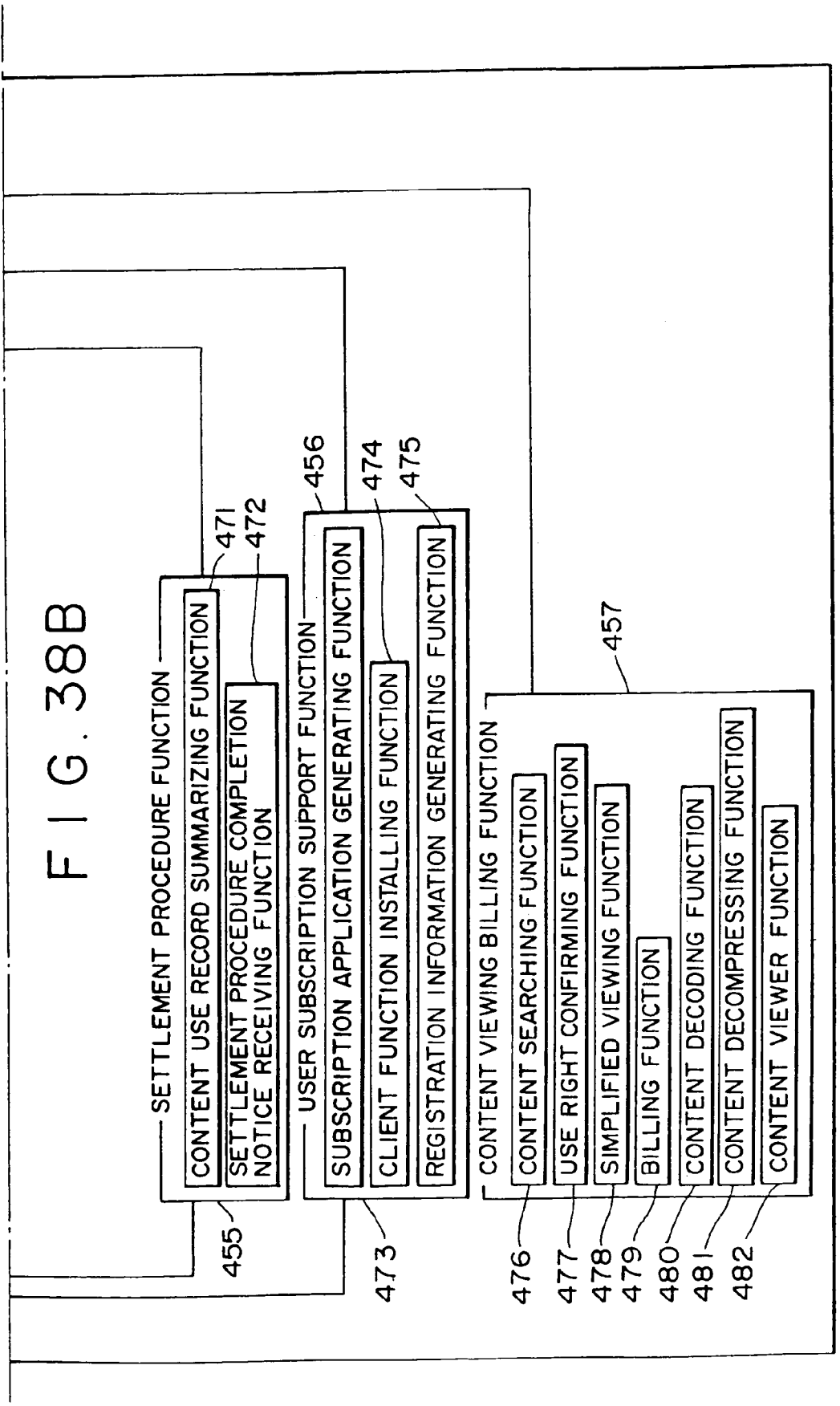

US 7,636,691 B2

METHOD OF CONTROLLING DIGITAL CONTENT DISTRIBUTION, A METHOD OF REPRODUCING DIGITAL CONTENT, AND AN APPARATUS USING THE SAME

CROSS-REFERENCE TO RELATED APPLICATIONS

This application is a divisional application of application Ser. No. 09/046,693 filed Mar. 24, 1998, now abandoned, which claims priority from Japanese Application No. P09-074182, filed on Mar. 26, 1997, the disclosures of which are hereby incorporated by reference herein.

BACKGROUND OF THE INVENTION

The present invention generally relates to a digital content distribution control method suitable for a system for distributing digital content such as audio data and video data for example and billing the digital content according to a usage quantity thereof, a digital content reproducing method, and an apparatus using the digital content reproducing method.

A software control method disclosed in U.S. Pat. No. 5,103,392 for example is known as an advantageous technique for simplifying the distribution of digital content such as computer programs, audio data, and video data, exploiting potential demands for digital content, and expanding the market of this field. The software control method disclosed in U.S. Pat. No. 5,103,392 is designed to indicate, in use of software such as computer programs and video data, which are intangible assets, a software usage status classified by software proprietor for example. This method is also adapted, in use of software such as computer programs and video data, which are intangible assets, to purchase programs for payment (the purchased programs can be used for free of charge) and set prices on the purchased programs. Data indicative of prices at which programs are purchasable is stored in a computer system. When purchasing programs for payment, they are registered in a table as the names of available software in this computer system. At the same time, the data indicative of purchasable prices is decremented by software prices. When deleting registered software from this table, the data indicative of purchasable prices is incrementally updated according to a situation. Further, in use of software such as computer programs and video data, which are intangible assets, in order to collect bills for usage of programs for payment according to an actual usage quantity (the number of times or the length of time in which a particular program for payment has been used, for example), the identifications of the programs used, user identifications, and program usage fees are recorded beforehand. By calling back this record, the program proprietor can grasp the usage fees of the programs owned by the program proprietor. Thus, the above-mentioned method is effective for use in collecting the bills for utilized programs according to the usage quantities thereof.

However, the above-mentioned system for distributing digital content through a network is considered to be operated only on personal computers. Therefore, there is no system that is portable with ease and provides the above-mentioned digital content anytime and anywhere.

The above-mentioned disclosed technique is advantageous in exploiting potential demands for digital content and expanding the market. However, this technique is insufficient in protecting digital content from illegal duplication or unauthorized use and provides no economical system.

SUMMARY OF THE INVENTION

It is therefore an object of the present invention to provide a digital content distribution control method, a digital content reproducing method, and an apparatus using this method that realize a easily portable system for making digital content available anytime and anywhere and providing sufficient protection of digital content against illegal duplication or unauthorized use by compressing digital content to be communicated and encrypting all information such as a content key, billing information, and content usage information, while maintaining economical advantages.

In carrying out the invention and according to one aspect thereof, the digital content distributing side manipulates digital contents by encrypting and compressing the same, transmits the manipulated digital content, an encrypted content key, and encrypted billing information to the other party of communication, and distributes to digital content proprietors the digital content usage fees collected based on digital content usage information received from the other party. On the other hand, the digital content reproducing side decrypts, in a single portable terminal, the manipulated digital content by the content key and decompresses the decrypted digital content for reproduction. At the same time, the reproducing side decrements the billing information according to the use of the content and generates content usage information to be transmitted to the content distributing side. The digital content reproducing apparatus associated with the present invention is made portable to solve the above-mentioned problems.

BRIEF DESCRIPTION OF THE DRAWINGS

These and other objects of the invention will be seen by reference to the description, taken in connection with the accompanying drawing, in which:

FIG. 36 is a block diagram illustrating a constitution of a billing information control organization in the embodiment in which the system capability is divided;

FIG. 37 is a block diagram illustrating a constitution of a system control organization in the embodiment in which the system capability is divided;

FIG. 38 is a block diagram illustrating a constitution of the user side in the embodiment in which the system capability is divided;

DETAILED DESCRIPTION OF PREFERRED EMBODIMENTS

This invention will be described in further detail by way of example with reference to the accompanying drawings.

It should be noted that the term " . . . function block" in the specification may be often expressed as a term " . . . function", or the term " . . . circuit" may be often expressed by the content of the function in the later figures.

Before describing specific contents and constitutions of a digital content distributing method, a digital content reproducing method, and a digital content reproducing apparatus according to the invention, an outline constitution of an entire system to which the present invention is applied and an operating method of this system for easier understanding of the above-mentioned distributing method, reproducing method and reproducing apparatus with reference to FIGS. 1 through 7.

Figure 1:
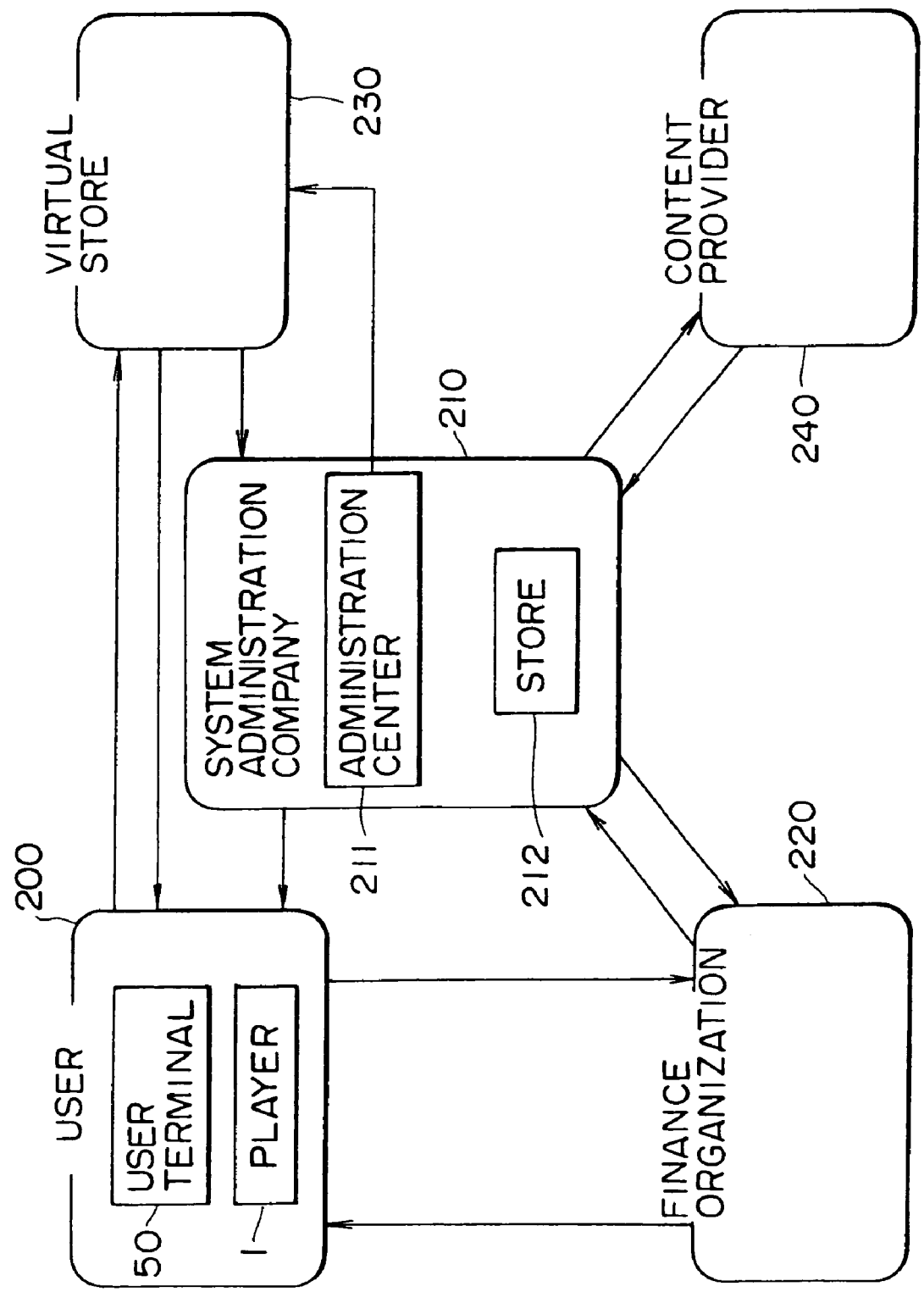
FIG. 1 is a schematic block diagram illustrating an entire constitution of a digital content distributing system practiced as one preferred embodiment of the invention.

Now, referring to FIG. 1, there is shown a schematic constitution of the entire system.

In FIG. 1, it is assumed that a user 200 has a digital content reproducing apparatus (hereafter referred to as a player 1) associated with the present invention and a so-called personal computer (hereafter referred to as a user terminal 50).

The user terminal 50 is an ordinary personal computer that stores various software programs as application software, to be described later, for use in the present invention and connects to a display device providing a display means, a speaker serving as a sounding means, and keyboard and a mouse serving as information inputting means. The user terminal 50 can be connected to a system administration company 210 through a network for example and transfer data through an interface means arranged between the user terminal and the player 1.

Figure 2:
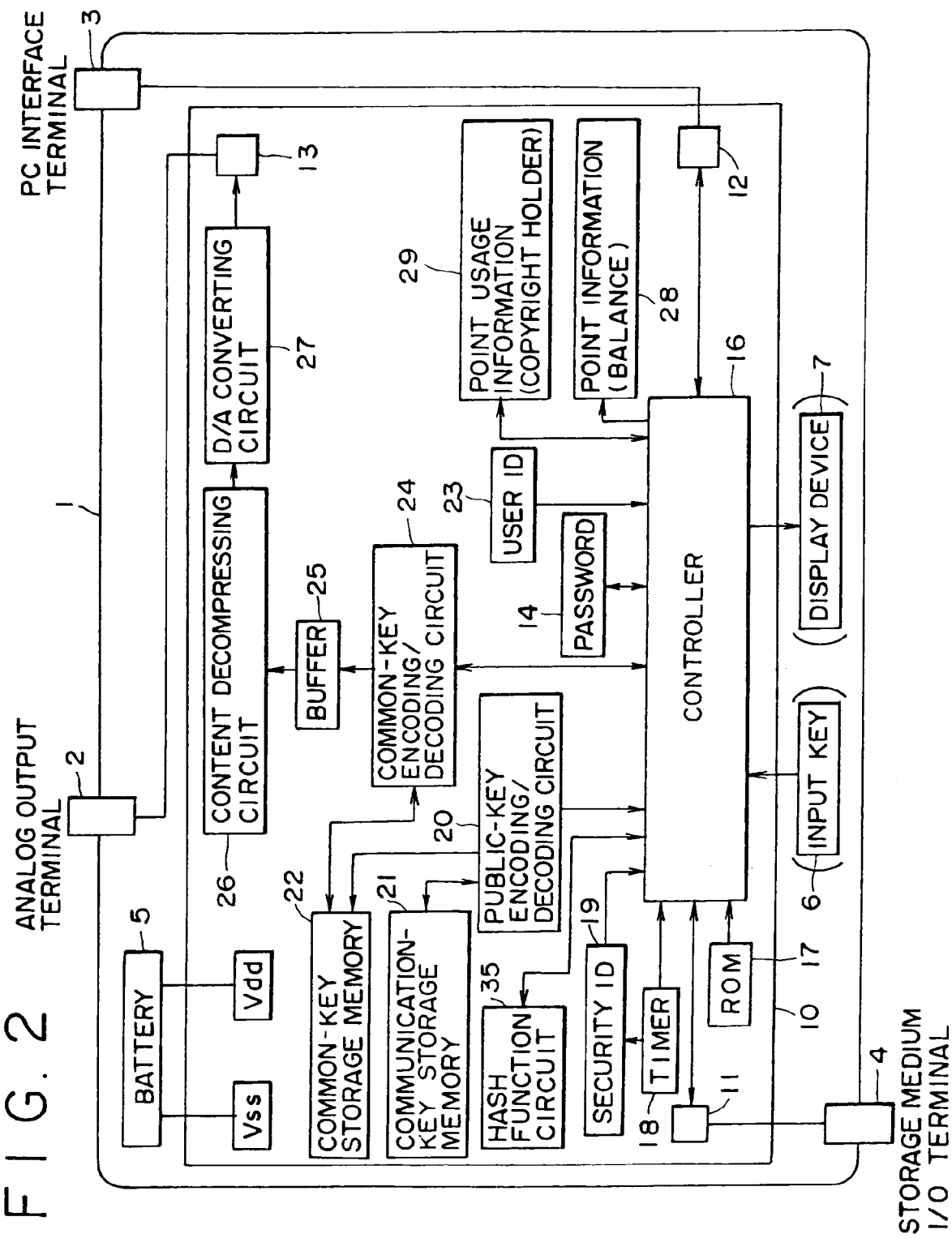
FIG. 2 is a block diagram illustrating a specific constitution of a player for the above-mentioned embodied system.

The player 1 has a constitution as shown in FIG. 2 for example.

Details of the constitution shown in FIG. 2 will be described later. The player 1, as a main component of the processing route through which digital content flows, at least has a common-key encoding/decoding circuit 24 for decrypting encrypted digital content by use of a content key, a decompressing circuit 26 serving as a decompressing means for decompressing compressed digital content, and a D/A converting circuit 27 for converting digital data into an analog signal. It should be noted that hereafter the term "encoding" denotes encrypting and the term "decoding" denotes decrypting.

This player 1, as a main component for handling proprietary information and usage status of digital content to be used (these pieces of information is hereafter referred to as point usage information) and holding money amount data necessary for using digital content, namely billing data to be decremented every time the digital content is used (hereafter referred to as point information), has at least a point usage information storage memory 29 for storing the point usage information and a point information storage memory 28 for storing the point information.

Further, the player 1 has a common key storage memory 22 and a communication key storage memory 21 as a constitution for storing various keys to be used for encoding and decoding to be described later and a common-key encoding/decoding circuit 24 and a public-key encoding/decoding circuit 20 as a constitution for performing encoding and decoding by use of the keys stored in these memories. Still further, the player 1 has, as a constitution associated with the above-mentioned encoding and decoding, a security ID generating circuit 19 for generating random numbers to generate a security ID in operative association with a host computer of a system administration company 210, a timer 18, and a hash function circuit 25 for generating a so-called hash value to be described later.

In addition, the player 1 has a controller 16 serving as a control means for controlling, based on a program stored in a ROM 17, the digital content, various data, and components, and a battery 5 that provides operating power to the system when the same is used in portable state.

It is desired, in terms of security, that the components of the player 1 shown in FIG. 2 be mounted on a single chip of IC (Integrated Circuit) or LSI (Large Scale Integration). The components shown in FIG. 2 are all mounted on an integrated circuit 10. The player 1 has three terminals (an analog output terminal 2, a PC interface terminal 3, and a recording medium I/O terminal 4) as interface with the outside. These terminals are connected to terminals 13, 12, and 11 of the integrated circuit 10 respectively. It should be noted that these terminals are not restricted to this terminal constitution; namely, these terminals may be integrated into one or added with another terminal.

The system administration company 210 is composed of a administration center 211 and a store 212 for selling the player 1, transfers information associated with the supply of digital content to be described later with the user terminal 50 of the user 200 through a virtual store 230, compresses content owned by a content provider 240, manipulates digital content to be encoded, supplies the encoded digital content, and transfers information with a finance organization 220. It should be noted that confirmation of the account number, credit number, name, address, and so on of the user 200 and transfer of information about whether account can be opened with the user or not are performed between the system administration company 210 and the finance organization 220. Between the finance organization 220 and the user 200, actual paying of fees and like processing are performed. It should be noted that the store 212 is not necessarily included in the system administration company 210; namely, the store may be an outside agent.

Figure 3:
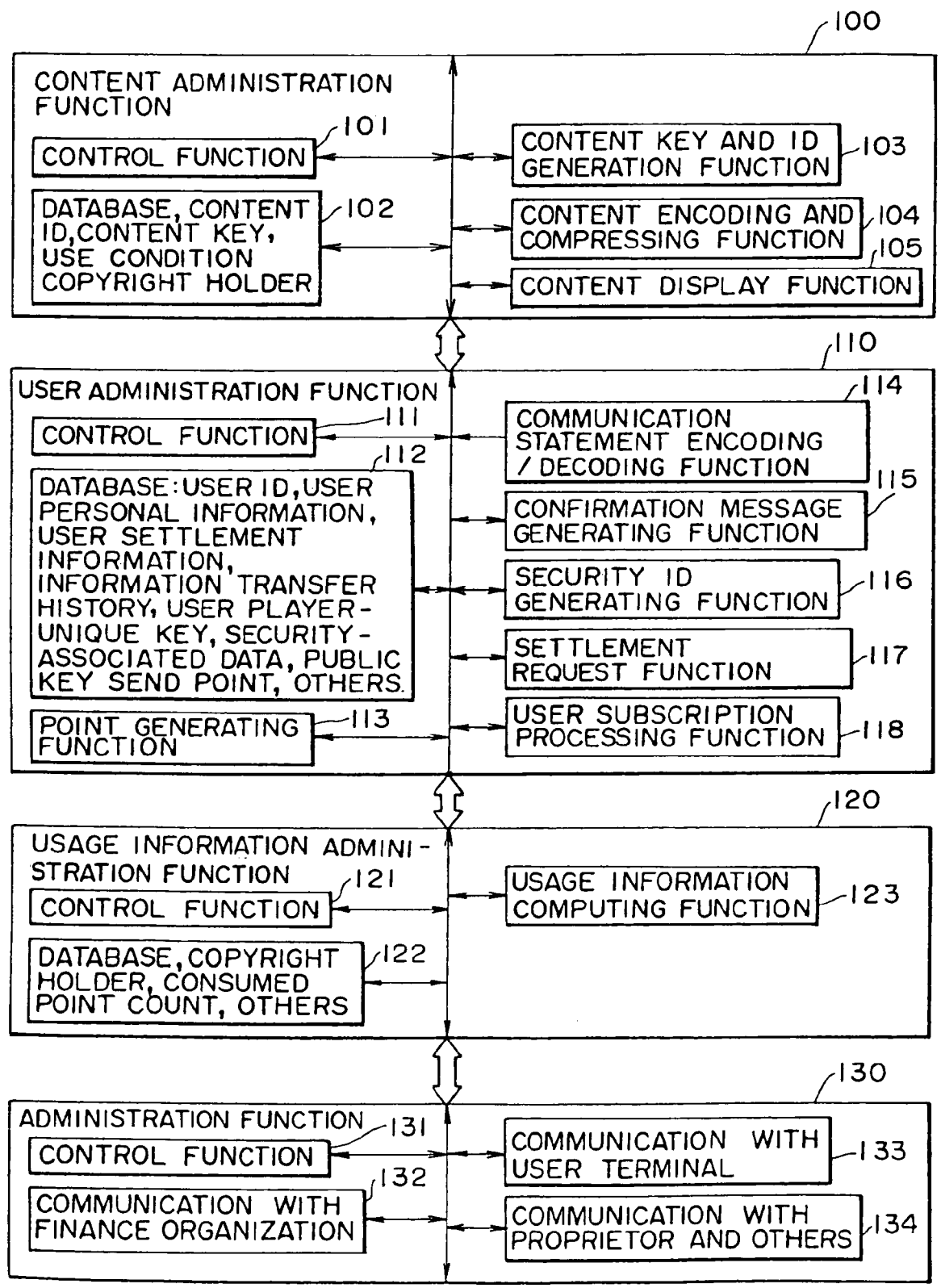
FIG. 3 is a block diagram illustrating a specific constitution of a administration center for the above-mentioned embodied system.

The administration center 211 of the system administration company 210 has a constitution as shown in FIG. 3 for example. Details of this constitution will be described later. The administration center 211 at least has, as main components, a content administration function block 100 for controlling digital content, displaying the digital content, performing manipulation processing such as encoding and compressing the digital content, and generating a content key and ID which are key information for use in the encoding and decoding, a user administration function block 110 having capabilities of controlling user information, encoding and decoding a communication statement (including a message, point information, and so on), generating a confirmation message and a security ID, transferring settlement application with the finance organization 220, and generating points, including a user subscription processing function block 118 for processing user subscription and the like, and a usage information administration function block 120 for controlling point usage information and the like, and an administration function block 130 for controlling the entire system and having a communication capability.

The following describes an example of the method of actually operating the system constituted as shown in FIG. 1 with reference to FIGS. 4 through 7. It should be noted that the operation method described below provides a procedure to be actually followed by the user 200, the system administration company 210, the finance organization 220, the content provider 240, and so on.

The description of the method of operating the system will be made in the order of a procedure of purchasing the player 1, a procedure of operations from searching for digital content to installing the same into a storage medium of the player 1, a procedure of purchasing billing point information for making the digital content available and, if the digital content has been used, settling the fee for the usage, and a procedure of distributing fees collected from the user for the viewed digital content.

Figure 4:
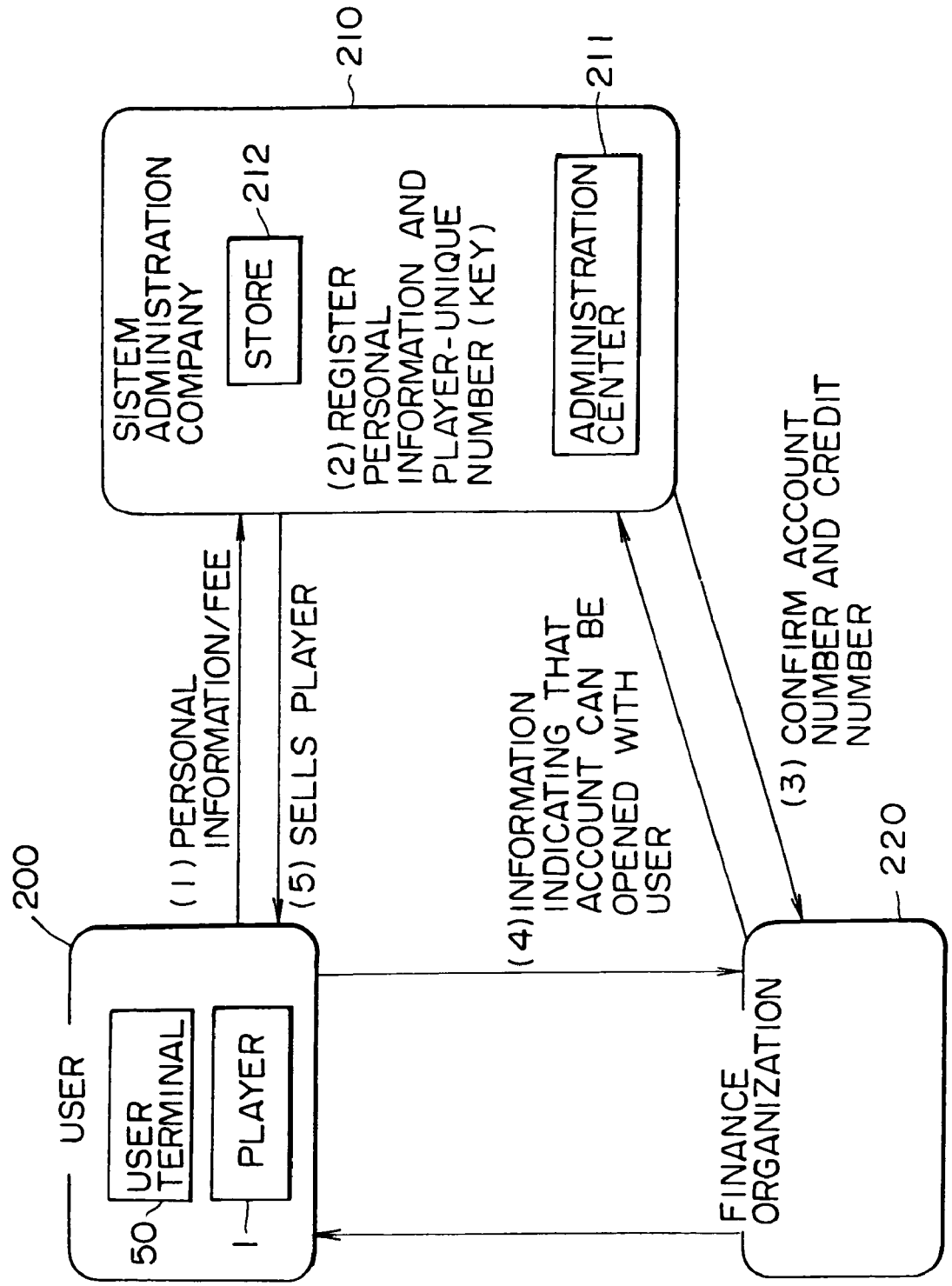
FIG. 4 is a schematic diagram for describing a procedure in which the player is purchased in the above-mentioned embodied system.

In the procedure of purchasing the player 1, the user 200 purchases the player 1 from the store 212 by actually going to the store or by mail order as shown in (1) and (5) of FIG. 4.

As shown in (2) of FIG. 4, the store 212 registers into the administration center 211 of the system administration company 210 personal information (name, address, and so on) and settlement information (bank account number, credit number, and so on) obtained from the user 200 and the player-unique number of the player 1 (including the player-unique key and the like) at the purchase of the player 1.

As shown in (3) of FIG. 4, the administration center 211 checks the finance organization 220 for the validity of the account number, credit number, and so on obtained from the user 200. Then, as shown in (4) of FIG. 4, the administration center obtains information for assuring that an account can be opened with that user.

Figure 5:
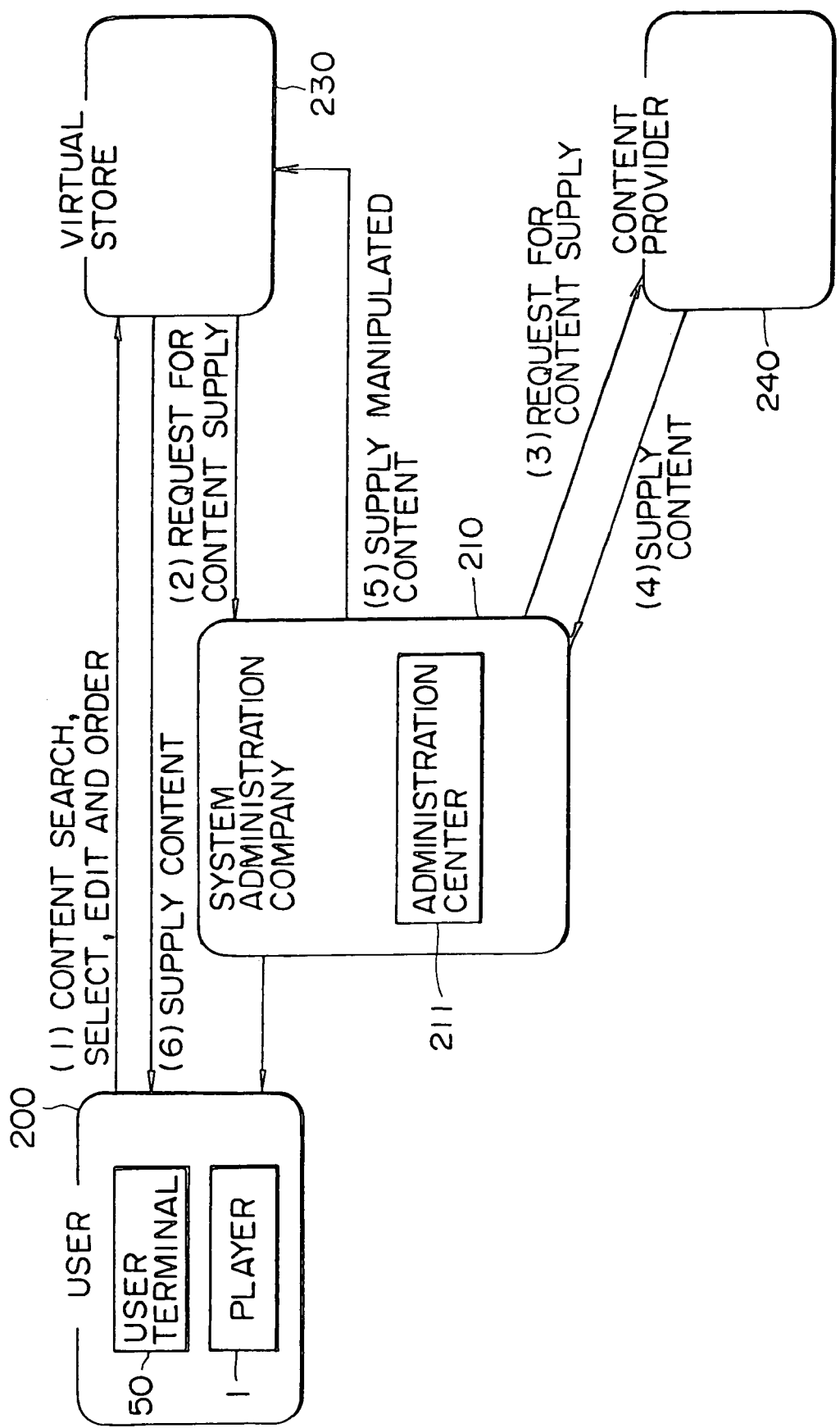
FIG. 5 is a schematic diagram for describing a procedure for processing to be performed from digital content search to installation of digital content on a storage medium for the player in the above-mentioned embodied system.

In the procedure of operations from searching for digital content to installing the obtained digital content into the recording medium of the player 1, the user 200 who purchased the player 1 performs search, selection, editing, and order of a desired digital content by use of the user terminal 50 having the interface means for interfacing the player 1 as shown in (1) of FIG. 5. The processing operations from search to order are performed on the virtual store 230 connected through a network for example by use of search software stored in the user terminal 50 as application software.

The virtual store 230 denotes a store virtually installed on network by the administration center 211 for example. The virtual store 230 exhibits information indicative of a plurality of contents for example. Based on this information provided by the virtual store 230, the user 200 orders a desired content. The information indicative of the contents exhibited in the virtual store 230 includes, if the content is video data of a movie for example, the title, advertisement, or one scene of the movie for example. If the content is audio data, the information includes the title, the name of the artist, or first several phrases (so-called intro) of music for example. Therefore, when the user terminal 50 of the user 200 accesses the virtual store 230, the plurality of contents of the virtual store 230 are virtually displayed on the user terminal 50. The user 200 selects a desired one from the exhibited contents to place an order.

When a digital content is ordered from the user terminal 50 of the user 200, the virtual store 230 requests the administration center 211 for supplying the ordered content as shown in (2) of FIG. 5.

Receiving the request for supplying the digital content, the administration center 211 requests the content provider 240 for distributing the requested content. The content provider 240 distributes the requested content to the administration center 211 as shown in (4) of FIG. 5.

The administration center 211 encodes and compresses the distributed content according to a predetermined compressing scheme and attaches, to this encoded and compressed content, the ID of this content (the content ID), proprietor information such as copyright holder, the amount of fee to be billed when this content is used, and the name of the virtual store that supplies this content to the user 200. It should be noted that the fee to be billed on the content is determined by the content provider 240 beforehand.

The content manipulated at the administration center 211 is transmitted to the virtual store 230 as shown in (5) of FIG. 5 and further supplied from the virtual store 230 to the user terminal 50 of the user 200 as shown in (6) of FIG. 5. The desired content is supplied from the user terminal 50 to the player 1 to be stored therein.

The operations shown in (2) through (5) of FIG. 5 may also be performed beforehand. Namely, the virtual store 230 may not only exhibit the information on the plurality of contents but also prepare the manipulated digital content corresponding to this display.

In the procedure of purchasing billing point information for making available the digital content installed in the player 1 and the procedure of settling the fee if this digital content is used, the user terminal 50 confirms the shortage of the point information stored in the player 1 and requests for replenishment of the point information.

Figure 6:
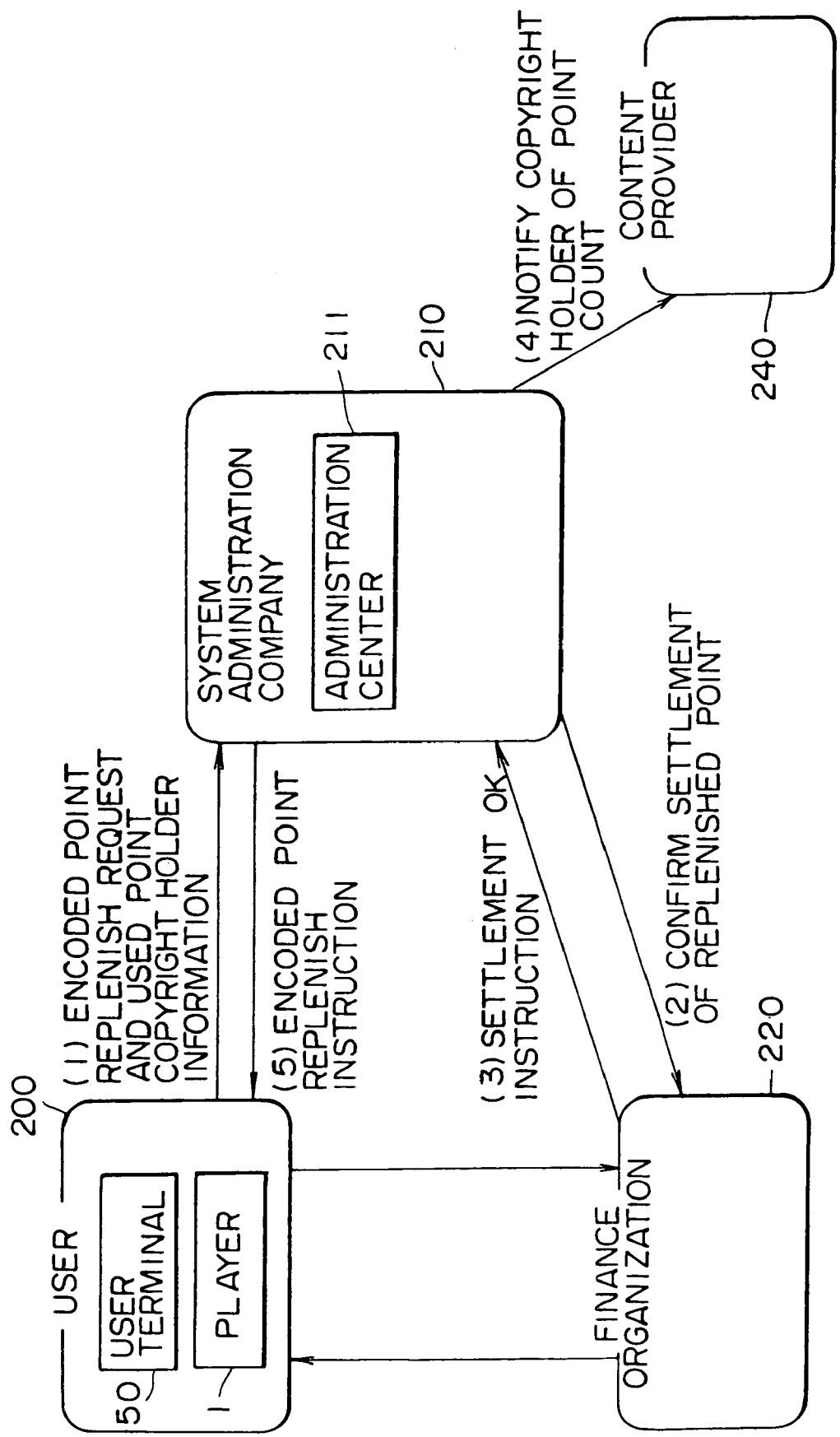
FIG. 6 is a schematic diagram for describing a procedure of purchasing point information for charging and of settlement to be made when digital content concerned has been used in the above-mentioned embodied system.

At this moment, as shown in (1) of FIG. 6, a request for replenishing the point information encoded by the player 1 is transferred from the user terminal 50 to the administration center 211. At the same time, the proprietary information about the proprietor such as the copyright holder and so on of the already used digital content, namely the point usage information, is read from the player 1 to be encoded. The encoded point usage information is then sent to the administration center 211 through the user terminal 50. Thus, the point usage information is transferred concurrently with the point information replenishing request, thereby saving the user 200 from accessing the administration center 211 only to transmit the point usage information to the administration center 211. It should be noted that the point usage information need not be transferred concurrently with purchasing of the point information; namely, the point usage information may be transferred independently.

Receiving the encoded point information replenishing request and point usage information, the administration center 211 decodes the cryptograph to recognize the replenishing quantity requested by the user 200 and the contents of the point usage information. Further, the administration center 211 checks the finance organization 220 to see if the point replenishment can be settled or not as shown in (2) of FIG. 6. The finance organization 220 checks the account of the user 200. If the user 200 is found settleable, a settlement OK instruction is sent from the finance organization 220 to the administration center 211 as shown in (3) of FIG. 6.

At the same time, the administration center 211 notifies the content provider 240 of a point usage count, namely an amount of money, to be paid to the proprietor such as the copyright holder as shown in (4) of FIG. 6.

Then, the administration center 211 encodes the point replenishment information instruction and sends the encoded instruction to the user terminal 50 along with the security ID as the point replenishment instruction information as shown in (5) of FIG. 6. The point replenishment instruction information sent from the user terminal 50 to the player 1 is decoded therein. After the security ID is checked, the point information to be stored in the point information storage memory 28 is replenished and the notified proprietary information such as the copyright information is deleted from the point usage information storage memory 29.

Figure 7:
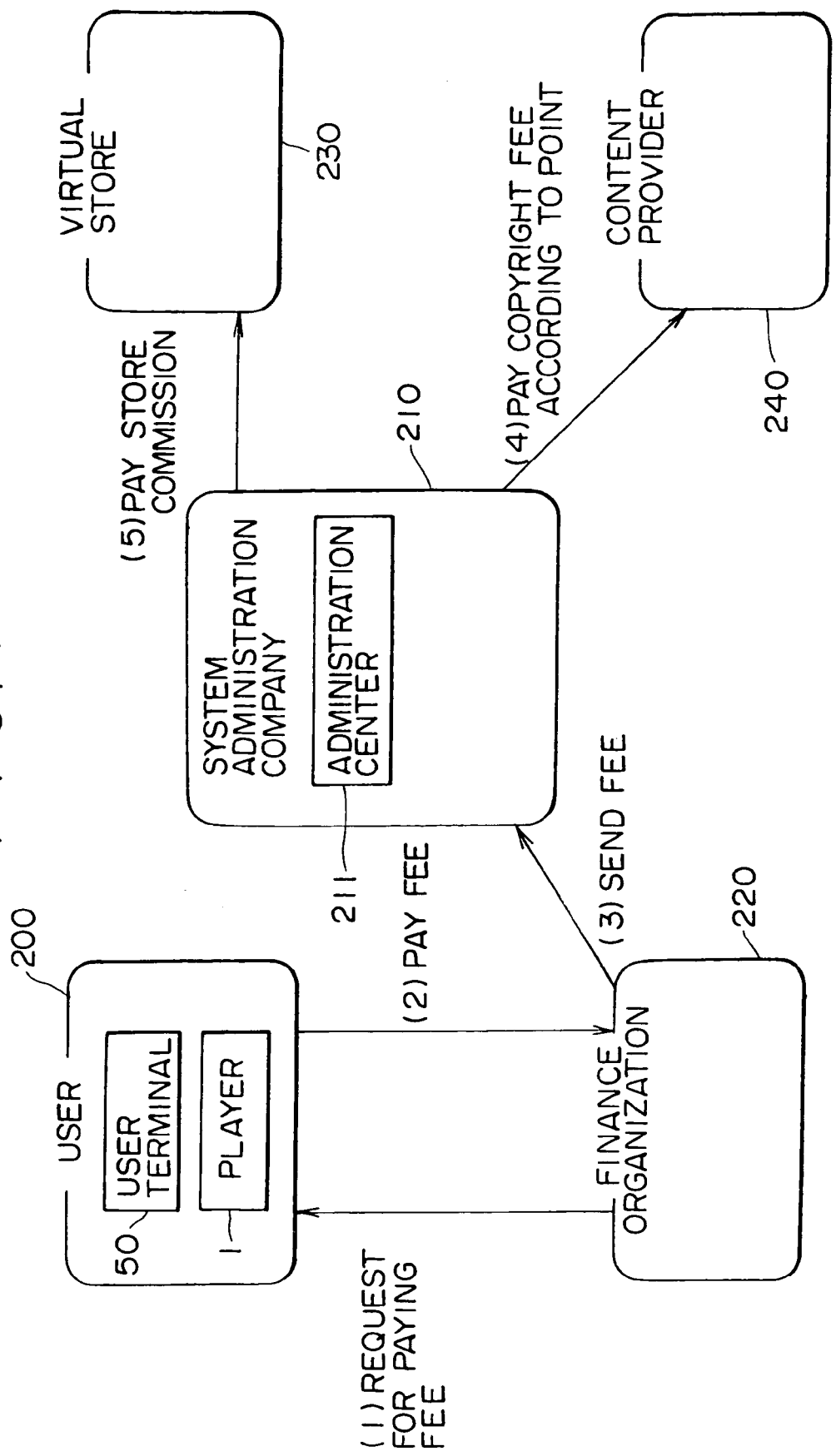
FIG. 7 is a schematic diagram for describing a procedure of distributing charged fees in the above-mentioned embodied system.

In the procedure of distributing the fee billed for viewing digital content, namely fee to be drawn from the user account according to the point usage information, the finance organization 220 requests the user 200 for sending the fee as shown in (1) of FIG. 7. At this moment, if there is an enough balance on the account of the user 200, the finance organization does not specially ask the user to send the fee. On the other hand, if there is not enough balance, the user 200 sends the fee to the finance organization 220 as shown in (2) of FIG. 7.

The finance organization 220 subtracts a predetermined commission from the fee received from the user 200 and sends the resultant amount of money to the administration center 211 as shown in (3) of FIG. 7. Namely, the administration center 211 collects the content manipulation fee, finance commission, and system administration fee from the amount of money received from the finance organization 220. Also, the administration center 211 pays the copyright fee according to the point used to the content provider 240 as shown in (4) of FIG. 7 and a store commission to the virtual store 230 as shown in (5) of FIG. 7. Receiving the copyright fee, the content provider 240 pays the copyright fee to each copyright holder. Receiving the store commission, the virtual store 230 pays a commission fee to each of other virtual stores.

As described, the fee paid by the user 200 is divided into the copyright fee, the store commission, the content manipulation commission, the settlement commission, and the system administration commission based on the point usage information. The copyright fee is paid to the content provider 240. The store commission is paid to the virtual store 230. The content manipulation commission is paid to the system administration company 210. The settlement commission is paid to the system administration company and the finance organization 220. The system administration commission is paid to the system administration company 210.

It should be noted here that, in transferring data between the system of the preferred embodiment of the present invention, namely between the administration center 211 and the player 1, the data to be transferred is encoded and decoded to ensure the security of data communication. The preferred embodiment of the present invention is compatible with either common-key encryption or public-key encryption.

For the encryption for transmitting the above-mentioned digital content, point usage information, point information, a message, security ID, and other information, common-key encryption is used in consideration of higher processing speed. Different common keys are required for encoding and decoding these various pieces of information. In the player 1 shown in FIG. 2, the common keys to be used for decoding encoded information received from the administration center 211 are stored in the common-key storage memory 22. By use of the stored common keys, the common-key encoding/decoding circuit 24 decodes the encoded information received from the administration center 211.

On the other hand, for encryption for transmitting the above-mentioned common keys to be used for encoding and decoding the above-mentioned various pieces of information, the encryption to be used depends on which type of encryption a player-unique key of the player 1 corresponds to. Namely, if the player-unique key corresponds to common-key encryption, the above-mentioned common keys are encoded by use of the player-unique key and the encoded common keys are decoded by use of the player-unique key. If the player-unique key corresponds to public-key encryption, the common keys are encoded by the public key of the other party and the encoded common keys are decoded by the secret key of the decoding party.

For example, in transmission of any of the above-mentioned common keys (for example, a session key to be described later) from the player 1 to the administration center 211, if the player-unique key corresponds to common-key encryption, the common-key encoding/decoding circuit 24 in the player 1 encodes the common key by use of the player-unique key stored in the communication key storage memory 21. The administration center 211 decodes the encoded common key by use of the player-unique key stored in the administration center 211. Likewise, in transmission of the common key from the player 1 to the administration center 211, if the player-unique key corresponds to public-key encryption for example, the public-key encoding/decoding circuit 20 encodes the common key by use of the public key of the administration center 211 stored in the communication key storage memory 21 in the player 1. The administration center 211 decodes the encoded common key by use of the secret key stored in the administration center 211.

Conversely, in transmission of the common key (for example, a content key) from the administration center 211 to the player 1, if the player-unique key corresponds to common-key encryption, the administration center 211 encodes the common key by use of the player-unique key stored in the administration center 211. In the player 1, the common-key encoding/decoding circuit 24 decodes the encoded common key by use of the player-unique key stored in the communication key storage memory 21. Likewise, in transmission of the common key from the administration center 211 to the player 1, if the player-unique key corresponds to public-key encryption for example, the administration center 211 encodes the common key by use of the public key stored in the administration center 211 and the public-key encoding/decoding circuit 20 decodes the encoded common key by use of the player-unique key namely the secret key stored in the communication key storage memory 21 in the player 1.

Encryption of the player-unique key itself as mentioned above is determined by whether sending (from the system administration company 210 to the player 1) of that player-unique key is easy or not. Namely, because common-key encryption is more advantageous in cost, if sending of the player-unique is easy, common-key encryption is used; if, however, the sending is difficult, public-key encryption is used although higher in cost. When mounting the player-unique key on hardware, common-key encryption is used. When mounting the player-unique key on software, public-key encryption is used.

The following description of the present preferred embodiment will be made by use of an example in which public-key encryption is used in consideration of the compatibility to be provided when the player-unique key is mounted on software. To be more specific, in transmission of the common key between the administration center 211 and the player 1, if the common key (the session key) is encoded by the player 1, the encoding is performed by use of the public key of the administration center 211. The administration center 211 decodes the encoded common key by use of the player-unique key (namely the secret key). Conversely, if the common key (content key) is encoded by the administration center 211, the encoding is performed by use of the public key of the player 1 and the player 1 decodes the encoded common key by use of the player-unique key (namely the secret key).

The following describes sequentially the actual operations of the player 1, the user terminal 50, and the administration center 211 that constitute a system to be operated by use of the above-mentioned procedures and encryption.

First, a processing flow in the player 1, the user terminal 50, and the administration center 10 at point replenishing or point purchasing will be described with reference to FIGS. 2 and 3 and FIGS. 8 through 11.

Figure 8:
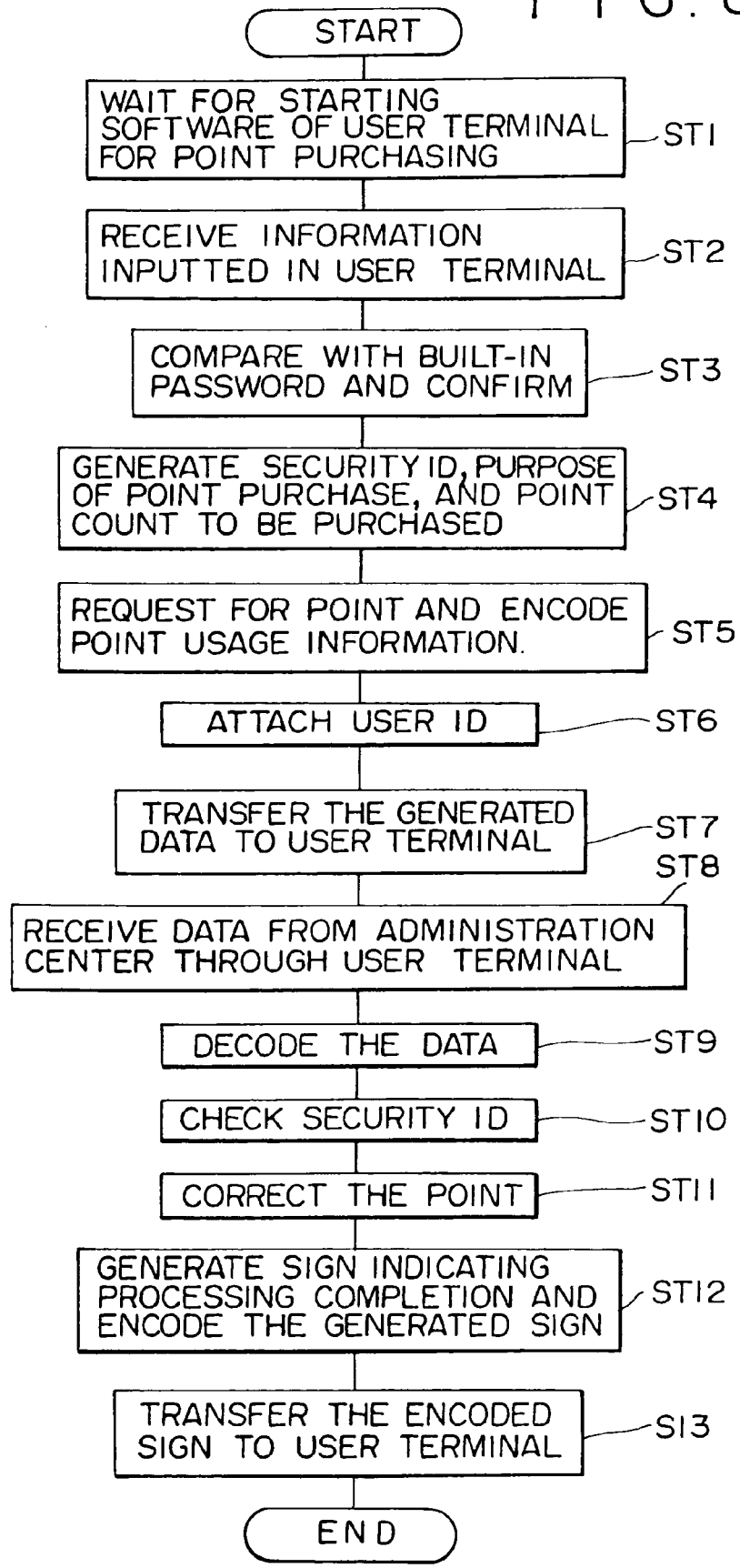
FIG. 8 is a flowchart indicative of a processing flow in the player at the time of point purchase in the above-mentioned embodied system.

FIG. 8 shows a processing flow in the player 1 at point purchasing.

Referring to FIG. 8, software installed in the user terminal 50 or a personal computer for point purchasing is started in step ST1, during which the controller 16 of the player 1 waits until the software for point purchasing is started.

When the software for point purchasing gets started, the controller 16 of the player 1 receives from the user terminal 50 the information inputted in the user terminal 50 in step ST2. The information inputted in the user terminal 50 is what the user operating the user terminal 50 is required by the user terminal 50 to input according to the software for point purchasing described above. For example, this information includes a password and information about a point information count to be purchased.

The information from the user terminal 50 is received by the controller 16 through the PC interface terminal 3 of the player 1 and the terminal 12 of the integrated circuit 10 mounted on one chip in the player 1. Receiving the information from the user terminal 50, the controller 16 compares a password stored in the password storage memory 14 in the integrated circuit 10 of the player 1 with a password contained in the received information in step ST3 to check if the received password is valid.

If the received password is found valid, the controller 16 generates information indicating intention to purchase a point (intention of point purchasing), information about the point to be purchased, and other information in step ST4. At the same time, the controller 16 causes the security ID generating circuit 19 to generate a security ID and, in step ST5, causes the common-key encoding/decoding circuit 24 to encode these pieces of information. Then, in step ST6, the controller 16 reads the user ID from the user ID storage memory 23, adds the user ID to the encoded information, and, in step ST7, transfers the resultant data to the user terminal 50 through the terminal 12 and the PC interface terminal 3. This data is then sent from the user terminal 50 to the administration center 211.

Because common-key encryption is used for encoding the generated data as described above, the common key is generated before the generated data is transmitted. Therefore, the controller 16 causes the security ID generating circuit 19, which is a random number generating means, to generate a session key. This common key (the session key) is sent from the player 1 to the administration center 211 before the transmission of the above-mentioned generated data. Because the common key is encoded by public-key encryption as described above, the controller 16 sends the common key, or the session key to the public-key encoding/decoding circuit 20 and, at the same time, takes the public key of the administration center 211 from the communication key storage memory 21 and sends this public key to the public-key encoding/decoding circuit 20. Consequently, the public-key encoding/decoding circuit 20 encodes the common key (the session key) by use of the public key of the administration center 211. The session key thus encoded is sent to the administration center 211 along with the user ID before the transmission of the generated data.

As described before, if the point usage information is transferred concurrently with the request for point information, the controller 16 reads the point usage information including the above-mentioned copyright holder information from the point usage information storage memory 29 and causes the common-key encoding/decoding circuit 26 to encode the point usage information. The encoded point usage information is transmitted along with the above-mentioned generated data. The balance of the point information may also be transferred in the same manner concurrently with the transfer of the point usage information.

Then, in step ST8, the controller 16 receives the encoded data coming from the administration center 211 through the user terminal 50. This data from the administration center 211 is the data obtained by encoding the point information corresponding to the point information count to be purchased transferred from the player 1 before and the information including the security ID by use of the same common key as the above-mentioned session key.

Receiving the data from the administration center 211, the controller 16 sends the received data to the common-key encoding/decoding circuit 24 in step ST9 and, at the same time, reads the above-mentioned common key generated and stored in the common-key storage memory 22 and sends this common key to the common-key encoding/decoding circuit 24. The common-key encoding/decoding circuit 24 decodes the encoded data coming from the administration center 211 by use of the above-mentioned common key.

In step ST10, the controller 16 checks the security ID of the decoded data by comparing the same with the security ID coming from the security ID generating circuit 19. Then, in step ST11, the controller 16 updates the point information stored in the point information storage memory 28 by the newly sent point information.

When the point information has been updated, the controller 16, in step ST12, generates a sign indicative of completion of the processing, sends the generated sign to the common-key encoding/decoding circuit 24 along with the common key read from the common-key storage memory 22, and causes the common-key encoding/decoding circuit 24 to encode the sign. Then, in step ST13, the controller 16 transfers the encoded sign to the user terminal 50 through the terminals 12 and 3, the encoded sign being then transferred to the administration center 211.

Thus, the processing flow in the player 1 for point purchasing is completed.

Figure 9:
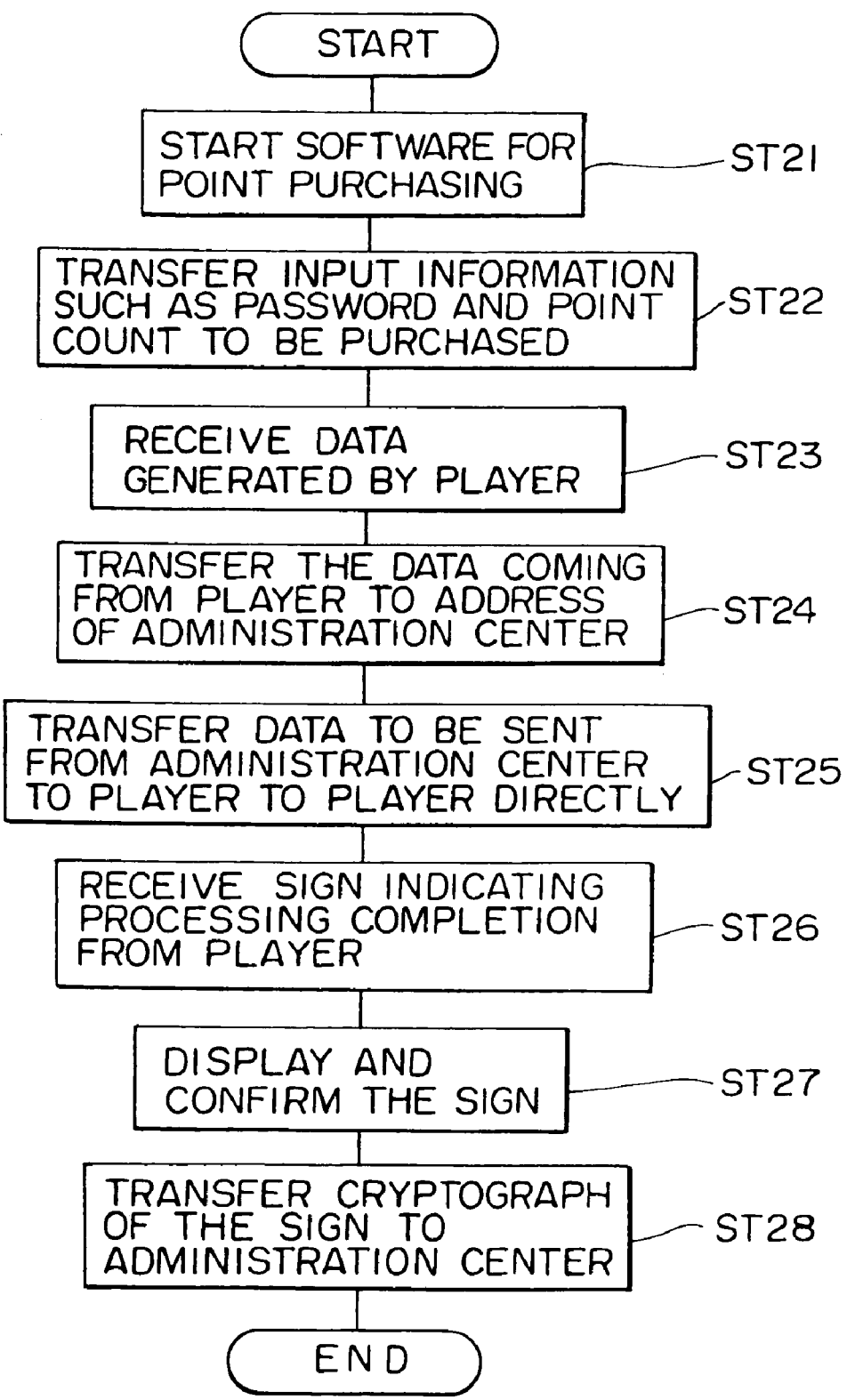
FIG. 9 is a flowchart indicative of a processing flow at a user terminal at the time of point purchase in the above-mentioned embodied system.

The following describes a processing flow in the user terminal 50 for point purchasing with reference to FIG. 9.

As shown in FIG. 9, the user terminal 50 starts the software for point purchasing in step ST21. When the software for point purchasing has been started, the user terminal 50 requests the user operating this user terminal 50 for inputting the password and the information such as a point count to be purchased according to the software for point purchasing in step ST22. When these pieces of information have been inputted by the user, the user terminal 50 transfers the inputted information to the player 1 as with step ST2 shown in FIG. 8.

Then, in step ST23, the user terminal 50 receives the data generated as shown in step ST7 shown in FIG. 8 from the player 1. In step ST24, the user terminal 50 sends the data transferred from the player 1 to the registered address, namely the administration center 211.

Having transferred the above-mentioned data, the user terminal 50 waits for a return from the administration center 211. When the data is returned from the administration center 211, the user terminal 50 transfers the data returned from the administration center 211 to the player 1 without change in step ST25.

In step ST26, when the user terminal 50 receives the sign indicative of completion of the processing from the player 1 as with step ST13 of FIG. 8, the user terminal 50 displays the sign on the display device in step ST27 to notify the user of completion of the processing such as point purchasing.

Then, the user terminal 50 sends the cryptograph of the sign indicative of processing completion coming from the player 1 to the administration center 211.

Thus, the processing flow in the user terminal 50 for point purchasing has come to an end.

Figure 10:
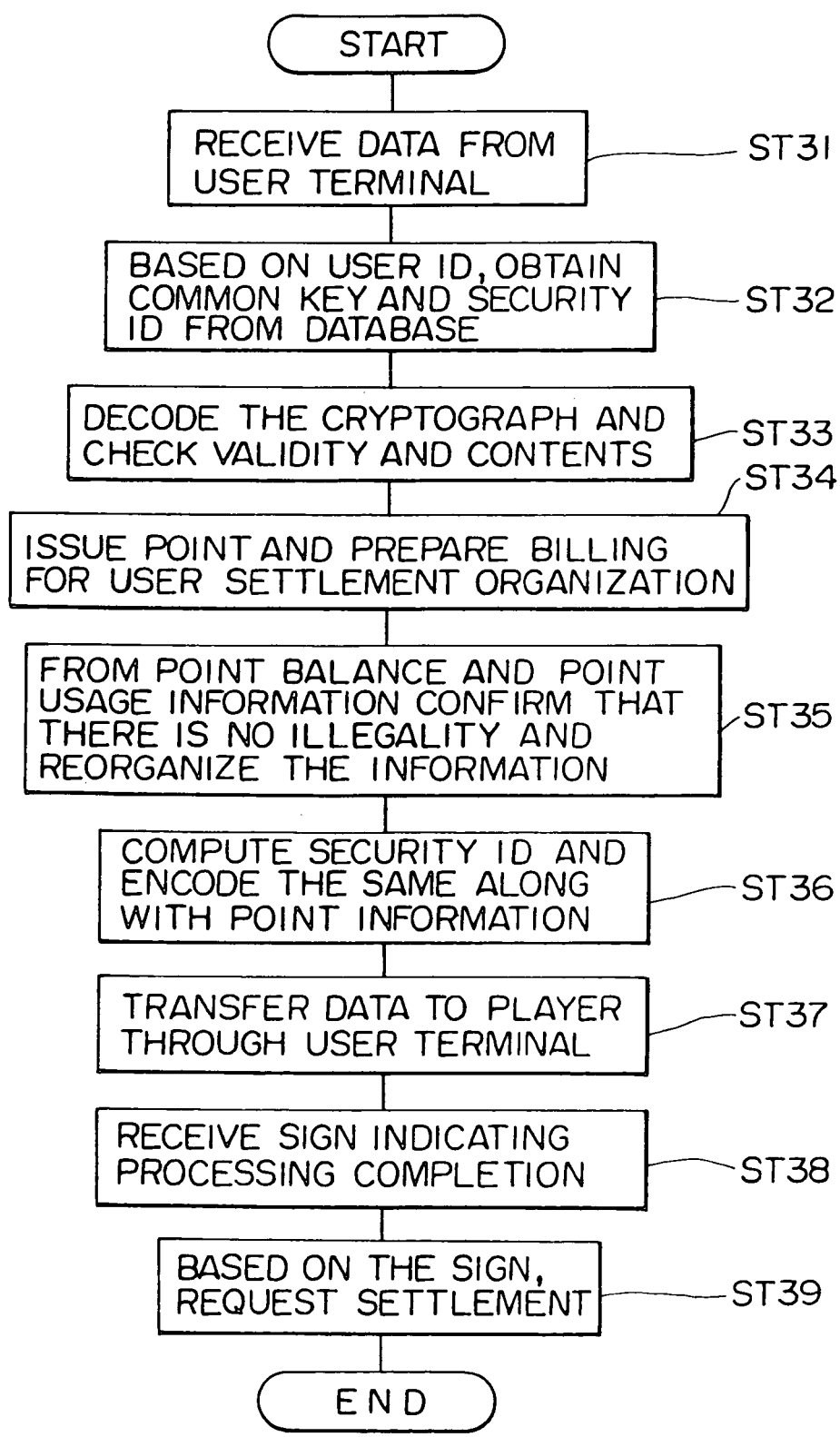
FIG. 10 is a flowchart indicative of a processing flow at a administration center at the time of point purchase in the above-mentioned embodied system.

The following describes a processing flow in the administration center 211 for point purchasing with reference to FIG. 10.

As shown in FIG. 10, the administration center 211 receives, by a communication function block 133 of the administration function block 130 controlled by the control function block 131 as shown in step ST31, the above-mentioned encoded data from the player 1 transferred through the user terminal 50 as shown in step ST7 of FIG. 8 and in step ST24 of FIG. 9. Receiving this data, the user administration function block 110 of the administration center 211 obtains the common key from a database 112 and the security ID from a security ID generating function block 116 based on the user ID attached to the received data under the control of a control function block 111.

The common key at this moment is above-mentioned session key sent from the player 1 in advance. This session key was encoded by public-key encryption as described before. Therefore, at decoding this encoded session key, the user administration function block 110 of the administration center 211 takes out the secret key of public-key encryption of the administration center 211 and sends this secret key and the above-mentioned encoded session key to a communication statement encoding/decoding function block 114. The communication statement encoding/decoding function block 114 decodes the encoded session key by use of the public key of the administration center 211. The session key (the common key) thus obtained is stored in the database 112.

When the common key corresponding to the above-mentioned user ID is obtained from the database 112 and the security ID is obtained from the security ID generating function block 116, the communication statement encoding/decoding function block 114 of the user administration function block 110 in the administration center 211 decodes the encoded data from the player 1 by use of the above-mentioned common key. Further, the control function block 111 compares the security ID attached to the decoded data with the security ID read from the security ID generating function block 116 to check to see if the user 200 (the player 1) that made the access is an authorized user or not.

If the user 200 that made the access is found authorized, the administration center 211 causes a point generating function block 113 of the user administration function block 110 to issue point information in step ST34 according to the data sent from the user terminal 50 and causes a settlement billing function block 117 to prepare billing for the settlement organization (the finance organization 220) of the user.

In step ST35, the administration center 211 causes the control function block 111 for example to check the balance of the point information and the point usage information sent from the player 1 for any invalidity and reorganizes the information for later processing. Namely, from the balance of the point information and the actually used point information count, the invalid use is checked and the information is reorganized. It should be noted that these check and reorganization need not always be performed; preferably, however, these check and reorganization are performed.

In step ST36, the user administration function block 110 of the administration center 211 causes, after the processing of step ST35, the security ID generating function block 116 to compute a new security ID for the player 1 (the user) based on random number generation for example and causes the control function block 111 to encode the security ID along with the above-mentioned point information. This encoding is also performed by use of the session key (the common key) sent from the player 1 beforehand.

When the encoding has been completed, the communication function block 133 of the administration function block 130 in the administration center 211 sends the decoded data to the player 1 through the user terminal 50 under the control of the control function block 131 as indicated by step ST25 of FIG. 9 and step ST8 of FIG. 8.

Then, in step ST38, the communication function block 133 of the administration center 211 receives the sign indicating processing completion from the user terminal 50 shown in step ST28 of FIG. 9 and decodes the received sign. In step ST39, the settlement billing function block 117 of the user administration function block 110 in the administration center 211 requests the finance organization 220 for the settlement according to the decoded sign indicating processing completion. The settlement request is issued from the communication function block 132 of the administration function block 130.

Thus, the processing flow in the administration center 211 for point purchasing has come to an end.

Figure 11:
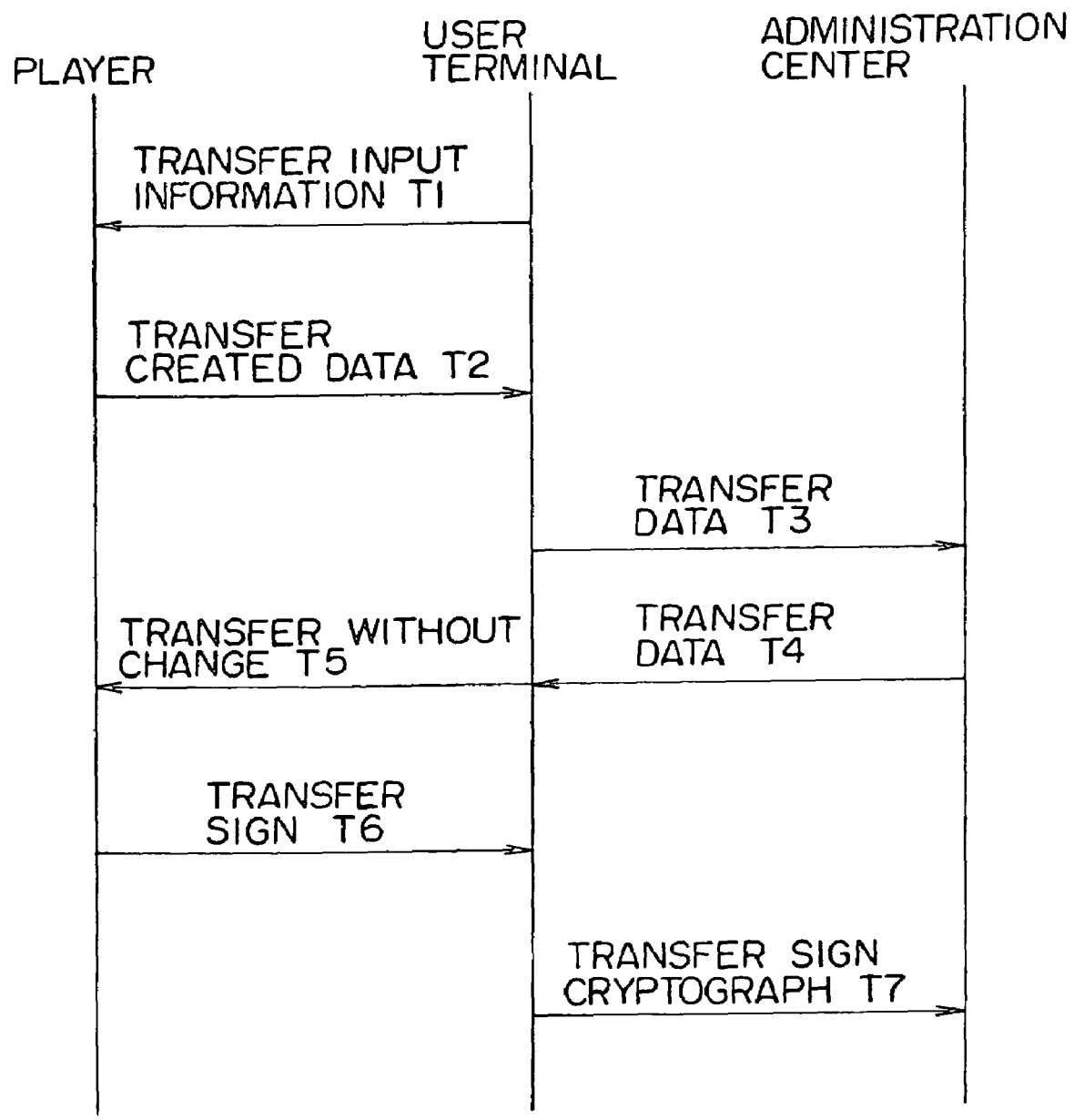
FIG. 11 is a diagram illustrating a sequence of information transfer to be performed at point purchase in the above-mentioned embodied system.

The sequence of information transfer between the player 1, the user terminal 50, and the administration center 211 in the processing flow shown in FIGS. 8 through 10 can be represented as shown in FIG. 11.

Namely, as shown in FIG. 11, in an input information transfer operation T1, the input information such as the password and the point count is transferred from the user terminal 50 to the player 1 as shown in step ST2 of FIG. 8 and step ST22 of FIG. 9.

In a generated data transfer operation T2, the data generated by the player 1 is transferred from the player 1 to the user terminal 50 as shown in step ST7 of FIG. 8 and step ST23 of FIG. 9. In a data transfer operation T3, the data generated by the player 1 is transferred from the user terminal 50 to the administration center 211 as shown in step ST24 of FIG. 9 and step ST31 of FIG. 10.

In a data transfer operation T4, the data encoded by the administration center 211 is transferred from the administration center 211 to the user terminal 50 as shown in step ST37 of FIG. 10 and step ST25 of FIG. 9. In a transfer operation T5, the data coming from the administration center 211 is transferred by the user terminal 50 to the player 1 without change as shown in step ST25 of FIG. 9 and step ST8 of FIG. 8.

In a processing completion sign transfer operation T6, the sign indicating processing completion is transferred from the player 1 to the user terminal 50 as shown in step ST13 of FIG. 8 and step ST26 of FIG. 9. Further, in a processing completion sign cryptograph transfer, the encoded sign indicating processing completion is transferred from the player 1 to the administration center 211 as shown in step ST28 of FIG. 9 and step ST38 of FIG. 10.

The following describes a processing flow in the player 1, the user terminal 50, and the administration center 211 at obtaining the above-mentioned digital content with reference to FIGS. 2 and 3 and FIGS. 12 through 15.

Figure 12:
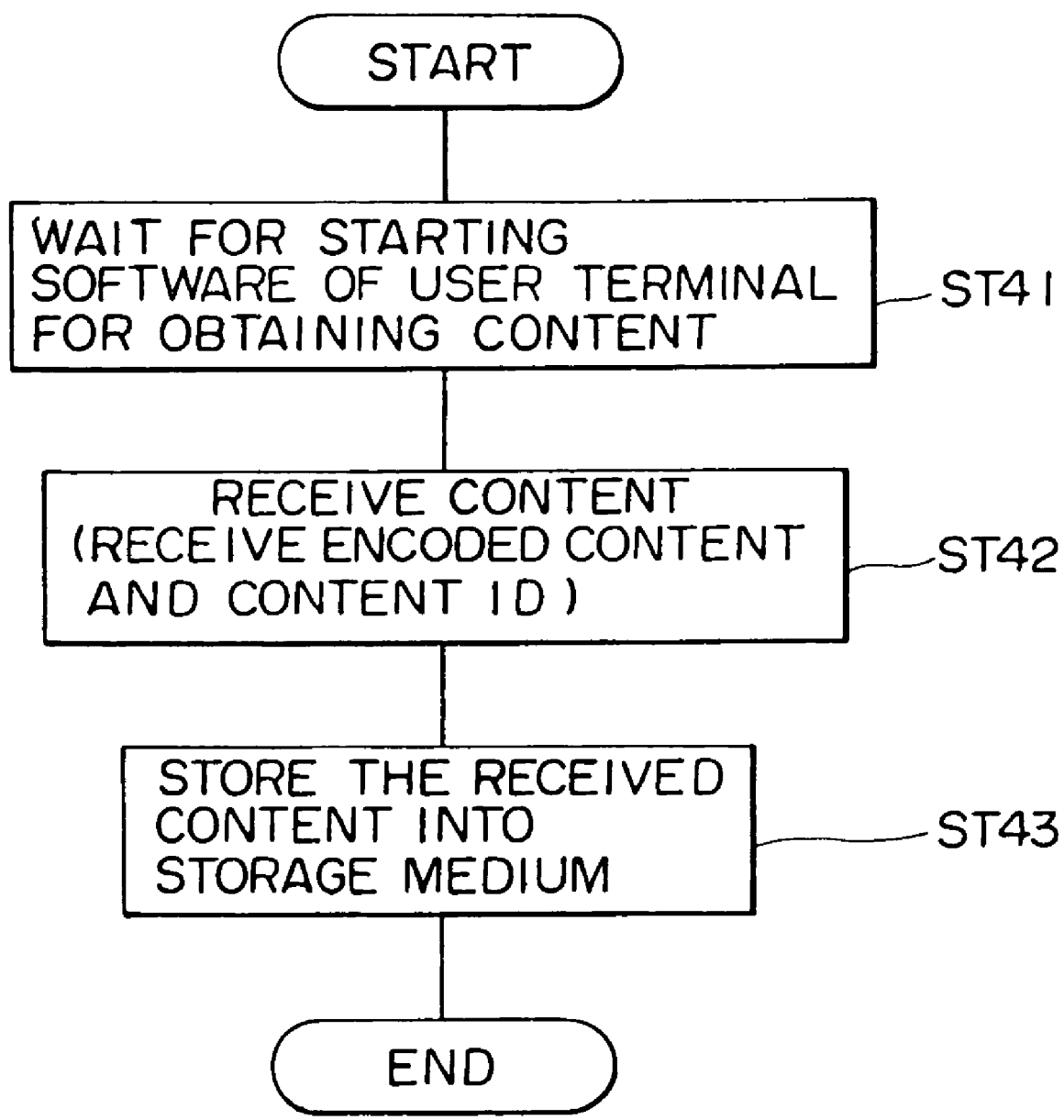
FIG. 12 is a flowchart indicative of a processing flow at the player at the time of acquiring digital content in the above-mentioned embodied system.

FIG. 12 shows a processing flow in the player 1 for obtaining digital content.

As shown in FIG. 12, in step ST41, the controller 16 waits until the software for obtaining digital content installed on the user terminal 50, or the personal computer, is started.

When the software for obtaining digital content is started, the controller 16 receives data including digital content from the administration center 211 through the user terminal 50 in step ST42. The data to be received from the user terminal 50 through the terminal 3 and 12 has at least the digital content encoded by the content key (a specific common key for specific content) and the content ID corresponding to the digital content. Therefore, use of this encoded digital content requires to obtain the content key from the administration center 211. A method of obtaining the content key will be described later.

Receiving the data from the user terminal 50, the controller 16 stores this data, namely the encoded digital content, into a storage medium connected to the storage medium I/O terminal 4 through the terminal 11 of the integrated circuit 10. It should be noted that this storage medium may be a rewritable optical disk, a semiconductor memory device, or the like; preferably, this storage medium is a device allowing random access.

Thus, the processing flow in the player 1 for obtaining digital content has come to an end.

Figure 13:
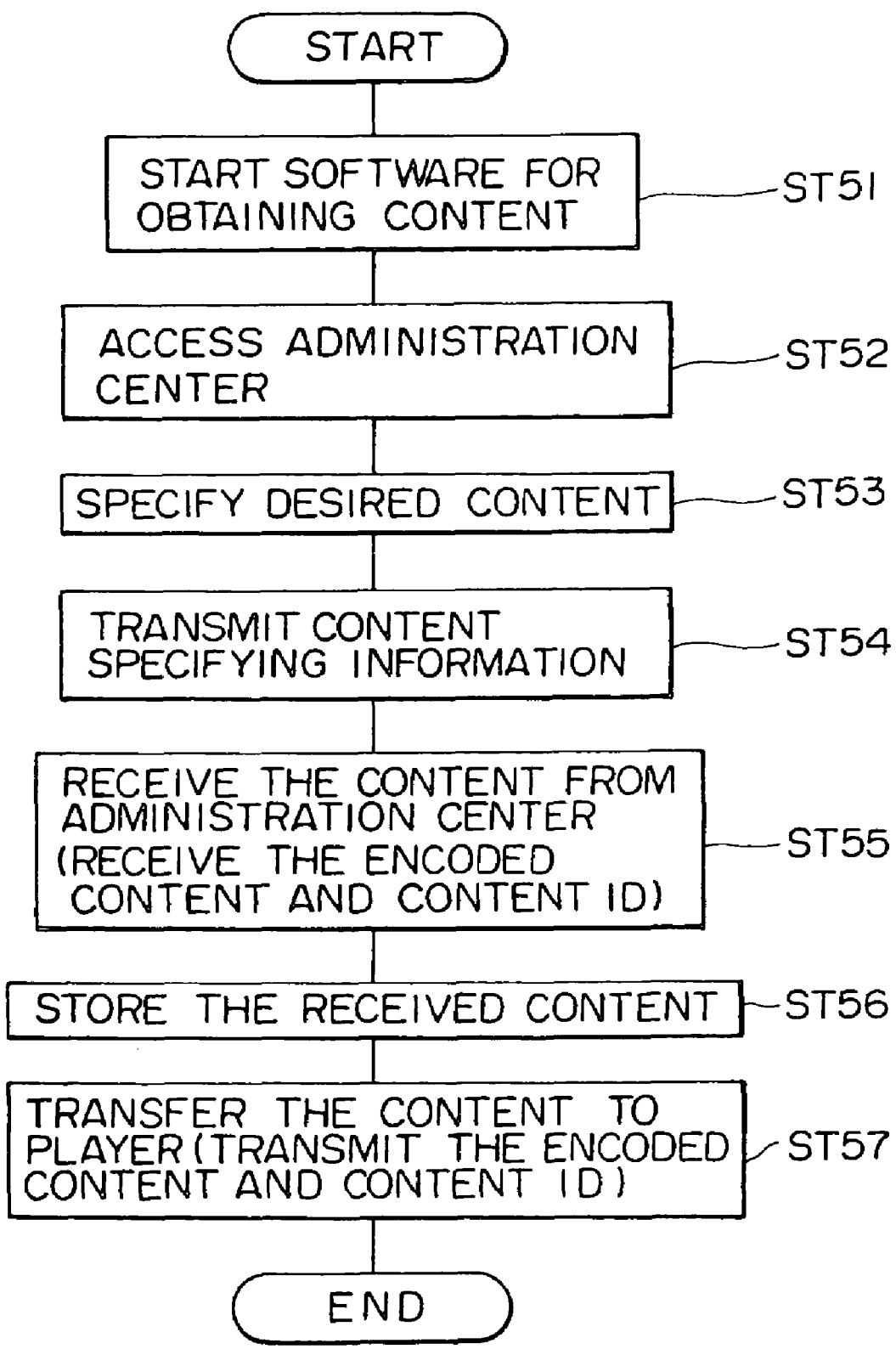
FIG. 13 is a flowchart indicative of a processing flow at the user terminal at the time of acquiring digital content in the above-mentioned embodied system.

The following describes a processing flow in the user terminal 50 for obtaining digital content with reference to FIG. 13.

As shown in FIG. 13, in step ST51, the user terminal 50 starts the software for obtaining digital content. When this software is started, the user terminal 50 accesses, in step S52, the administration center 211 having a registered address according to the software for obtaining digital content.

At this moment, the administration center 211 is displaying plural pieces of digital contents by use of the virtual store 230. In step ST53, the user selects a desired digital content through the user terminal 50 from among the digital contents displayed in the virtual store 230. To be more specific, the user terminal 50 sends content specification information for specifying a desired digital content from among those displayed in the virtual store 230 to the administration center 211.

In step ST55, when the user terminal 50 receives the data returned from the administration center 211 according to the above-mentioned content specification information, namely the data composed of the encoded digital content and the content ID, the user terminal 50 temporarily stores the received data in an internal storage means such as hard disk or memory device in step ST56.

Then, the user terminal 50 transfers the stored data (namely, the encoded digital content and the content ID) to the player 1 as shown in step ST42 of FIG. 12.

Thus, the processing flow in the user terminal for obtaining digital content has come to an end.

Figure 14:
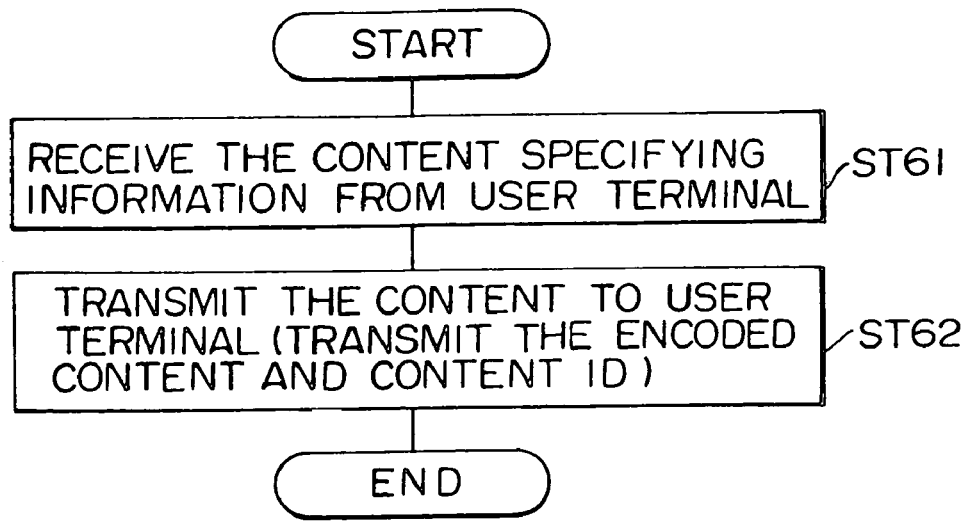
FIG. 14 is a flowchart indicative of a processing flow at the administration center at the time of acquiring digital content in the above-mentioned embodied system.

The following describes a processing flow in the administration center 211 for obtaining digital content with reference to FIG. 14.

The administration center 211 shown in FIG. 3 is displaying plural pieces of contents in the virtual store 230 described before. To be more specific, the virtual store 230 is generated in the content administration function block 100 of the administration center 211. In the generated virtual store 230, the above-mentioned plural pieces of digital contents are on display.

In step ST61 of FIG. 14, with the digital contents being on display in the virtual store 230, the administration center receives the content specification information from the user terminal 50 as shown in step ST54 of FIG. 13.

Receiving the content specification information from the user terminal 50, the control function block 101 of the content administration function block 100 sends the received content specification information to the administration function block 130. The control function block 131 of the administration function block 130 transfers the content specification information received from the content administration function block 100 to the content provider 240 through the communication function block 134 for the proprietor. From this content provider 240, the digital content requested by the content specification information comes. The digital content obtained from the content provider 240 is then transferred from the administration function block 130 to the content administration function block 100 to be inputted in this content encoding and compressing function block 104. At this moment, the control function block 101 sends the content key generated by the content key and ID generating function block 103 and stored in the database 102 to the content encoding and compressing function block 104. The content encoding and compressing function block 104 encodes the digital content by use of the above-mentioned content key and compresses the encoded digital content in a predetermined manner. The control function block 101 attaches the content ID taken from the database 102 to the encoded and compressed digital content and sends the result to the administration function block 130. It should be noted that, if the digital content is an audio signal, ATRAC (Adaptive TRansform Acoustic Coding) for example is used for compressing the digital content. ATRAC is a technology for use in compressing data stored in a recently available storage medium called MD (Mini Disc, trademark). ATRAC considers the human auditory characteristic to compress audio data highly efficiently.

Then, in step ST62 shown in FIG. 14, the control function block 131 of the administration function block 130 sends the encoded and compressed digital content attached with the content ID to the user terminal 50 through the communication function block 133 for interfacing the user terminal.

Thus, the processing flow in the administration center 211 for obtaining digital content has come to an end.

Figure 15:
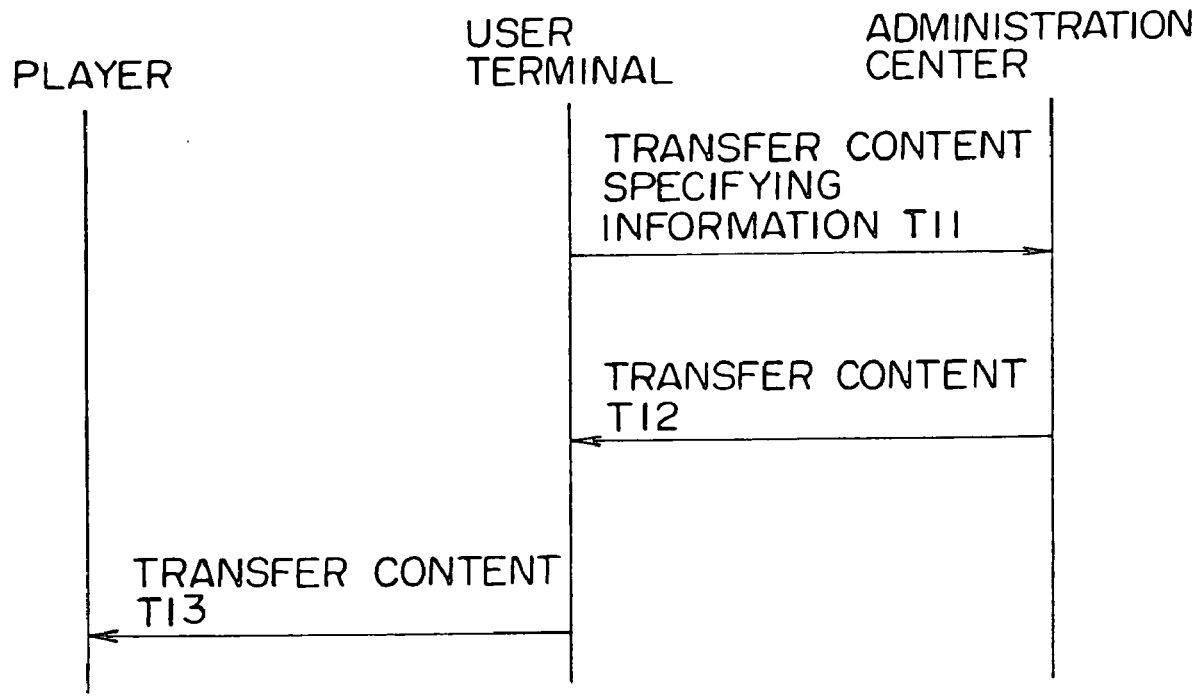
FIG. 15 is a diagram illustrating a sequence of information transfer to be performed at the time of acquiring digital content in the above-mentioned embodied system.

The sequence of transferring information between the player 1, user terminal 50, and the administration center 211 in the processing flow shown in FIGS. 12 through 14 can be represented as shown in FIG. 15.

In FIG. 15, in an input information transfer operation T11, the above-mentioned content specification information is transferred from the user terminal 50 to the administration center 211 in step ST54 of FIG. 13. In a content transfer operation T12, the encoded digital content and the content ID are transferred from the administration center 211 to the user terminal 50 as in step ST62 of FIG. 14.

In a content transfer operation T13, the encoded digital content and the content ID once stored in the user terminal 50 are transferred to the player 1 as in step ST57 of FIG. 13 and step ST42 of FIG. 12.

The following describes a processing flow in the player 1, the user terminal 50, and the administration center 211 for obtaining a content key necessary for using the above-mentioned digital content and a use condition of the content key with reference to FIGS. 2 and 3 and FIGS. 16 through 19.

Figure 16:
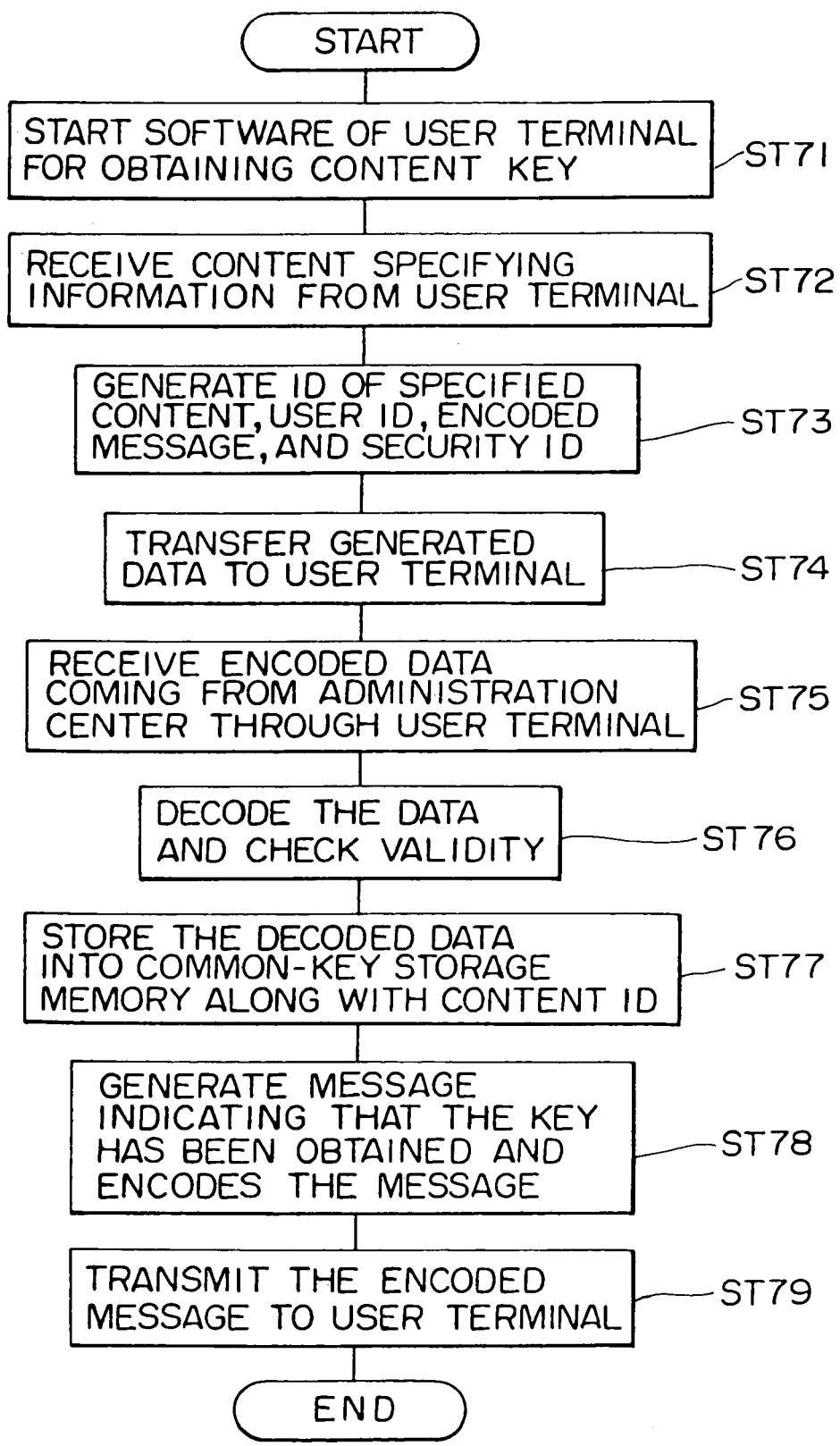
FIG. 16 is a flowchart indicative of a processing flow at the player at the time of acquiring a content key and a condition of use in the above-mentioned embodied system.

FIG. 16 shows a processing flow in the player 1 for obtaining the content key and the use condition thereof.

In step ST71 of FIG. 16, the controller 16 of the player 1 waits for the software installed in advance on the user terminal 50 for obtaining the content key and the use condition to be started.

When the software of the user terminal 50 for obtaining the content key and the use condition has been started, information inputted in the user terminal 50 according to the software is received through the PC interface terminal 3 and the terminal 12 of the integrated circuit 10 in step ST72. The input information supplied from the user terminal 50 is information for requesting a content key necessary for decoding the encoded digital content to be viewed. In this example, for the content key requesting information, information for specifying the digital content that uses this content key is used.

Receiving the above-mentioned content specification information from the user terminal 50, the controller 16 generates the ID of the digital content specified by the content specification information and security ID coming from the security ID generating circuit 19 in step ST73 and causes the common-key encoding/decoding circuit 24 to encode this generated data. Also, the controller 16 adds the user ID read from the user ID storage memory 23 to this generated data and sends the resultant data to the user terminal 50 through the terminal 12 and the PC interface terminal 3. From the user terminal 50, this data is sent to the administration center 211.

Because common-key encryption is also used for encoding the above-mentioned data, a common key is generated before the data is transmitted. Therefore, the controller 16 causes the security ID generating circuit 19 for example, which is a random number generating means, to generate a session key as the common key. This common key (or the session key) is sent from the player 1 to the administration center 211 before the above-mentioned data is sent. Because this common key is encoded by public-key encryption as described before, the controller 16 sends the session key, which is the common key, to the public-key encoding/decoding circuit 20 and, at the same time, takes the public key of the administration center 211 from the communication key storage memory 21 to send this public key to the public-key encoding/decoding circuit 20. Consequently, the public-key encoding/decoding circuit 20 encodes the common key (or the session key) by use of the public key of the administration center 211. The session key thus encoded is sent to the administration center 211 before transmission of the above-mentioned data.

Then, in step ST75, the controller 16 receives the encoded data from the administration center 211 through the user terminal 50 as will be described later. The data sent from the administration center 211 is composed of the above-mentioned content key, use condition, and security ID that are encoded.

Receiving the encoded data from the administration center 211, the player 1 decodes the received encoded data and checks the decoded data for validity in step ST76. Namely, the controller 16 checks the validity by comparing the security ID of the decoded data with the security ID received from the security ID generating circuit 19.

It should be noted here that the content key is encoded by public-key encryption and the use condition and security ID are encoded by common-key encryption as will be described. Therefore, in order to decode the encoded content key, a secret key of public-key encryption is required. In the player 1 of the present embodiment, a player-unique key is used as the secret key as described before, so that the player-unique key is taken from the communication key storage memory 21. This player-unique key is sent to the public-key encoding/decoding circuit 20 along with the above-mentioned encoded content key. The public-key encoding/decoding circuit 20 decodes the above-mentioned encoded content key by use of the above-mentioned player-unique key. The decoded content key is stored in the common-key storage memory 22. On the other hand, in order to decode the use condition and security ID encoded by common-key encryption, these pieces of data are sent to the common-key encoding/decoding circuit 24 and the above-mentioned common key is read from the common key storage memory 22 to send to the common-key encoding/decoding circuit 24. The common-key encoding/decoding circuit 24 decodes the above-mentioned use condition and security ID by use of the above-mentioned common key. The decoded use condition is stored in the point usage information memory 29. It should be noted here that the decoded content key and use condition are not taken outside the player 1; to be more specific, these pieces of data are not taken outside the controller 16, the common-key storage memory 22, and the point usage information storage memory 29 that are mounted on the integrated circuit 10 shown in FIG. 2.

After checking the validity, the controller 16 stores the above-mentioned decoded content key into the common-key storage memory 22 along with the above-mentioned content ID in step ST77.

Then, in step ST78, the controller 16 generates a message indicating that the above-mentioned content key has been obtained, sends this message to the common-key encoding/decoding circuit 24, reads the common key from the common-key storage memory 22, and sends this common key to the common-key encoding/decoding circuit 24. The common-key encoding/decoding circuit 24 encodes the message by use of this common key.

When the message has been encoded, the controller 16 sends the encoded message to the user terminal 50 through the terminals 12 and 3 in step ST79. This encoded message is then transferred to the administration center 211.

Thus, the processing flow in the player 1 for obtaining the content key and the use condition has come to an end.

Figure 17:
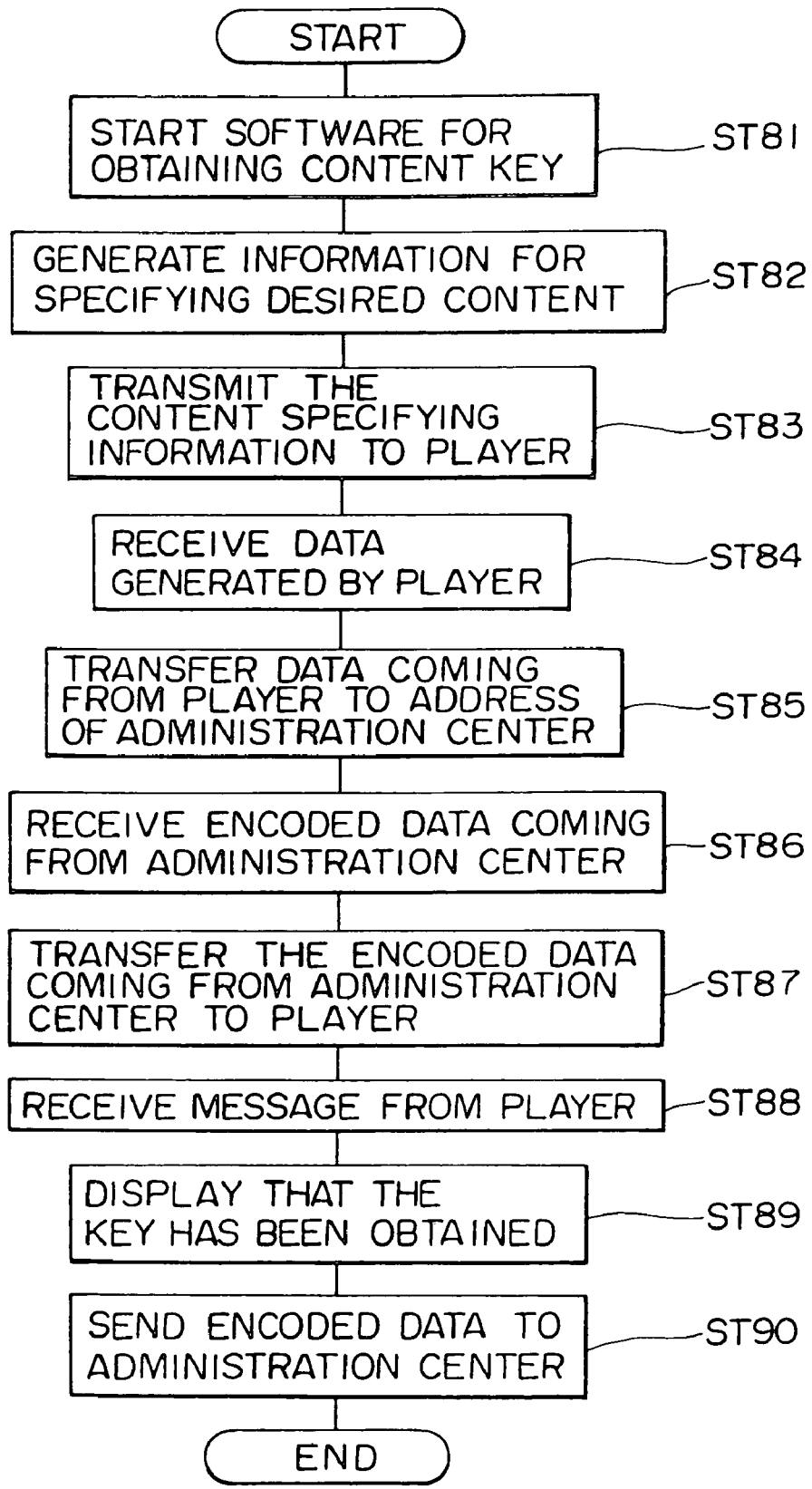
FIG. 17 is a flowchart indicative of a processing flow at the user terminal at the time of acquiring a content key and a condition of use in the above-mentioned embodied system.

The following describes a processing flow in the user terminal 50 for obtaining a content key and a use condition with reference to FIG. 17.

In step ST81 shown in FIG. 17, the user terminal 50 starts the software for obtaining the content key and the use condition. When this software has been started, the user terminal 50 requests the user operating the same to specify a desired content according to the software in step ST82. When the user specifies the desired content, the user terminal 50 generates the specification information accordingly. In step ST83, the user terminal 50 sends the content specification information to the player 1.

In step ST84, the user terminal 50 receives data generated and transferred from the player 1 as in step ST74 of FIG. 16. In step ST85, the user terminal 50 transfers the data coming from the player 1 to the administration center 211 of which address has been registered beforehand.

Transferred the data to the administration center 211, the user terminal 50 waits for return from the administration center 211. When the data including the encoded content key and use condition and the encoded security ID specified by the above-mentioned content ID is returned from the administration center 211 in step ST86, the user terminal 50 transfers this data received from the administration center 211 to the player 1 directly.

Transferred the data to the player 1, the user terminal 50 waits for return from the player 1. In step ST88, when an encoded message indicating that the content key has been obtained comes from the player 1 as in step ST79 of FIG. 16, the user terminal 50 displays a message on the display device connected to the user terminal 50 that the obtaining of the content key has been completed in step ST89, notifying the user thereof.

In step ST90, the user terminal 50 sends the above-mentioned encoded message returned from the player 1 to the administration center 211.

Thus, the processing flow in the user terminal 50 for obtaining the content key and the use condition has come to an end.

Figure 18:
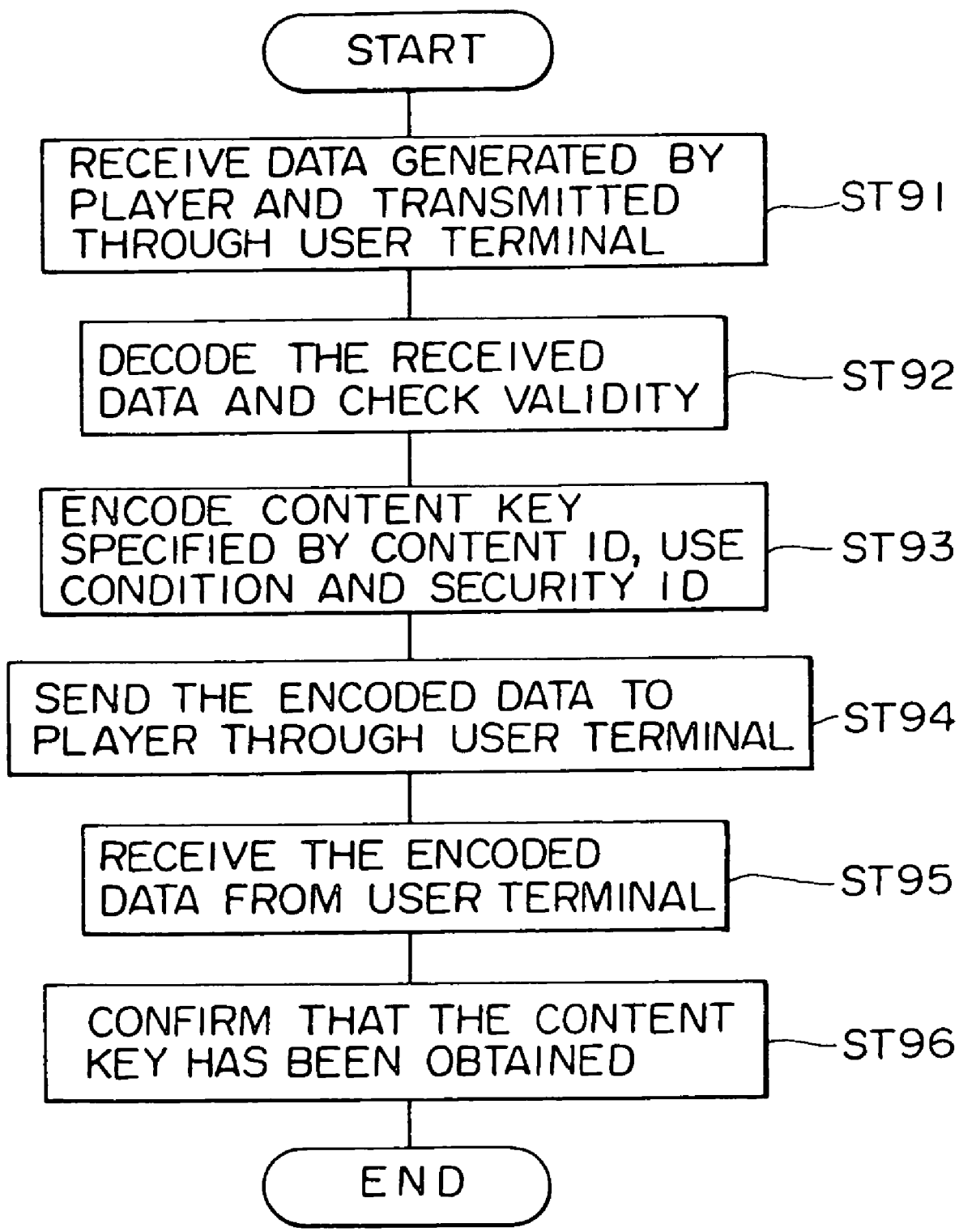
FIG. 18 is a flowchart indicative of a processing flow at the administration center at the time of acquiring a content key and a condition of use in the above-mentioned embodied system.

The following describes a processing flow in the administration center 211 for obtaining a content key and a use condition with reference to FIG. 18.

In step ST91 shown in FIG. 18, the communication function block 133 of the administration center 211 interfacing the user terminal receives encoded data including an content ID, a user ID, a message, and a security ID from the player 1 through the user terminal 50 as in step ST74 of FIG. 16 and ST85 of FIG. 17. The received data is then sent to the user administration function block 110.

Based on the user ID attached to the above-mentioned received encoded data, the control function block 111 of the user administration function block 110 takes a common key for decoding the above-mentioned encoded data from the database 112. This encoded data is decoded by the communication statement encoding/decoding function block 114 by use of this common key. Also, the control function block 111 checks the validity of the decoded data by use of the user ID read from the database 112 and the security ID read from the security ID generating function block 116.

It should be noted that the common key at this moment is the above-mentioned session key already received from the player 1. This session key has come encoded by public-key encryption as described before. Therefore, at decoding this encoded session key, the secret key based on public-key encryption of the administration center 211 is taken therein as described before. The session key is decoded by the communication statement encoding/decoding function block 114 by use of this secret key. The session key (the common key) thus obtained is stored in the database 112.

When the validity of the received data has been checked, the control function block 111 requests the content administration function block 100 for the content key and use condition specified by the above-mentioned content ID. The control function block 101 of the requested content administration function block 100 reads the content key and use condition specified in the content ID from the database 102 and transfers the content key and use condition to the user administration function block 110. In step ST93, the control function block 111 sends these content key and use condition to the communication statement encoding/decoding function block 114 along with the security ID.

The content key is encoded based on public-key encryption and the use condition and the security ID are encoded based on common-key encryption as described before. Therefore, when encoding the content key, the public key of the user 200 (the public key stored beforehand corresponding to the player 1) is taken from the database 112 based on the above-mentioned user ID and this public key is sent to the communication-statement encoding/decoding function block 114. Using this public key, the communication statement encoding/decoding function block 114 encodes the content key. On the other hand, when encoding the use condition and the security ID, the common key (the session key) specified by the above-mentioned user ID is taken from the database 112 and this common key is sent to the communication statement encoding/decoding function block 114. The communication statement encoding/decoding function block 114 encodes the use condition and the security ID by use of the above-mentioned common key.

The encoded content key, use condition, and security ID are sent to the administration function block 130 and then transmitted from the communication function block 133 to the user terminal 50 in step ST94. The data sent to the user terminal 50 is then sent to the player 1 from the user terminal 50 as in step ST87 of FIG. 17 and step ST75 of FIG. 16.

Then, the administration center 211 waits for receiving the encoded message generated in the player 1 and sent through the user terminal 50 as in step ST79 of FIG. 16 and step ST90 of FIG. 17. When the communication function block 133 receives the encoded message generated by the player 1 in step ST95, the administration center 211 decodes the encoded message by use of the common key. Based on this decoded message, the administration center 211 confirms that the player 1 has obtained the content key and the use condition in step ST96.

Thus, the operation flow in the administration center 211 for obtaining the content key and the use condition has come to an end.

Figure 19:
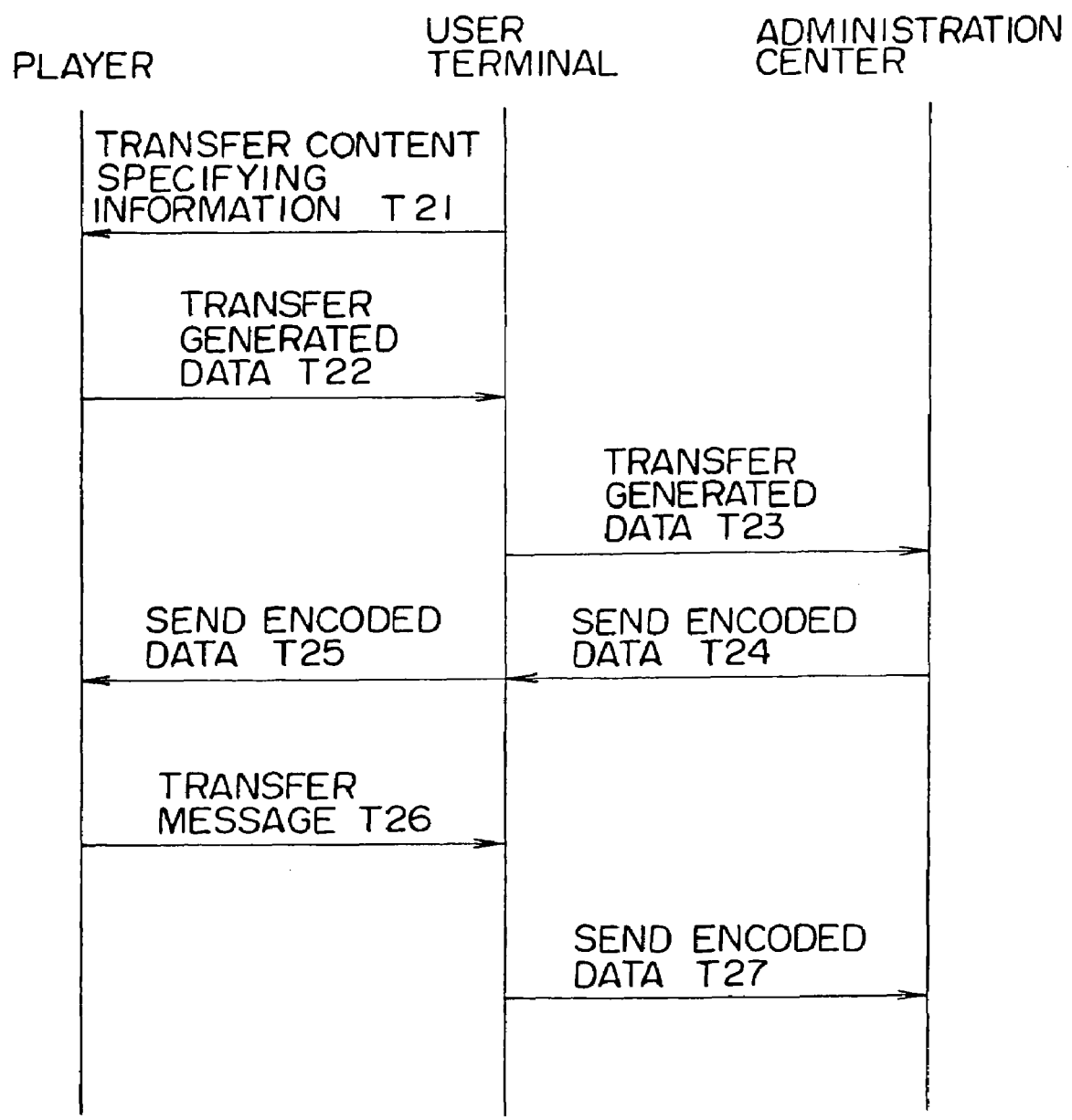
FIG. 19 is a diagram illustrating a sequence of information transfer to be performed at the time of acquiring a content key and a condition of use in the above-mentioned embodied system.

The sequence of information transfer between the player 1, the user terminal 50, and the administration center 211 in the processing flow shown in FIGS. 16 through 18 is represented as shown in FIG. 19.

Referring to FIG. 19, in a content specification information transfer operation T21, the above-mentioned content specification information is transferred from the user terminal 50 to the player 1 as in step ST83 of FIG. 17. In a generated data transfer operation T22, the data generated by the player 1 is transferred to the user terminal 50 as in step ST74. In a generated data transfer operation T23, the data generated by the player 1 is transferred from the user terminal 50 to the administration center 211. In an encoded data sending operation T24, the data encoded by the administration center 211 is sent to the user terminal 211 as in step ST94 of FIG. 18. In an encoded data sending operation T25, this encoded data is sent to the player 1.

In a message transfer operation T26, data obtained by encoding a message indicating that the content key has been obtained is transferred from the player 1 to the user terminal 50 as in step ST79 of FIG. 16. In an encoded data sending operation T27, the encoded message coming from the player 1 is sent from the user terminal 50 to the administration center 211.

Figure 20:
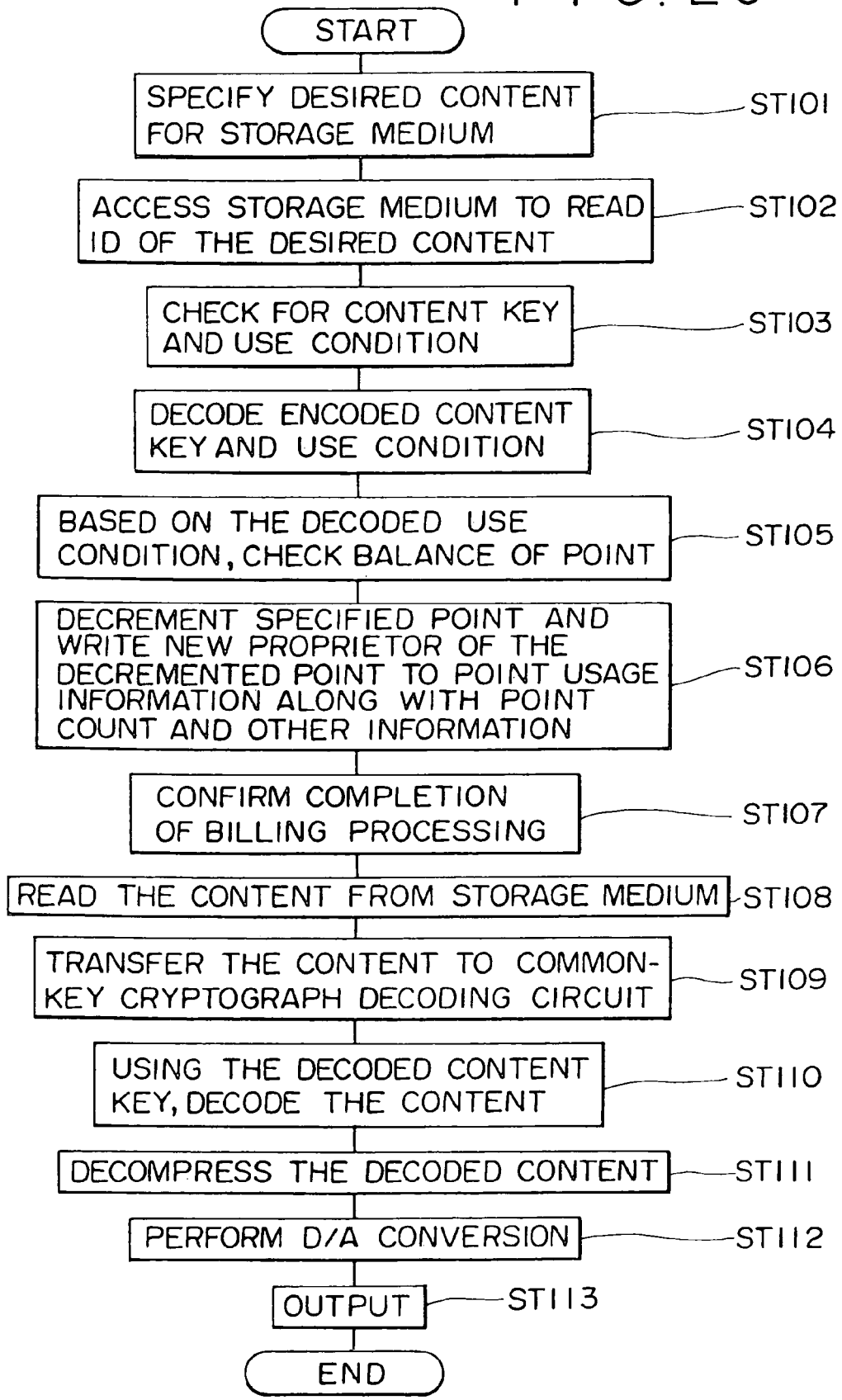
FIG. 20 is a flowchart indicative of a processing flow in which digital content is actually viewed by use of the player and the user terminal in the above-mentioned embodied system.

The following describes a processing flow in the player 1 that has received the point information, the digital content, and the content key as described above for actually viewing the received digital content by use of the user terminal 50 with reference to FIGS. 2 and 20.

It is assumed here that the terminal 4 of the player 1 is connected to a storage medium in which the above-mentioned digital content is stored.

In this state, the user terminal 50 specifies the digital content to be viewed in the player 1 in step ST101. At this moment, this specification is made by the user operating the user terminal 50 for example.

In step ST102, the controller 16 of the player 1 accesses the above-mentioned storage medium according to the content specification information coming from the user terminal 50 to read the ID of the content.

In step ST103, based on the content ID read from the storage medium, the controller 16 accesses the common-key storage memory 22 to check if the content key is stored and, at the same time, accesses the point usage information storage memory 29 to check if the use condition is stored.

If the content key and the use condition are not found stored in the common-key storage memory 22 and the point usage information storage memory 29 respectively, the controller 16 sends information to the user terminal 50 indicating that the content key and the use condition do not exist. Based on this information, the user terminal 50 displays a message on the above-mentioned display device, prompting inputting of the content key and the use condition. In this case, the content key and the use condition are obtained as shown in the flowchart of obtaining the content key as described before. Thus, if the content key and the use condition are newly obtained, these encoded content key and use condition are decoded as in step ST104.

In step ST105, based on the decoded use condition, the controller 16 checks whether there is an enough balance of the point information stored in the point information storage memory 28. If the balance of the point information stored in the point information storage memory 28 is found running short, the controller 16 sends information to the user terminal 50 indicating the shortage. Based on this information, the user terminal 50 displays a message on the display device, prompting inputting of the point information. In this case, the point information is obtained as indicated in the flowchart of obtaining the point information described above.

When actually viewing the digital content, the controller 16 subtracts the point information count from the point information storage memory 28 according to the digital content to be viewed in step ST106 and stores the new point usage information corresponding to the usage state of this point information into the point usage information storage memory 29 (namely, updates the point usage information). The point usage information to be newly stored in the point usage information storage memory 29 includes proprietor information (such as copyright holder information) for the viewed digital content, information about the subtracted point information count, and so on.

In step ST107, the controller 16 confirms that the billing processing of subtracting the point information and newly storing the point usage information has been completed and then reads the digital content from the storage medium.

Because the digital content read from the storage medium is encoded, the controller 16 transfers this encoded digital content to the common-key encoding/decoding circuit 24 in step ST109.

Based on the instruction given by the controller 16, the common-key encoding/decoding circuit 24 decodes the encoded digital content by use of the content key decoded and stored beforehand in the common-key storage memory 22 in step ST110.

Because this digital content is compressed in a predetermined manner as described before, the controller 16 transfers the decoded but still compressed digital content from the common-key encoding/decoding circuit 24 to the decompressing circuit 26 in step ST111 to decompress.

In step ST112, the decompressed digital content is converted by the D/A converting circuit 27 into an analog signal. In step ST113, the analog signal is outputted outside (for example, to the user terminal 50) through the terminal 13 of the integrated circuit 10 and the analog output terminal 2 of the player 1.

Thus, the processing flow in the player 1 for viewing digital content has come to an end, allowing the user to view the digital content.

The following describes a processing flow in the player 1, the user terminal 50, and the administration center 211 for returning the point usage information newly stored in the point usage information storage medium 29 of the player 1 to the administration center 211 at the above-mentioned digital content viewing, with reference to FIGS. 2 and 3 and FIGS. 21 through 24.

Figure 21:
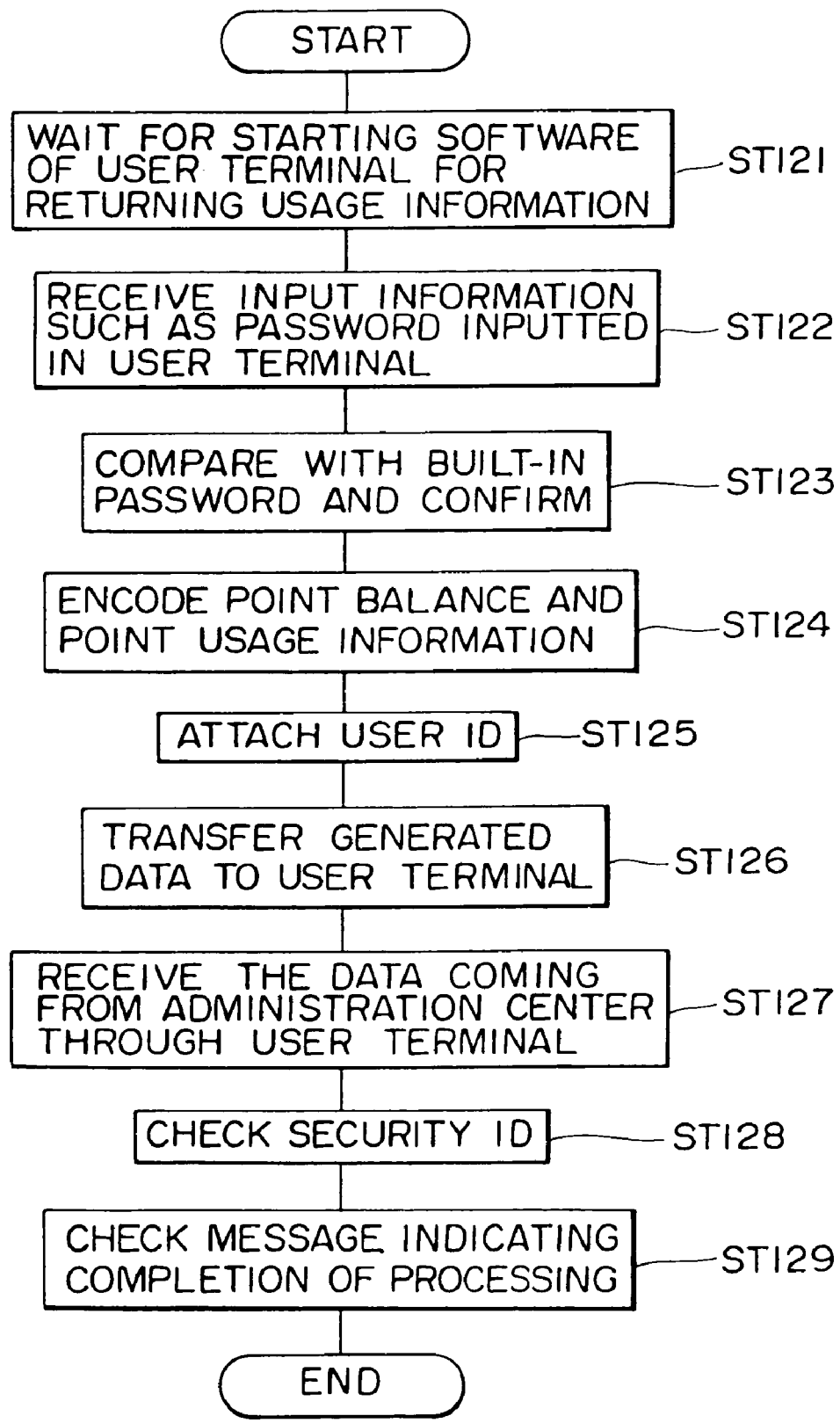
FIG. 21 is a flowchart indicative of a processing flow at the player at the time of returning point usage information in the above-mentioned embodied system.

FIG. 21 shows a processing flow in the player 1 at returning the point usage information.

In step ST121 shown in FIG. 21, the controller 16 waits until the software installed in the user terminal 50 beforehand for returning point usage information is started.

When the software of the user terminal 50 for returning point usage information is started, information inputted in the user terminal 50 according to the software is received through the PC interface terminal 3 and the terminal 12 of the integrated circuit 10 in step ST122. The input information supplied this time from the user terminal 50 includes a password inputted by the user.

In step ST123, receiving this content specification information from the user terminal 50, the controller 16 compares the password supplied from the user terminal 50 with the password stored in the password storage memory 14 to check if the supplied password is valid or not.

If the password is found valid, the controller 16 reads the balance of the point information stored in the point information storage memory 28 and the point usage information stored in the point usage information storage memory 29 in step ST124 and encodes these pieces of information.

When the balance of the point information and the point usage information have been encoded, the controller 16 reads the user ID from the user ID storage memory 23 and attaches this user ID to the above-mentioned encoded data in the step ST125.

In step ST126, the data attached with the above-mentioned user ID is transferred from the controller 16 to the user terminal 50 through the terminal 12 and the PC interface terminal 3. This data is then transferred to the administration center 211.

It should be noted that the above-mentioned encoding is also based on common-key encryption as described before. Namely, before transmission of the above-mentioned data, the common key is generated as described before, this generated common key is encoded by public-key encryption (by use of the public key of the administration center 211), and the encoded common key is sent to the administration center. 211 along with the user ID.

After the data is transferred to the user terminal 50, the controller 16 waits until the data to be described later comes from the administration center 211 through the user terminal 50.

In step ST127, receiving the data from the administration center 211, the player 1 decodes, by the common key, the received data encoded by use of common-key encryption and checks the validity of the decoded data. Namely, the controller 16 compares the security ID of the decoded data with the security ID supplied from the security ID generating circuit 19 to check the validity.

The data transferred from the administration center 211 includes a message indicating that the processing encoded by use of the above-mentioned common key has been completed. Therefore, after checking the validity of the security ID, the controller 16 sends the above-mentioned encoded message indicating completion of the processing to the common-key encoding/decoding circuit 24, causes this circuit to decode the message by use of the common key, and receives the decoded message, thereby confirming that the processing in the administration center 211 has been completed.

Thus, the processing flow in the player 1 for returning the point usage information has come to an end.

Figure 22:
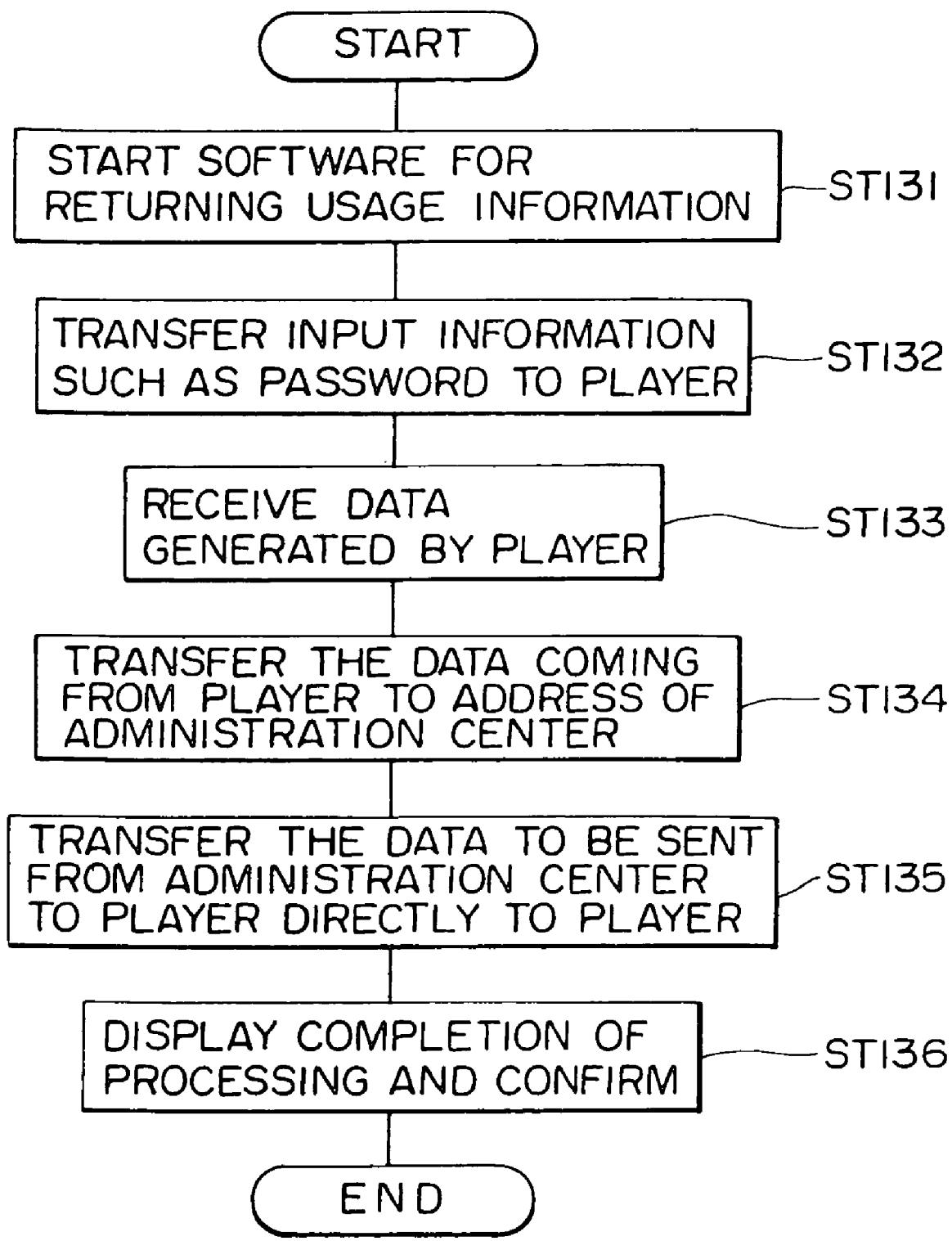
FIG. 22 is a flowchart indicative of a processing flow at the user terminal at the time of returning point usage information in the above-mentioned embodied system.

The following describes a processing flow in the user terminal 50 for returning point usage information with reference to FIG. 22.

Referring to FIG. 22, the user terminal 50 starts the software for returning point usage information in step ST131. When this software is started, the user terminal 50 requests, according to the software, the user of the user terminal 50 to input a password and so on. When the password is inputted by the user, the user terminal 50 transfers the inputted password to the player 1.

In step ST133, receiving the data generated by the player 1 as in step ST126 of FIG. 21, the user terminal 50 transfers, in step ST134, the data received from the player 1 to the administration center 211 of which address has been registered in advance.

After transferring the data to the administration center 211, the user terminal 50 waits for return from the administration center 211. Receiving the data to be transferred from the administration center 211 to the player 1, the user terminal 50 transfers that data to the player 1 directly in step ST135.

Transferring the data to the player 1, the user terminal 50 displays a message on the display device indicating that the processing has been completed and receives confirmation by the user.

Thus, the processing flow in the user terminal 50 for returning the point usage information has come to an end.

Figure 23:
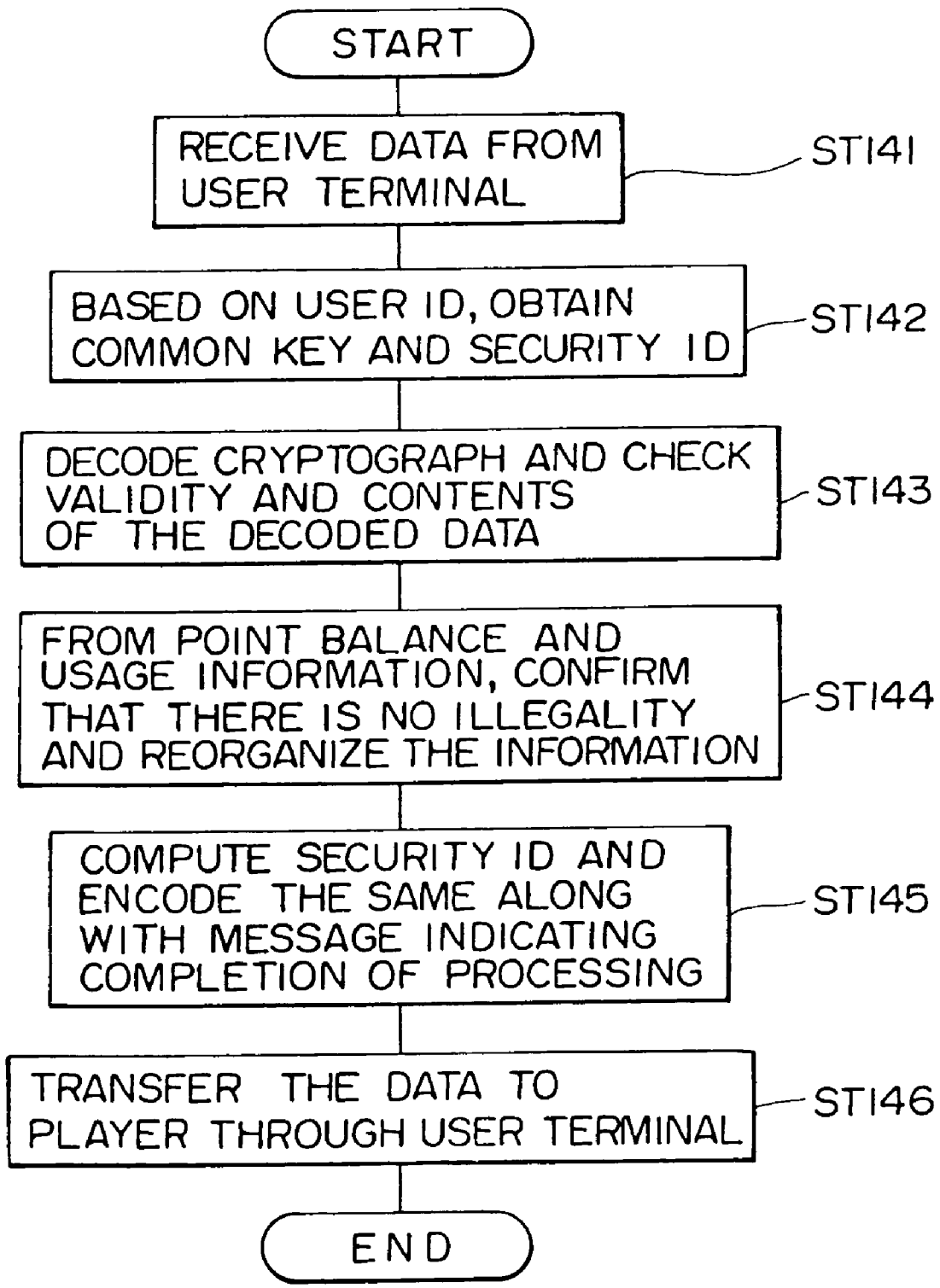
FIG. 23 is a flowchart indicative of a processing flow at the administration center at the time of returning point usage information in the above-mentioned embodied system.

The following describes a processing flow in the administration center 211 for returning point usage information with reference to FIG. 23.

In step ST141, the communication function block 133 of the administration center 211 interfacing the user terminal receives the data including point usage information from the player 1 through the user terminal 50 as in step ST126 of FIG. 21 and step ST134 of FIG. 22.

In step ST142, when this data is received, the user administration function block 110 of the administration center 211 obtains the received and stored common key from the database 112 as well as the security ID based on the user ID attached to the received data under the control of the control function block 111.

In step ST143, when the common key and the security ID corresponding to the above-mentioned user ID have been obtained from the database 112, the above-mentioned data including the encoded point usage information coming from the player 1 is decoded in the communication statement encoding/decoding function block 114 of the user administration function block 110 in the administration center 211 by use of the above-mentioned common key. In the control function block 111, the security ID in the decoded data is compared with the security ID read from the database 112 to check if the accessing user 200 (the player 1) is valid or not.

The data after proven valid and the contents thereof are transferred to the usage information administration function block 120. In step ST144, the control function block 121 of this usage information administration function block 120 checks the use by the user 200 for any invalidity by use of the balance of point information and the point usage information supplied from the player 1 and by use of the information stored in the database 122. At the same time, if no invalidity is found, a usage information computing function block 123 computes the balance of the point information and summarizes the point usage information.

Then, in step ST145, the control function block 111 of the user administration function block 110 controls the security ID generating function block 116 to compute the security ID and controls a confirmation message generating function block 115 to generate a-message indicating processing completion. These security ID and the processing completion message are encoded by the communication statement encoding/decoding function block 114 of the user administration function block 110 by use of the above-mentioned common key.

In step ST146, the above-mentioned generated encoded data is sent from the communication function block 133 to the user terminal 50 and then sent from the same to the player 1 as in step ST135 of FIG. 22 and step ST127 of FIG. 21.

Thus, the processing flow in the administration center 211 for returning the point usage information has come to an end.

Figure 24:
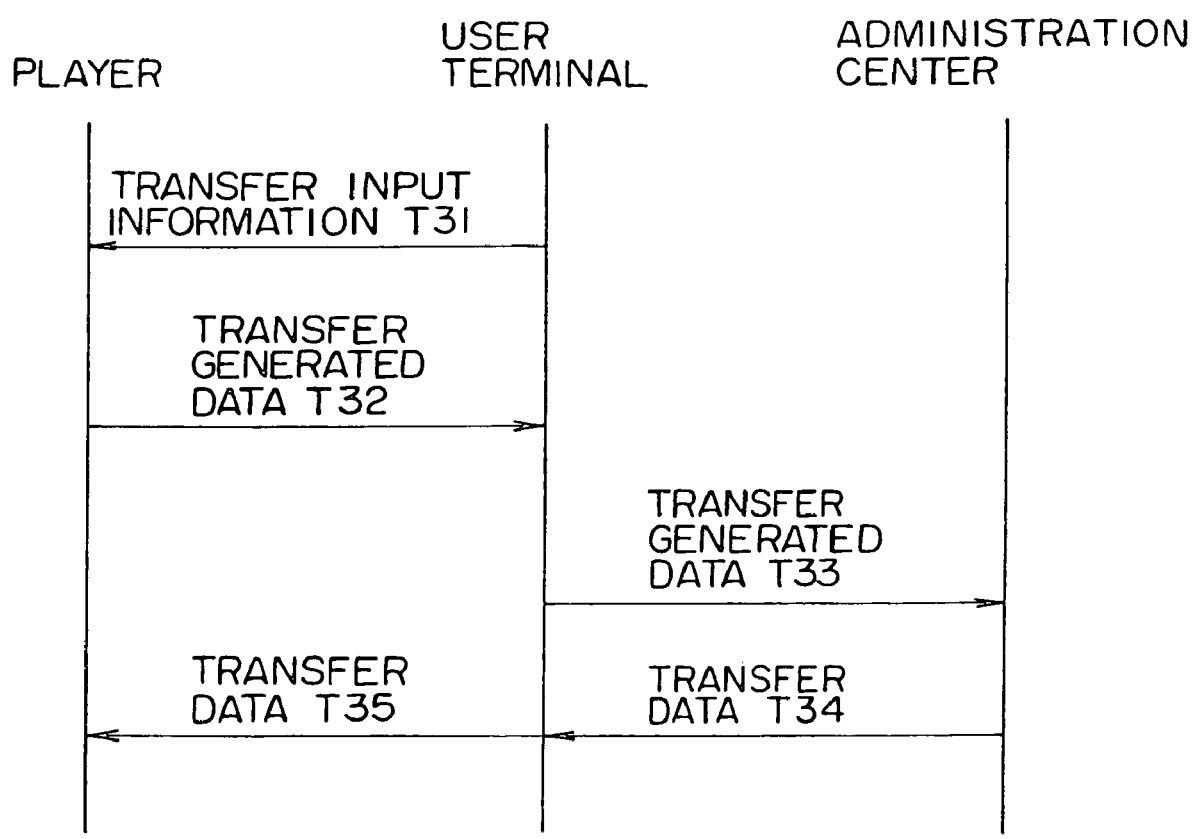
FIG. 24 is a diagram illustrating a sequence for information transfer to be performed at the time of returning point usage information in the above-mentioned embodied system.

The sequence of information transfer between the player 1, the user terminal 50, and the administration center 211 in the processing flow shown in FIGS. 21 through 23 is represented as shown in FIG. 24.

Namely, in an input information transfer operation T31, input information such as the above-mentioned password is transferred from the user terminal 50 to the player 1 as in step ST132 of FIG. 22. In a generated data transfer operation T32, the data generated by the player 1 is transferred to the user terminal 50 as in step ST126 of FIG. 21. In a generated data transfer operation T33, the data generated by the player 1 is transferred from the user terminal 50 to the administration center 211 as in step ST134 of FIG. 22. In a data transfer operation T34, the data generated by the administration center 211 is transferred to the user terminal 50 as in step ST146 of FIG. 23. In a data transfer T35, the data generated by the administration center 211 is transferred to the player 1 through the user terminal 50 as in step ST127 of FIG. 21.

The actual operations of the player 1, the user terminal 50, and the administration center 211 of the system of the present preferred embodiment flow as described above.

So far, the entire processing flow in the system of the present preferred embodiment has been described. In what follows, the operation of each main component of the system of the present preferred embodiment will be described in detail.

First, encoding and compressing operations and decompressing and decoding operations in the present preferred embodiment will be described.

Distribution of digital content through a network as practiced in the present preferred embodiment requires to use a compression/decompression technique to reduce the data amount of the content and a encoding/decoding technique to prevent data duplication or secure billing. Namely, the distributing side (in the above-mentioned example, the administration center 211) compresses and then encodes digital content. When the digital content (encoded and compressed data) generated by the distributing side (the administration center 211) as with the above-mentioned example is distributed through a network, the receiving side (in the above-mentioned example, the player 1) receives the encoded and compressed digital content and then decodes and decompresses the same into the original form. It should be noted that the order in which encoding and compressing are performed and the order in which decoding and decompressing are performed may be altered.

If the above-mentioned digital content includes copyright or the like, the above-mentioned receiving side is billed according to the intention of the holder of the copyright before decoding and decompressing the digital content. This billing is performed mainly by purchasing the key for decoding, namely the content key. There are various methods in which this content key is purchased.

If the processing procedure in which digital content is compressed and then encoded and then decoded and decompressed as mentioned above is followed, a malicious user for example can obtain the decoded and compressed data with comparative ease. Namely, the compressed data of digital content is generally large in quantity and therefore is often stored in an internal memory of a general content reproducing device of the receiving side but a less costly external memory for example. Therefore, it is easy for such a user to illegally obtain the compressed digital content directly from the external memory or from a portion connecting to thereto.

Algorithms of decompressing compressed data are made public in many cases. In addition, these decompressing algorithms are not ones that cannot be processed if hidden like general encryption keys. And, the decoded and compressed digital content remains unchanged in data quantity as compared with the encoded and compressed digital content distributed from the sending side. Therefore, it is also easy to distribute, with malicious intention, the decoded and compressed digital content. Namely, the above-mentioned method in which compressed and then encoded digital content is distributed poses a high risk that the compressed digital content that can be decompressed by anyone with ease is illegally accessed with ease by a malicious user for illegal redistribution or decompression.

Figure 25:
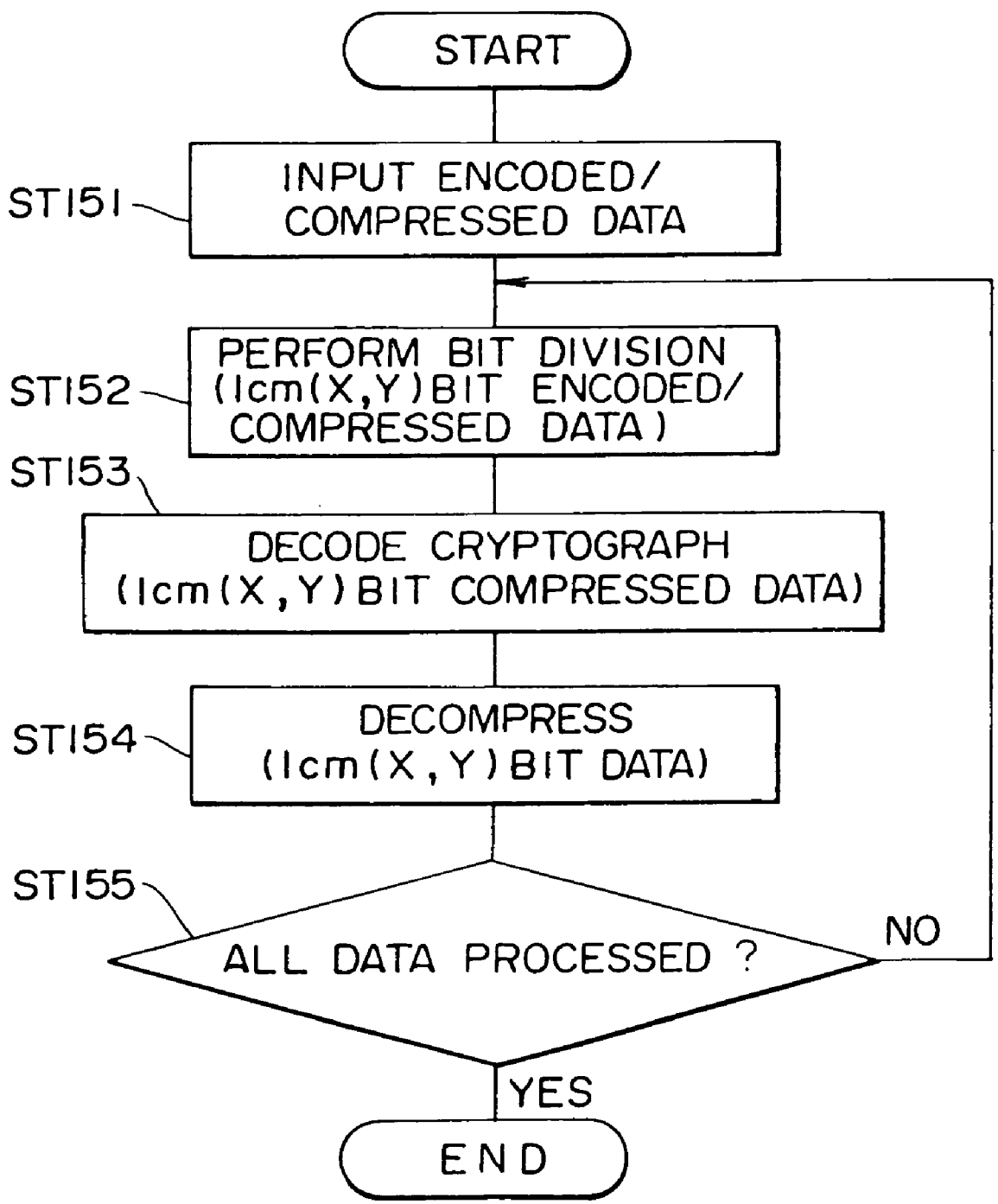
FIG. 25 is a flowchart indicative of a processing flow of performing decryption and decompression by the least common multiple of the processing unit of encryption and compression.

Therefore, in the present preferred embodiment, in order to enhance the security of the digital content to be distributed through a network, the processing indicated by a flowchart shown in FIG. 25 is performed in the player 1 shown in FIG. 2.

To be more specific, in the decoding processing by the common-key encoding/decoding circuit 24 of the player 1 shown in FIG. 2 and the decompressing processing by the decompressing circuit 26, the data of encoded and compressed digital content read from the above-mentioned storage medium is first divided into units of least common multiple lcm(X,Y) of processing unit X bits of decoding algorithm and processing unit Y bits of decompressing algorithm.

Then, the data of encoded and compressed digital content divided into least common multiple lcm(X,Y) units is decoded by the common-key encoding/decoding circuit 24 in units of the least common multiple lcm(X,Y) in step ST152.

The resultant data of digital content compressed in units of the least common multiple lcm(X,Y) obtained by the above-mentioned decoding processing is decompressed by the decompressing circuit 26 in all compressed data for the units in step ST154.

Then, the decoding and decompressing processing in units of this least common multiple lcm(X,Y) are repeated until the processing of all data of the encoded and compressed digital content has been completed. Namely, in step ST155, it is determined whether decoding and decompression in units of least common multiple lcm(X,Y) have been completed on all data of the digital content. If the decoding and decompression are found not completed, the process returns to step ST152. If the decoding and decompression are found completed, the processing indicated by the above-mentioned flowchart comes to an end.

Thus, the digital content with all data decoded and decompressed can be obtained.

It should be noted that, in the processing by the player 1 indicated by the flowchart of FIG. 25, the above-mentioned decoded data in units of least common multiple lcm(X,Y) exists, but the data quantity of this decoded data is small. Therefore, the data can be stored in the internal memory that is comparatively costly but high in security. This significantly lowers the risk of illegal access of the data, which is highly possible when the data is stored in an external memory device described before.

In the player 1 of the present preferred embodiment, a buffer memory 25 shown in FIG. 2 is provided as an internal memory for ensuring the above-mentioned data security between the common-key encoding/decoding circuit 24 and the decompressing circuit 26. To be more specific, this buffer memory 25 is installed on the integrated circuit 10 of one chip, thereby making difficult the access from the outside, preventing the data from being taken outside.

Figure 26:
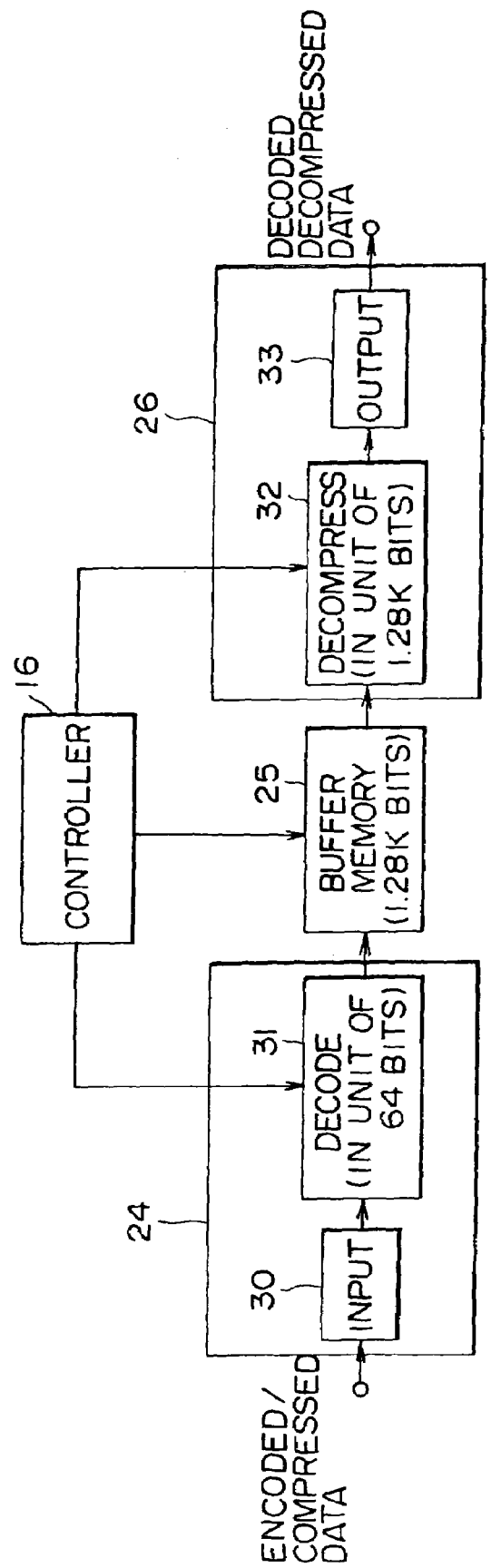
FIG. 26 is a block diagram illustrating a constitution for performing decryption and decompression in unit of the least common multiple of the processing unit of encryption and compression.

In the above-mentioned flowchart, decoding and decompression are performed on all data for the units of least common multiple lcm(X,Y). Therefore, a specific constitution, as shown in FIG. 26 for example, realizes the above-mentioned decoding and decompression in units of least common multiple lcm(X,Y) by dividing the data of digital content into processing unit X bits of the algorithm of decoding processing, decoding processing is performed on the X bits of data, then collecting X bits of compressed data on which decoding processing has been performed into Y bits of processing units of the algorithm of decompressing processing, and decompressing the Y bits of compressed data.

The common-key encoding/decoding circuit 24 of the player 1 for realizing the above-mentioned processing is composed of an input block 30 and an decode block 31 and the above-mentioned decompressing circuit 26 is composed of a decompress block 32 and an output block 33. The above-mentioned buffer memory 25 is arranged between these common-key encoding/decoding circuit 24 and the decompressing circuit 26.

If the encoding processing for the above-mentioned digital content is performed based on DES (Data Encryption Standard) as a more specific example, this encoding processing and the corresponding decoding processing are performed in units of 64 bits.

The decompressing processing for compressed digital content is currently often performed in units of 1K to 2K bits/channel although depending on a compression ratio and a sampling frequency used. It is assumed here for the sake of convenience that the decompression processing be performed in units of 1.28K bits.

Therefore, in a system using the above-mentioned DES encryption and compression/decompression in units of 1.28K bits, the above-mentioned least common multiple lcm becomes 1.28K.

Under such conditions, the above-mentioned encoded and compressed digital content is inputted in the input block 30 of the common-key encoding/decoding circuit 24 shown in FIG. 26. In the input block 30, the encoded and compressed digital content is divided into X bits of processing units of the algorithm of the above-mentioned decoding processing, namely 64 bits of data, which are then outputted to the decode block 31.

The decode block 31 decodes the above-mentioned X-bit data, namely the 64-bit data, in units of 64 bits. The resultant 64-bit compressed data is sent to the buffer memory 25.

According to an instruction from the controller 16, the buffer memory 25 outputs in a batch the 1.28K bits of compressed data when Y bits of processing unit of the algorithm of decompression processing, namely 1.28K bits of compressed data have been accumulated. The outputted compressed data is sent to the decompressing block 32 of the decompressing circuit 26.

The decompress block 32 decompresses the inputted 1.28K bits of compressed data and outputs the resultant decompressed data to the output block 33.

The controller 16 controls the processing in the decode block 31 and the processing in the decompress block 32 while monitoring the amount of data accumulated in the buffer memory 25.

It should be noted that, in the above-mentioned case, performing the decoding processing in units of 20 (=1280/64) concurrently provides a faster processing system.

In addition, unlike the hardware constitutions shown in FIGS. 2 and 26, if the above-mentioned processing is performed based on a programmable device, the controller 16 for example performs the processing based on a decoding program or a decompressing program according to the storage status of the buffer memory 25.

In the description made so far, the example in which the compressed and then encoded digital content is supplied to the player 1 and the player 1 decodes and then decompresses this digital content is used. It will be apparent that the same effect as above can be obtained by decompressing and decoding encoded and then compressed digital content.

It should also be noted that the present invention is not restricted to the above-mentioned compressing/decompressing and encoding/decoding algorithms.

Thus, according to the present invention, the security of digital content transferred through a network is enhanced.

The following describes the operation of generating the above-mentioned security ID.

In the method, like the present embodiment, in which point information is obtained beforehand and the obtained point information is decremented afterward according to the viewing of digital content, the administration center 211 on the network receives a request for point information purchase from the user terminal 50 of the user 200, makes confirmation with the finance organization 220 and others, encodes that point information, and sends the encoded point information to the player 1 of the user 200 through the network.

If, like the present embodiment, point information is obtained beforehand and the obtained point information is decremented afterward according to the viewing of digital content, transfer of similar data (for example, encoded information "request for replenishment of 3,000 yen of point information" and corresponding information "3,000 yen of point information") between the administration center 211 and the player 1 (the user terminal 50) every time point information is purchased poses a problem of money replenishment based on so-called "spoofing" the finance organization 220 by a malicious person for example. Spoofing the finance organization herein denotes that a malicious person disguises himself as an authentic user (the user 200 in the present embodiment) to illegally obtain point information, for example.

Namely, if similar data is transferred every time point information is purchased, a malicious person taps that data from the communication line, generates the similar data, and requests the administration center 211 for sending point information to that malicious person. If this happens, the malicious person can get point information illegally and have the fee for the illegally obtained point information be billed to the authentic user 200.

In order to prevent such an illegal act from happening, the system according to the present embodiment uses random numbers generated by a random number generating capability operatively associated with both the receiving side (the player 1) and the distributing side (the administration center 211). In the present embodiment, the above-mentioned security ID is generated as these random numbers. It should be noted that the random number generation can be operatively associated between the receiving side and the distributing side by synchronizing the operations of both side by initializing the timer 18 for example at user registration sequence for example.

To be more specific, an operation of obtaining point information for example by the player 1 from the administration center 211 by use of a random number (namely the security ID) is performed as follows.

Data to be sent from the administration center 211 to the player 1 at purchasing point information includes point information encoded by the common key (the session key) previously obtained from the player 1 and the security ID generated as described before for example.

The controller 16 of the player 1 sends the data received from the administration center 211 to the common-key encoding/decoding circuit 24 as described before for the decoding processing by use of the common key. Thus, the point information and the security ID sent from the administration center 211 have been obtained.

Then, the controller 16 of the player 1 compares the security ID received from the administration center 211 with the security ID generated by the security ID generating circuit 19 of the controller 16. If a match is found between the security ID received from the administration center 211 and the security ID generated by the security ID generating circuit 19, the controller 16 stores the point information received from the administration center 211 into the point information storage memory 28.

Thus, only the player 1 of the approved user 200 can obtain the point information. In other words, if a malicious person having a player similar to the player 1 of the approved user 200 attempts to illegally access the point information by spoofing, the security ID of the player of that malicious person does not match the security ID received from the administration center, thereby defeating such an attempt.

The security ID generated by the player 1 of the user 200 is generated in the security ID generating circuit 19 installed in the integrated circuit 10 of the player 1 and therefore cannot be accessed from the outside, thereby preventing any malicious persons from stealing this security ID.

Figure 27:
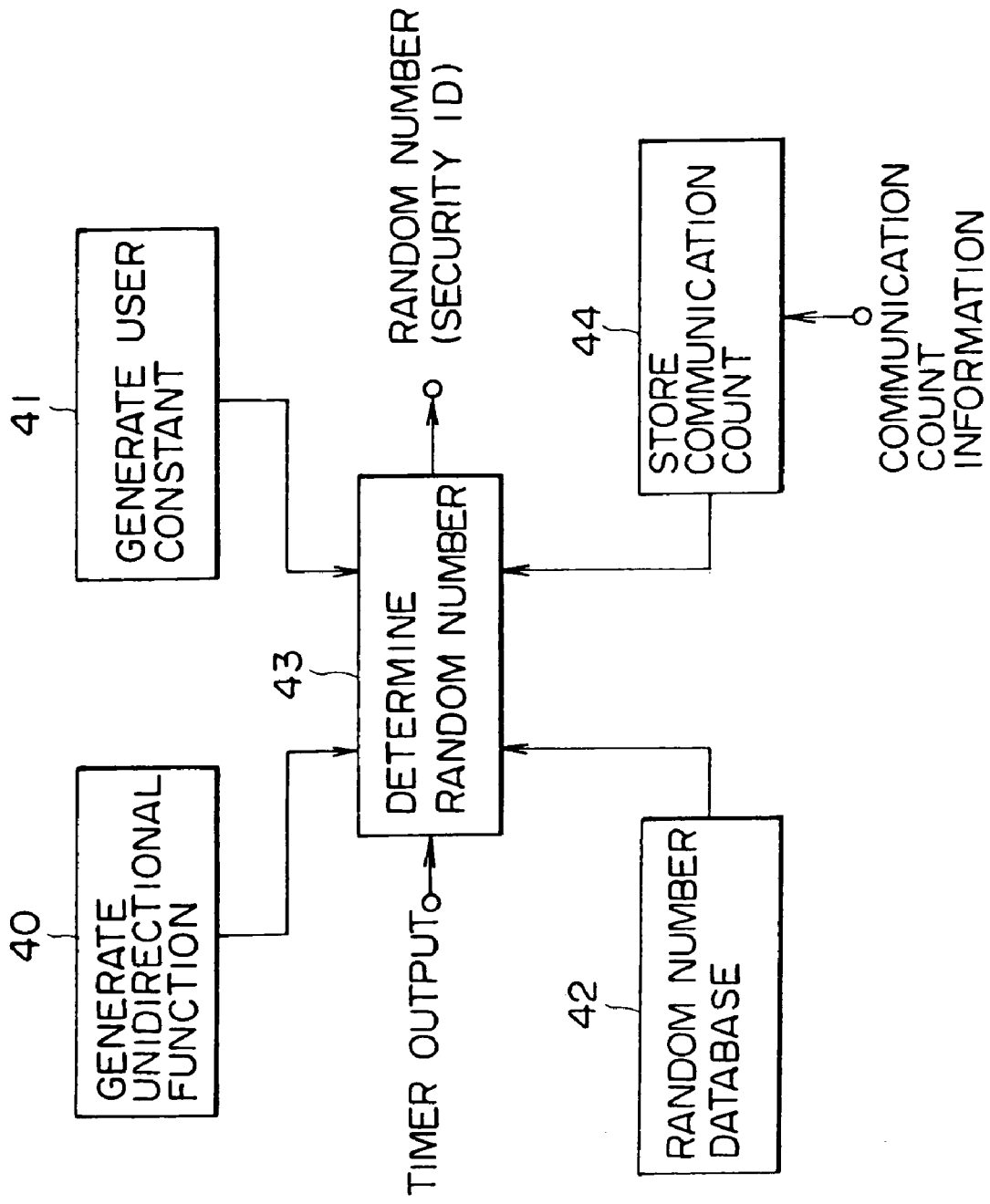
FIG. 27 is a block diagram illustrating a specific constitution for generating random numbers as a security ID.

Various constitutions are available that generate a random number as the security ID. One of these constitutions is shown in FIG. 27 by way of example. Shown in FIG. 27 is a specific example of the security ID generating circuit 19 shown in FIG. 2.

Referring to FIG. 27, a unidirectional function generating circuit 40 generates a so-called unidirectional function. The unidirectional function is comparatively easy to calculate but its reverse functioning is far difficult to perform. This unidirectional function may also be received beforehand by confidential communication for example to be stored in the unidirectional function generating circuit 40. It should be noted that the unidirectional function generating circuit 40 may also be adapted to generate the above-mentioned unidirectional function by use of time information from the timer 18 in the integrated circuit 10 as an input function. The generated unidirectional function is then sent to a random number decision circuit 43.

A user constant generating circuit 41 generates a predetermined user constant specified for each user. This user constant is sent beforehand by confidential communication for example and stored in the user constant generating block 41. It should be noted that, for this user constant, the user ID stored in the user ID storage memory 23 may be used for example.

A random number database 42 stores random numbers, for example 99 random numbers.

A communication count storage circuit 44 stores communication count information sent from the controller 16 for example. The communication count information indicates the number of times communication has been made between the player 1 and the administration center 211.

These unidirectional function, user constant, and communication count information are sent to the random number decision circuit 43. The random number decision circuit 43, based on the time information received from the timer 18, generates random numbers in a range (for example, 99 random numbers) stored in the random number database 42 from the above-mentioned unidirectional function and user constant.

To be more specific, if the communication count information indicates the first communication for example, the random number decision circuit 43 takes the 99th random number from the random number database 42. If the communication count information indicates nth communication for example, the random number decision circuit 43 takes the 100-nth random number from the random number database 42. The obtained random number is then outputted as the above-mentioned security ID.

The constitution of this security ID generation is the same on both the player 1 and the administration center 211.

When the random numbers stored in the random number database 42 have all been used, 100th to 199th random numbers are newly computed in the random number decision block 42 or new random numbers or unidirectional functions are sent by confidential communication, storing the new random numbers in the random number database 42 or incorporating the unidirectional functions in the unidirectional function generating circuit 40.

In the above description, the security of every communication is enhanced by generating random numbers (the security ID). In the present embodiment, a different common key (a session key) is programmably generated every time communication is made between the user 200 and the administration center 211, thereby enhancing the security still further.

Figure 28:
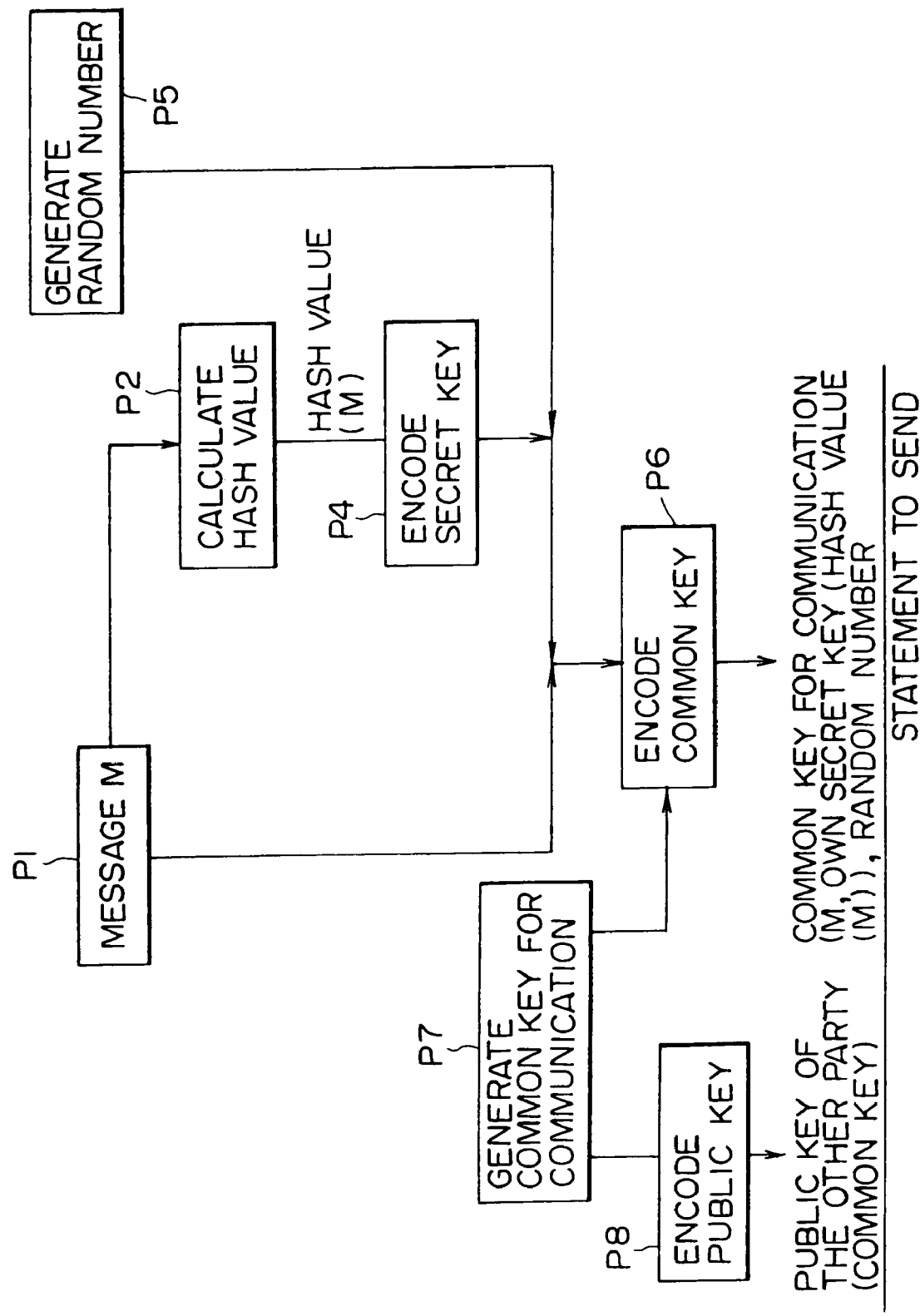
FIG. 28 is a diagram illustrating an operation in which random numbers are inserted when encrypting a common key by public key encryption to transmit the encrypted common key.
Figure 29:
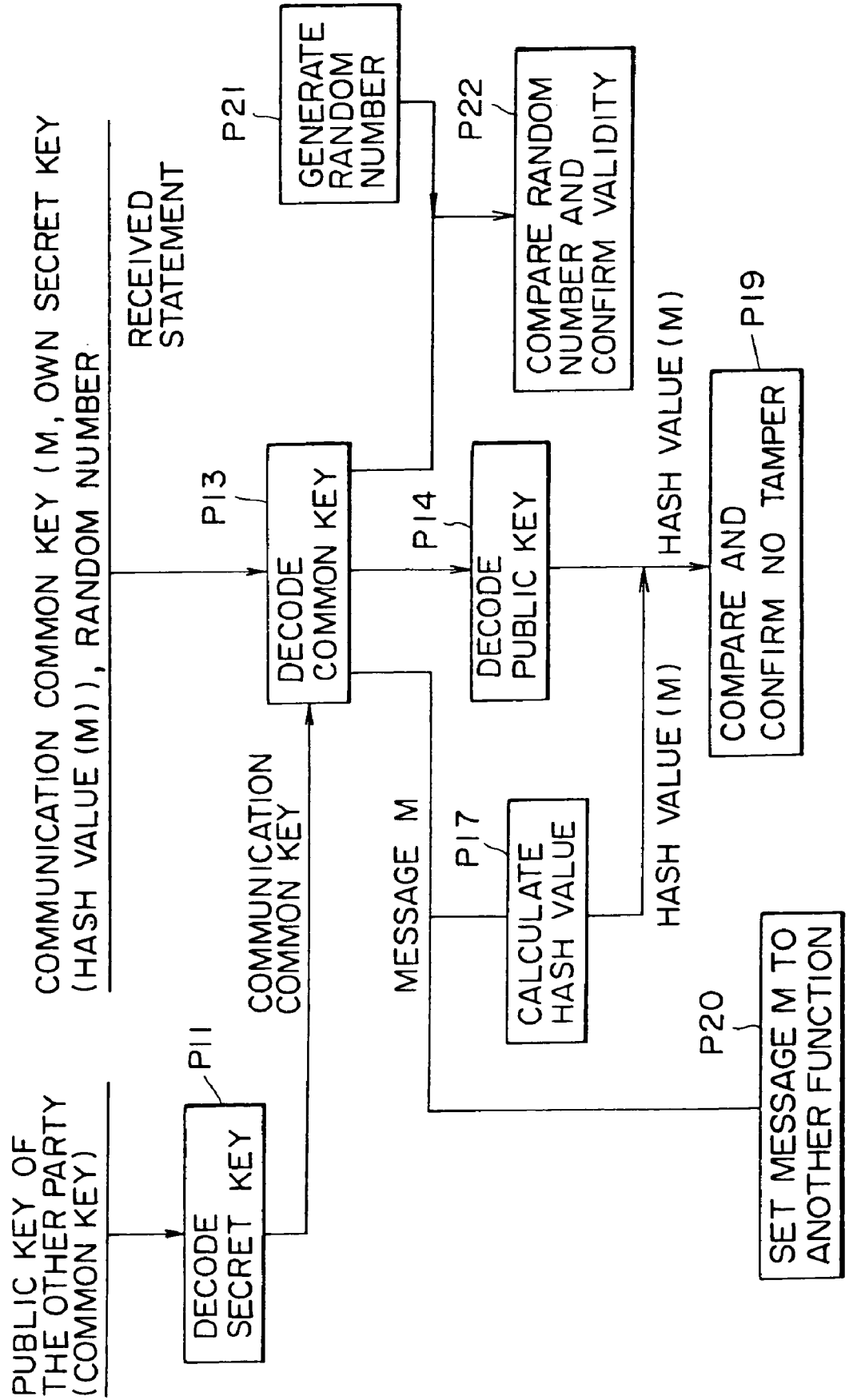
FIG. 29 is a diagram illustrating an operation in which random numbers are extracted from a received statement for checking validity.

The following describes a manner in which a random number is inserted in a send statement (for example, a message) to be actually transmitted and this statement is encoded by the session key and a manner in which the random number is taken out of the received statement for validity check with reference to FIGS. 28 and 29. It should be noted that, in the examples of FIGS. 28 and 29, a signature (namely, a digital signature) is attached to the statement to send.

Referring to FIG. 28, in encoding the above-mentioned common key by public-key encryption to sent the encoded key, the above-mentioned session key is generated as a key for use in communication in communication common key generating process P7 and this common key is encoded by the public key of the receiving side in public key encoding process P8. The encoded common key is then sent to the receiving side.

On the other hand, in encoding a message as a send statement by common-key encryption to send the encoded message, a message M is generated in message generating process P1 for example and a random number (the above-mentioned security ID) is generated in random number generating process P5. These generated message M and the random number are sent to common key encoding process P6. In this common key encoding process P6, the message M and the random number are encoded by use of the common key generated in the above-mentioned communication common key generating process P7.

If the above-mentioned digital signature is attached, the message M is sent to a hash value computing process P2. In the hash value computing process P2, a so-called hash value is computed from the message M. It should be noted that a hash value is address information obtained by hashing. In hashing, a predetermined computation is performed on one part (a keyword) of data (in this case, the message M) and the result of this computation is used as an address. A hash value (M) obtained from this message is sent to secret key encoding process P4 as a digital signature. In this secret key encoding process P4, the above-mentioned digital signature is encoded by the secret key of the sending side. The encoded digital signature is sent to common key encoding process P6. In the common key encoding process P6, the digital signature is encoded by use of the common key generated in the above-mentioned communication common key generating process P7.

These message M, digital signature, and random number are sent to the receiving side.

The following describes a processing flow in the receiving side corresponding to the sending side shown in FIG. 28 with reference to FIG. 29.

Referring to FIG. 29, in decoding the above-mentioned common key by public key encryption, the common key received from the sending side is decoded by the secret key of the receiving side in secret key decoding process P11.

On the other hand, in decoding the message M encoded by common-key encryption, the received message M is decoded, in common-key decoding process P13, by use of the common key decoded in the above-mentioned secret key decoding process P11. The decoded message M is set to another process in other function sending process P20.

In decoding the digital signature, the hash value decoded in the above-mentioned common-key decoding process P13 is decoded by use of the public key of the sending side in public-key decoding process P14. At the same time, in hash value computing process P17, the hash value is computed from the message M. The hash value decoded by public-key decoding process P14 is compared with the hash value computed in hash value computing process P17 to check for any falsification.

Further, the random number decoded in the above-mentioned common-key decoding process P13 is compared with the random number generated in random number generating process P21 of the receiving side in validity checking process P22 for checking validity.

Meanwhile, in the system according to the present embodiment shown in FIG. 1, the system administration company 210, the virtual store 230, and the content provider 240 are provided as the system side as opposed to the user 200. It should be noted that the finance organization 220 shown in FIG. 1 is an external band or the like.

The administration center 211 of the system administration company 210 performs almost all main operations of the system side such as managing the display and distribution of digital content in the virtual store 230, collection, distribution, and management of the billing information and various other information transferred between the finance organization 220 and the user 200, encoding of digital content supplied from the content provider 240, and controlling the security of information to be handled.

However, in the above-mentioned system for distributing digital content through a network, communication concentrates on the system side when the user side obtains digital content from the system side and the user side is billed for the use of digital content, presenting the fear of failing to provide a satisfactory response to the user side.

Therefore, in another preferred embodiment of the present invention, the capability of the system administration company 210, to be more specific, the capability of the administration center 211 is divided as follows to prevent the concentration of communication from happening, thereby enhancing the communication response.

Namely, in the second preferred embodiment of the present invention, the constitution of the system side as opposed to the user 200 is divided into a content display and distribution organization 310 for displaying and distributing digital content, a billing information administration organization 320 for managing the billing information of users in a certain area, and a system administration organization 330 for generating data for encoding digital content, distributing the generated data to the above-mentioned content display and distribution organization 310, gathering information from the above-mentioned billing information administration organization 320, distributing earnings, and managing the security of the entire system. In this second embodiment, the above-mentioned organizations 310, 320, and 330 can independently communicate with the user 200.

Figure 30:
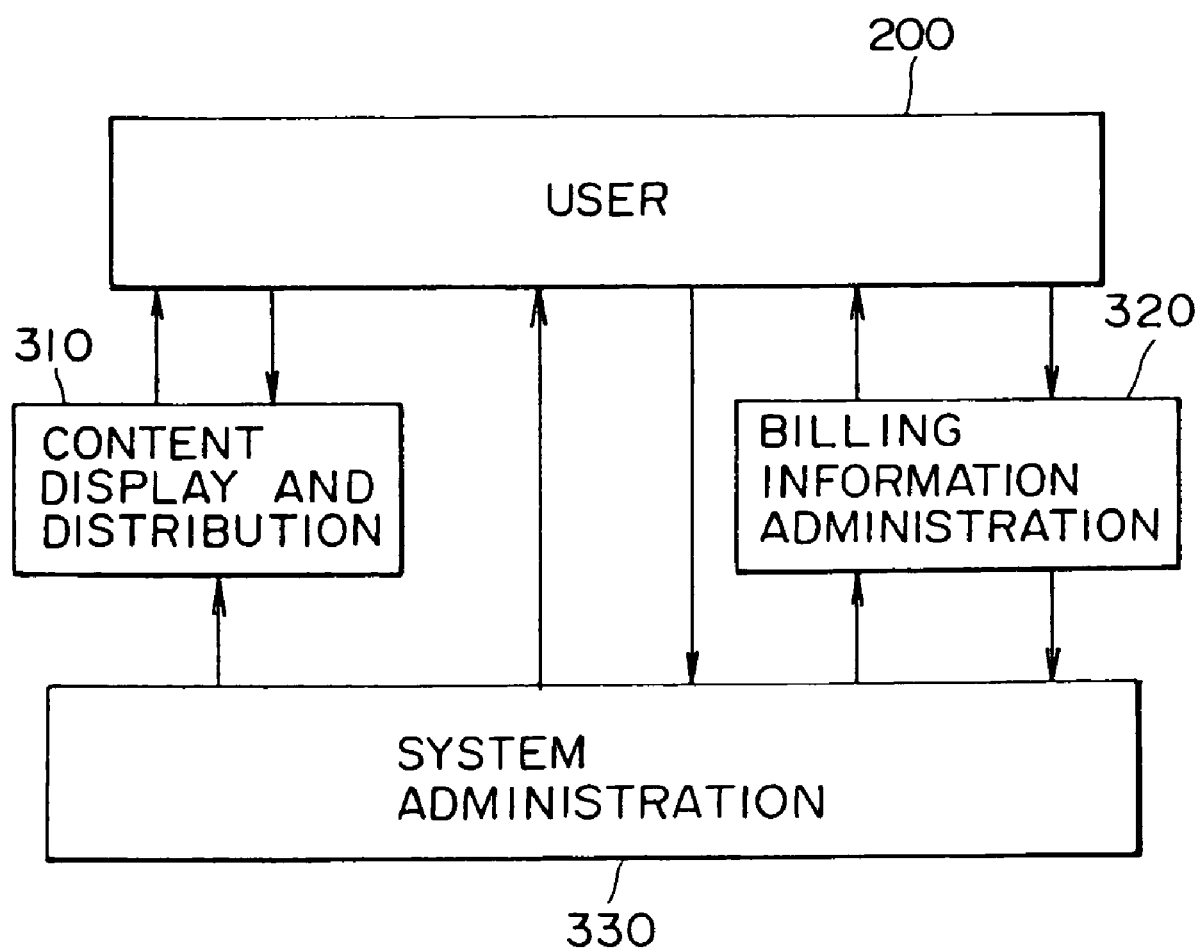
FIG. 30 is a diagram for describing each organization when the system capability is divided.

In the constitution as shown in FIG. 30, the content display and distribution organization 310 can be arranged in plural units on networks all over the world. The user 200 can access the content display and distribution organization 310 in any region by paying communication fee. For example, if the user 200 wants to obtain digital content, the user 200 accesses the content display and distribution organization 310. The digital content thus obtained is one encoded by the system administration organization 330, namely the digital content enabled for direct sending to the user 200 through a network.

It is not desirable for the billing information administration organization 320 to manage too many users in terms of security management. Therefore, the billing information administration organization is so installed in each region as to manage an appropriate number of users. However, installing too many billing information administration organizations increases the number of attack points (the target of this attack is the billing information administration organization 320) by a malicious third party. Therefore, in consideration of tradeoff, the number of billing information administration organizations to be installed must be optimized. For example, if the user 200 performs communication associated with billing, the user 200 accesses the billing information administration organization 320, not vice versa.

The system administration organization 330 enhances security by collectively performing application of subscription by user to the system, registration of a settlement method, collection of fees from the users, and distribution of earnings to the proprietors, the content display and distribution organization 310, the billing information administration organization 320, and so on. However, preferably, the system administration organization 330 is installed not in only one place in the world but in units of countries for example. For example, if the user 200 performs communication that is important in terms of security for the subscription or the registration of settlement method, the user 200 accesses the system administration organization 330, not vice versa. Collection of fees from users and distribution of earnings to the above-mentioned organizations are collectively performed by the system administration organization 330 that obtained the associated information from the billing information administration organization 320. Source data owned by a copyright holder and so on, namely content, is supplied to the system administration organization 330 to be converted into encoded digital content, which is distributed to the content display and distribution organization 310.

As described above, the capability of the system side is divided into three organizations 310, 320, and 330 for example and direct access is made between the user side 200 and each of these organizations 310, 320, and 330, so that the concentration of communication is avoided, thereby enhancing the response in communication. The content display and distribution organization 310 is compatible with an existing so-called virtual mall, thereby making this organization effective also for sales promotion and appealing to users. Separately providing the billing information administration organization 320 can prevent illegal activities in combination with content display and sale capabilities for example. In addition, this constitution can limit the number of users to be managed to a certain level, the management against illegal activities can be performed efficiently.

The following describes the flow of information at subscription by user to the system, purchasing point information, and obtaining a content key for decoding encoded digital content, the flow of information at distributing content and information for viewing the same, and the flow of billing information caused by the use of content in the system practiced as the second preferred embodiment shown in FIG. 30.

Figure 31:
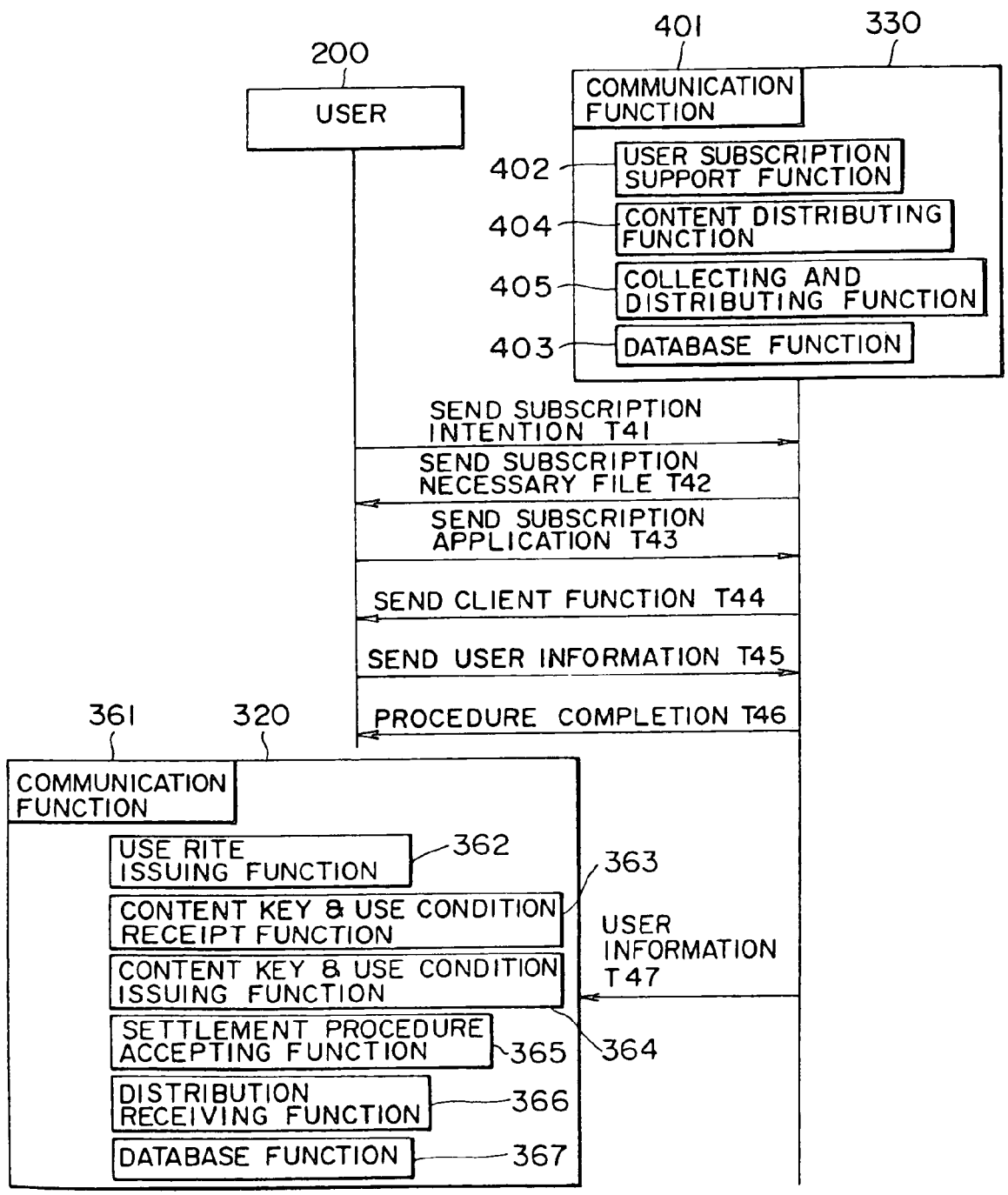
FIG. 31 is diagram for describing a main portion of a processing flow at the time of user subscription to the system in an embodiment in which the system capability is divided.

First, referring to FIG. 31, the main portion of the flow of information at subscription by the user to the system will be described.

When subscription by the user to the system is registered, the registration is performed in the following procedure to be carried out by a user subscription support function block 402 of the system administration organization 330.

First, as indicated in a subscription application sending operation T41, information indicative of the intention of subscription to the system is sent from the user 200, namely the player 1, and the user terminal 50 to the system administration organization 330 through a network. The information indicative of the intention of subscription inputted in a communication function block 401 of the system administration organization 330 is then sent to the user subscription support junction block 402.

Receiving the information, the user subscription support function block 402 sends information of a file necessary for subscription to the user 200 through the communication function block 401 as shown in a subscription necessary file sending operation T42.

Based on the subscription necessary file received from the system administration organization 330, the user 200 generates a subscription application complying to a predetermined format. The generated subscription application is sent to the system administration organization 330 as indicated in a subscription application sending operation T43.

Receiving the subscription application, the user subscription support function block 402 sends information for describing the client capabilities to the user 200 as indicated in a client capability sending operation T44.

Receiving the client capability information, the user 200 sends user information such as account number, credit number, user name and address to the system administration organization 330 as indicated in a user information sending operation T45.

Receiving the user information, the user subscription support function block 402 notifies the user 200 of the information that the registration of subscription has been completed as indicated in a registration procedure completion notifying operation T46.

When the procedure of this user subscription registration has been completed, the user subscription support function block 402 of the system administration organization 330 transfers user information to the billing information administration organization 320 through the communication function block 401 as indicated in a user information sending operation T47. Receiving the user information, the billing information administration organization 320 stores the received user information in the database function block 367.

Thus, the processing flow at subscription by the user to the system has come to an end. It should be noted that another constitution shown in FIG. 31 will be described later.

The following describes the main portion of the flow of information at purchasing point information and obtaining a key for decoding encoded digital content. It should be noted that the information about the point information purchase and the information about the content key for decoding encoded digital content are for use of content, so that these pieces of information will be hereafter referred to simply as use right information.

When the user obtains important information (the use right of content) to be used in the system, the user 200 accesses the billing information administration organization 320 allocated to each user 200 beforehand. Access for requesting to obtain the content use right information from the user 200 is handled by a use right issuing function block 362 of the billing information administration organization 320. The use right is issued in the following procedure.

First, from the user 200, information indicating the intention of purchasing use right is sent to the billing information administration organization 320 as indicated in a purchase request sending operation T51. This information is about a purchase request formatted in a predetermined manner. The purchase request information inputted in the communication function block 361 of the billing information administration organization 320 through a network is then sent to the use right issuing function block 362.

Receiving the purchase request information, the use right issuing function block 362 generates new use right information based on the user information stored in the database function block 367 and sends the generated use right information to the user 200 as indicated in a new use right sending operation T52.

Checking the reception of the new use right information, the user 200 generates a receipt confirmation formatted in a predetermined manner and sends the generated receipt confirmation to the use right issuing function block 362 of the billing information administration organization 320 as indicated in a receipt confirmation sending operation T53.

Figure 32:
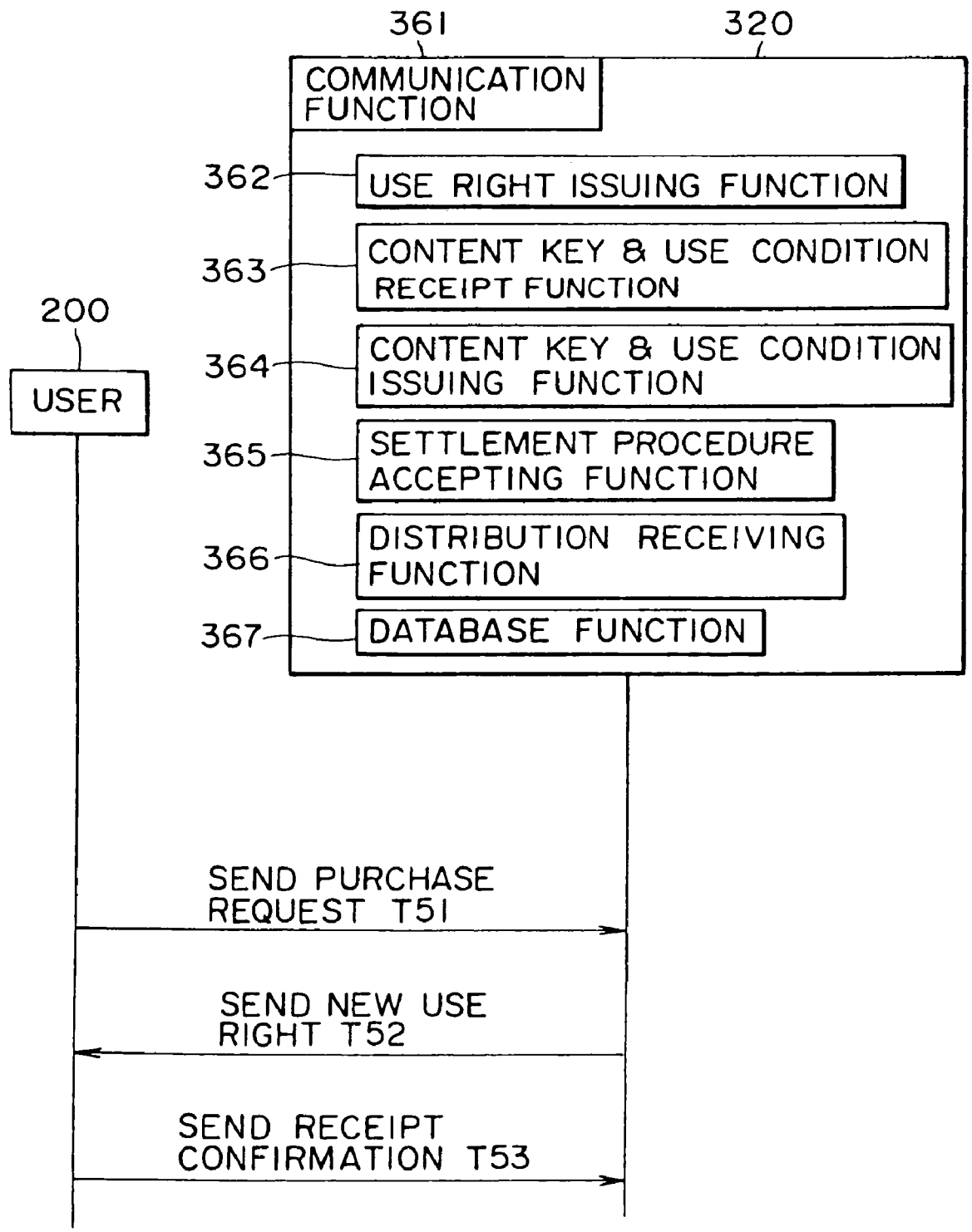
FIG. 32 is a diagram for describing a main portion of an information flow at the time of purchasing point information and acquiring a key for decrypting encrypted digital content in the embodiment in which the system capability is divided.

Thus, the main flow of use right purchasing has come to an end. It should be noted that another constitution shown in FIG. 32 will be described later.

Figure 33:
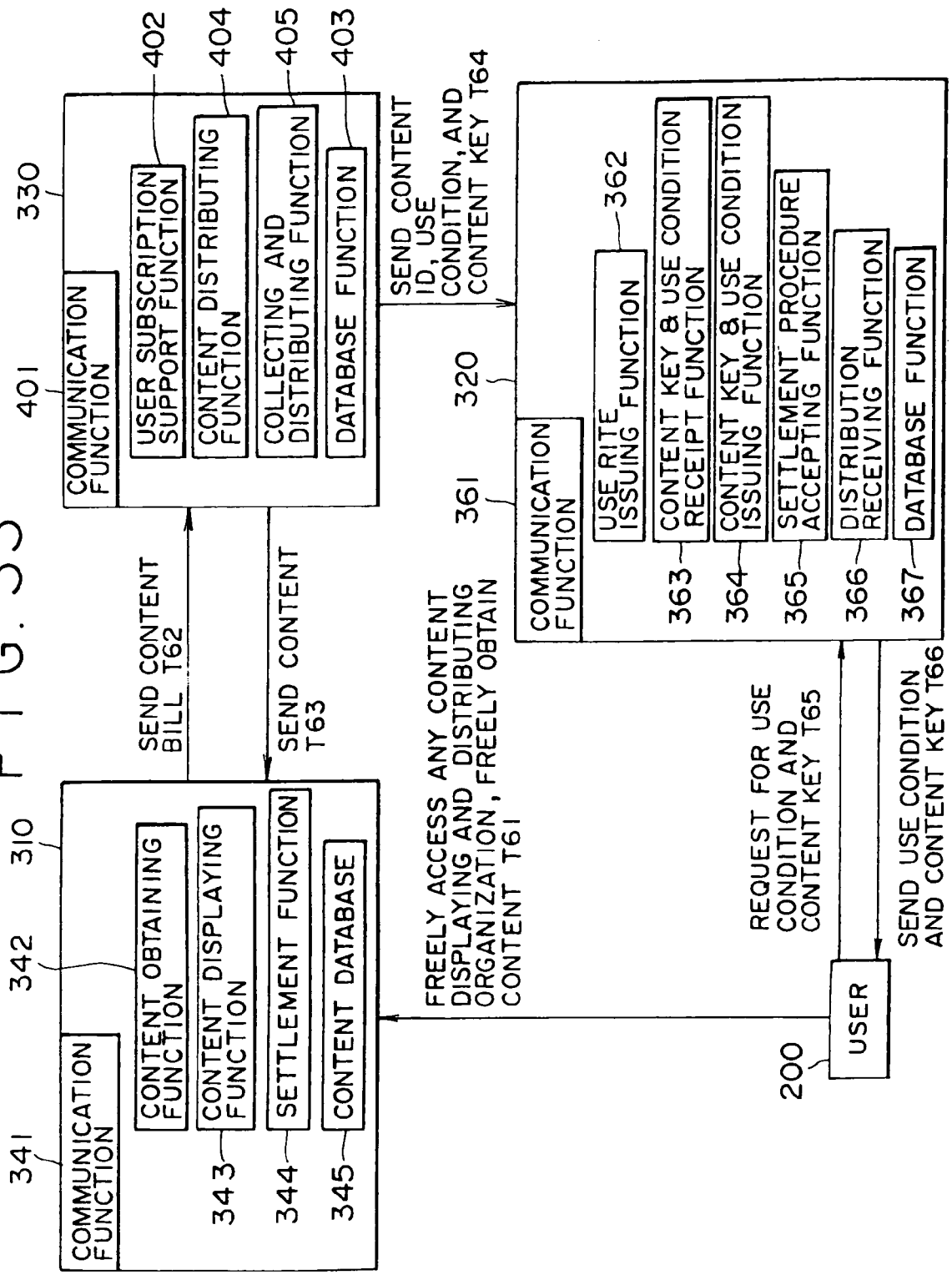
FIG. 33 is a diagram for describing a main portion of a processing flow of distributing content and information for viewing the content in the embodiment in which the system capability is divided.

The following describes the main portion of the flow of distribution of content and information (use condition and content key) for viewing the content with reference to FIG. 33.

First, a content obtaining function block 342 of the content display and distribution organization 310 requests the system administration organization 330 for digital content as indicated in a content bill sending operation T62.

Receiving the content bill, the system administration organization 330 causes a content distributing function block 404 to manipulate the requested content such that the same can be distributed. Namely, the content distributing function block 404 generates digital content (encoded digital content) that can be distributed to the user 200. This manipulated digital content is sent to the content display and distribution organization 310 as indicated in a content sending operation T63.

The content display and distribution organization 310 stores the received manipulated digital content into the content database function block 345.

The content distributing function block 404 of the system administration organization 330 sends the content ID, the use condition, and the content key for decoding the encoded content too the billing information administration organization 320 as the information for viewing the content as indicated in a content viewing information sending operation T64.

This content viewing information is received by a content key and use condition receipt function block 363 of the billing information administration organization 320 and then stored in the database function block 367.

Next, the user 200 accesses the content display and distribution organization 310 as indicated in a content obtain request operation T61 to obtain the content. Namely, when a request for obtaining the content comes from the user 200 through the communication function block 341, the content display and distribution organization 310 reads the encoded digital content from the content database function block 345 and sends this encoded digital content to the user 200.

Then, the user 200 accesses the billing information administration organization 320 as indicated in a content viewing information request operation T65 and obtains the content viewing information as indicated in a content viewing information sending operation T66. Namely, when a request for the use condition and the content key as the content viewing information comes from the user 200 through the communication function block 361, the billing information administration organization 320 causes a content key and use condition issuing block 364 to issue the content key and the use condition and send the same to the user 200 through the communication function block 361.

Thus, the flow of distributing content and the information for viewing the content has come to an end. It should be noted that another constitution shown in FIG. 33 will be described later.

Figure 34:
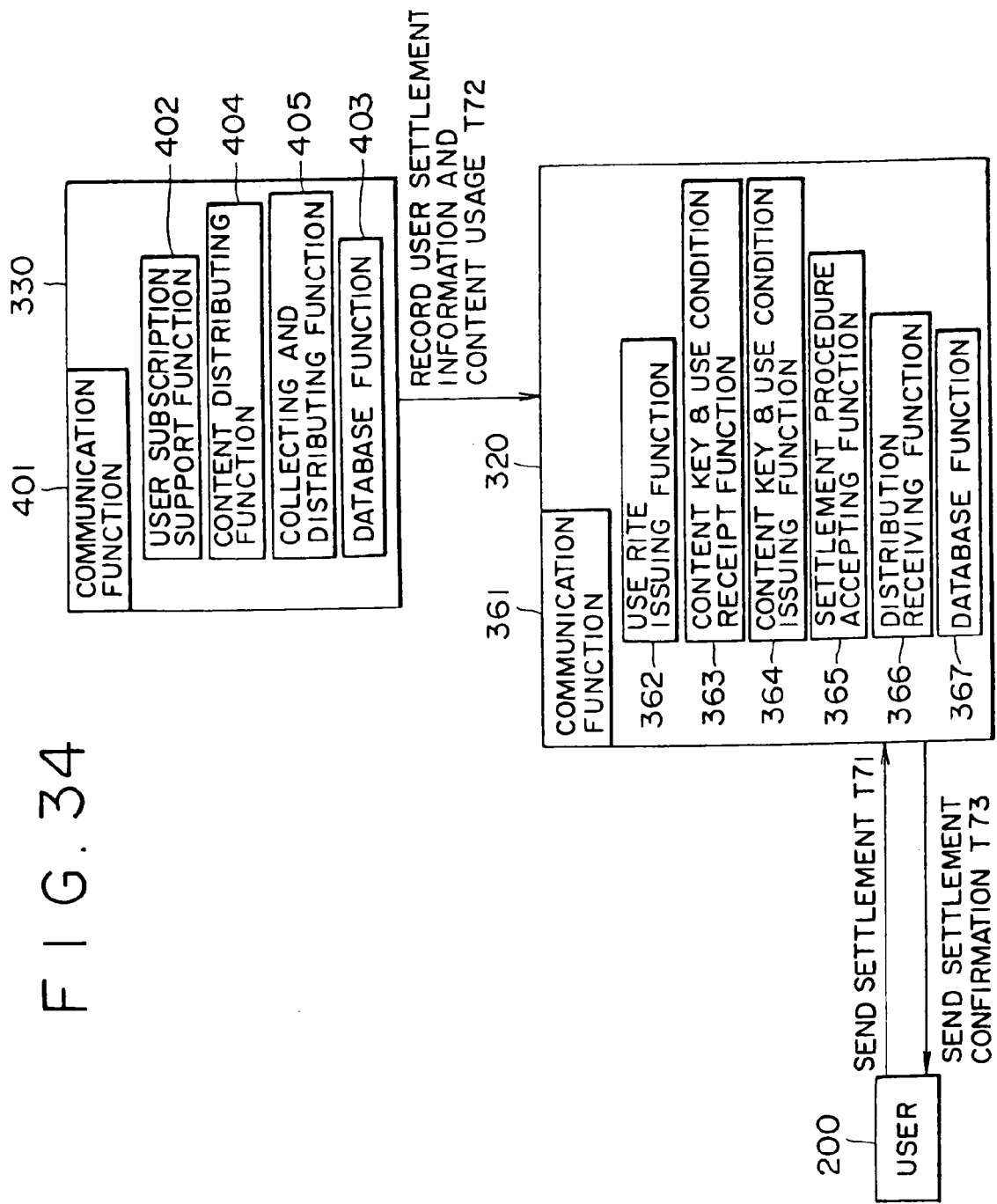
FIG. 34 is a diagram for describing a main portion of a flow of fee settlement when content has been actually viewed in the embodiment in which the system capability is divided.

The following describes the main portion of the flow of settlement for actually viewing of content, namely the settlement of the fee for the content actually viewed, with reference to FIG. 34.

First, when content has been viewed by the user 200, point usage information, namely a content use record is sent from the user 200 to the billing information administration organization 320 as indicated in a bill sending operation T71. When the billing information administration organization 320 receives the content use report from the user 200 through the communication function block 361, the content use report is then received by a settlement procedure accepting function block 365 of the billing information administration organization 320. Then, the settlement procedure accepting function block 365 issues a corresponding settlement confirmation. This settlement confirmation is sent to the user 200 through the communication function block 361 as indicated in a settlement confirmation sending operation T73. This allows the user 200 to know that the settlement of the fee for the viewed content has been completed.

Next, the settlement procedure accepting function block 365 of the billing information administration organization 320 causes the use right issuing function block 362 to issue use right issue information. This use right issue information is sent to the system administration organization 330 along with the content use record coming from the user 200 through the communication function block 361 as indicated in a user settlement and content use record sending operation T74.

The system administration organization 330 causes a collecting and distributing function block 405 to summarize information coming from the billing information administration organizations 320 scattered in various regions, tabulate the collected amounts of money, the sources of collection, and the destinations of collected money, and make a settlement through an actual finance organization.

Thus, the flow of the settlement of the content use fee has come to an end. It should be noted that another constitution shown in FIG. 34 will be described later.

In the described made with reference to FIGS. 30 through 34, encoding and decoding of data are also performed, as with the examples described before, in the data transfer between the user 200 and each of the content display and distribution organization 310, the billing information administration organization 320, and the system administration organization 330 and in the data transfer between the content display and distribution organization 310, the billing information administration organization 320, and the system administration organization 330. For these encoding and decoding, any of public-key encryption and common-key encryption can be used. As described before, for encoding of the content key and the common key, public-key encryption can be used and, for encoding of messages and various documents, common-key encryption can be used. The technique described before for enhancing security by use of random numbers can also be used along with the above-mentioned encryption. The technique described before of least common multiple of processing unit for encoding and compression can also be used when handling content.

The following briefly describes specific constitutions of the above-mentioned organizations 310, 320, and 330.

First, the constitution of the content display and distribution organization 310 will be described with reference to FIG. 35.

Figure 35:
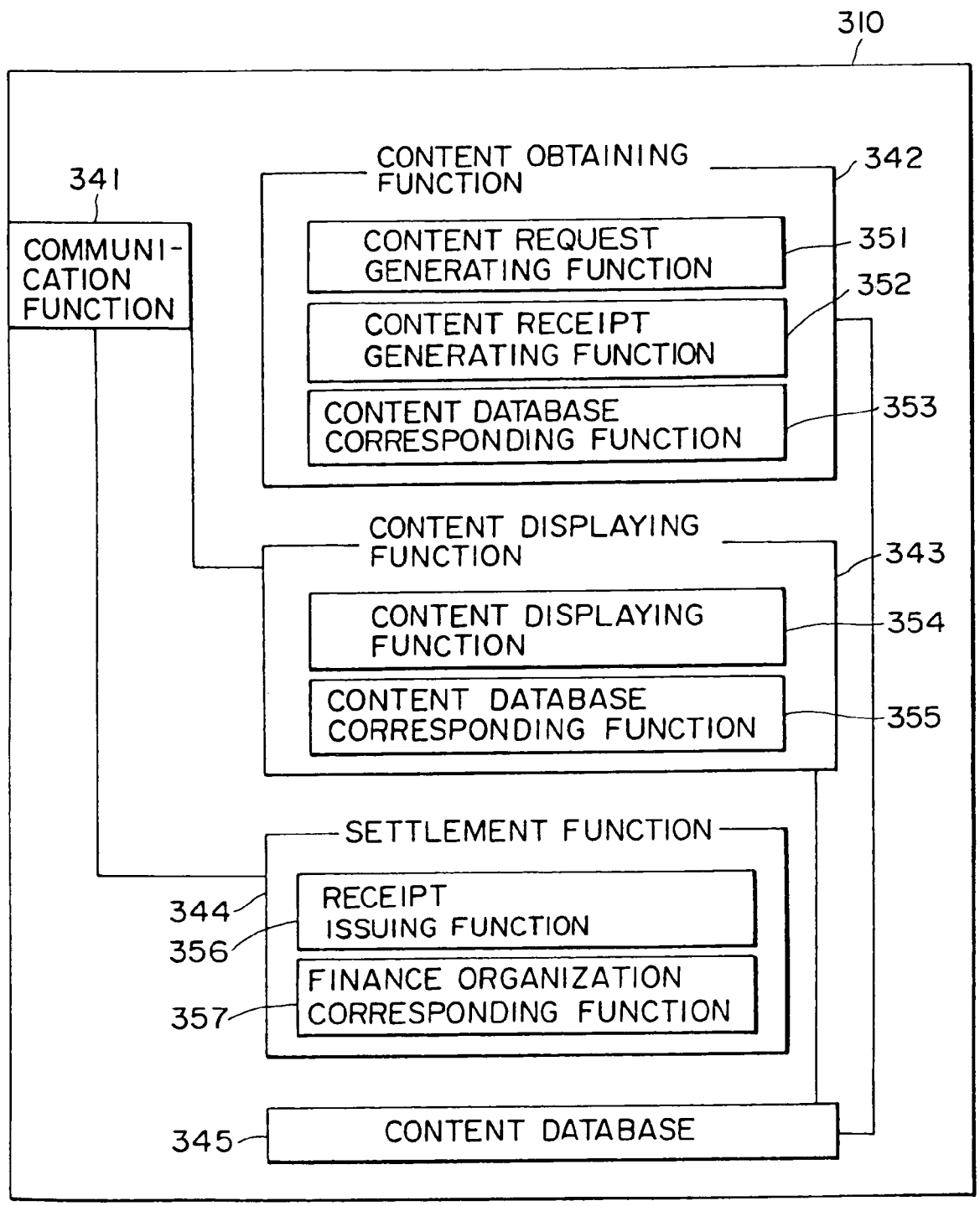
FIG. 35 is a block diagram illustrating a constitution of a content display distributing organization in the embodiment in which the system capability is divided.

Referring to FIG. 35, the content display and distribution organization 310 is largely composed of the communication function block 341 for communicating content providing interface between the user 200 and the system administration organization 330, the content obtaining function block 342 for obtaining content, a content displaying function block 343 for displaying content, a settlement function block 344 for making settlement, and the content database function block 345 for storing content.

The content obtaining function block 342 is composed of a content bill generating function block 351 for generating a request requesting the system administration organization 330 for content, a content receipt generating function block 352 for generating a receipt for the content received from the system administration organization 330, and a content database corresponding function block 353 for providing correspondence between the handled content and the content stored in the content database function block 345.

The content displaying function block 343 is composed of a content display function block 354 for actually displaying content in the virtual store and a content database corresponding function block 355 for providing correspondence between the displayed content and the content stored in the above-mentioned content database function block 345.

The above-mentioned settlement function block 344 is composed of a receipt issuing function block 356 for issuing a receipt and a finance organization corresponding function block 357 for providing correspondence with the finance organization 220.

The following describes the constitution of the billing information administration organization 320 with reference to FIG. 36.

Referring to FIG. 36, the billing information administration organization 320 is largely composed of the communication function block 361 for providing interface between the user 200 and the system administration organization 330, the use right issuing function block 362 for issuing use right, a content key and use condition receipt function block 363 for receiving the content key and use condition, the content key and use condition issuing function block 364 for issuing the content key and use condition, the settlement procedure accepting function block 365 for accepting settlement procedure, a distribution receipt function block 366 for receiving distribution, and the database function block 367.

The use right issuing function block 362 is composed of a purchase request confirming function block 371 for confirming a purchase request, a point data confirming function block 372 for confirming data such as the balance (the balance of point information) of use right of the client namely the user 200 and a use record (point usage information), a use right generating function block 373 for generating use right, a use right sending notice generating function block 374 for generating a use right sending notice, a sending function block 375 for actually sending the use right and the use right sending notice, a use right acceptance confirming function block 376 for confirming use right acceptance, and a use right issue information storing function block 377 for storing the information of issued use right.

The above-mentioned content key and use condition receipt function block 363 is composed of an receiving function block 378 for receiving the content key and the use condition and a storage function block 379 for storing the content key and the use condition.

The above-mentioned content key and use condition issuing function block 364 is composed of a receiving function block 380 for receiving a request for obtaining the content key and the use condition, a search function block 381 for searching the database function block 367 for the content key and the use condition, a sending function block 382 for encoding the content key and the use condition and sending the same, a confirming function block 383 for confirming a receipt of the content key and the use condition.

The above-mentioned settlement procedure accepting function block 365 is composed of a content use record receiving function block 384 for receiving and decoding the encoded content use record (point usage information), a content use record confirming function block 385 for confirming a content use record, a content use record storage function block 386 for storing a content use record into the database function block 367, a completion notice generating function block 387 for generating a settlement procedure completion notice, and a summarizing function block 389 for collectively editing content use records.

The above-mentioned distribution receipt function block 366 is composed of a collection data request confirming function block 390 for confirming a data request for requesting data for fee collection, a use record report generating function block 391 for generating a report of content use record to be submitted to the system administration organization 330, a use right issue report generating function block 392 for generating a report of use right issue information to be submitted to the system administration organization 330, and a confirmation confirming function block 393 for confirming a report reception confirmation.

The database function block 367 is composed of a use right database function block 394 for storing use right data, a content key and use right database function block 395 for storing the content key and the use condition, a content use record database function block 396 for storing a content use record, and a user administration database function block 397 for storing information about user.

The following describes the constitution of the system administration organization 330 with reference to FIG. 37.

Referring to FIG. 37, the system administration organization 330 is largely composed of the communication function block 401 for providing interface between the user 200, the content display and distribution organization 310, and the billing information administration organization 320, the user subscription support function block 402 for supporting the subscription by user, the content distributing function block 404 for distributing content, and the collecting and distributing function block 405 for collecting fees and distributing the same.

The above-mentioned user subscription support function block 402 is composed of a subscription application generating and sending function block 411 for generating a subscription application and sending the same, a common-key receiving function block 412 for receiving the encoded common key and decoding the same, a subscription application confirming function block 413 for confirming a subscription application coming from the user 200, an client ID generating function block 414 for generating a client ID namely a user ID, a subscription application storing function block 415 for storing the subscription application into the database function block 403, a client function generating function block 416 for generating a client function, and a registration information storing function block 417 for storing registration information into the database function block 403.

The database function block 403 is composed of a user administration database function block 418 for storing and managing user information, a content database function block 419 for storing content, a bill information administration organization database function block 420 for storing and managing the information of the billing information administration organization 320, and a content displaying and distribution organization database function block 421 for storing and managing the information of the content display and distribution organization 310.

The content distributing function block 404 is composed of a content bill confirming function block 422 for confirming a content bill, a raw content searching function block 423 for searching the content database function block 419 of the database function block 403 for raw content namely content (source data) before manipulation, a content ID generating function block 424 for generating a content ID, a content key generating function block 425 for generating a content key, a content use condition generating function block 426 for generating a content use condition, a raw content compressing function block 427 for compressing raw content namely content before manipulation, a content manipulating function block 428 for encoding content, a storing function block 429 for storing the content ID, the content key, and the use condition into the content database function block 419 of the database function block 403, a content sending function block 430 for sending content through the communication function block 401, content receipt confirming function block 431 for confirming receipt of content, an ID, key, and use condition sending function block 432 for sending the content ID, the content key, and the use condition through the communication function block 401, and an ID, key, and use condition receipt confirming function block 433 for confirming receipt of the content ID, the content key, and the use condition.

The collecting and distributing function block 405 is composed of a collect data request generating function block 434 for generating a request for data to be used for fee collection, a content use right receiving function block 435 for receiving the content use right through the communication function block 401, a content use record receiving function block 436 for receiving a content use record through the communication function block 401, a receive confirmation generating function block 437 for generating a confirmation of reception, a calculation and bill generating function block 438 for calculating amount of money to be billed to the user and generating a bill, and a calculating and payment notice generating function block 439 for calculating amount of money collected for the use of content and to be distributed to proprietors and generating a payment notice.

The following describes the constitution of the user 200 in the system of the above-mentioned second preferred embodiment with reference to FIG. 38. It should be noted that FIG. 38 collectively shows the functions of the player 1 and the user terminal 50.

Referring to FIG. 38, the user 200 is largely composed of a communication function block 451 for providing interface between the system administration organization 330, the content display and distribution organization 310, and the billing information administration organization 320, a content obtaining function block 452 for obtaining content, a use right purchasing function block 453 for purchasing use right such as point information, content key, and use condition, a content key and use condition obtaining function block 454 for obtaining the content key and the use condition, a settlement procedure function block 455 for performing settlement procedure, a user subscription support function block 456 for supporting subscription to the system, a content viewing and billing function block 457 for viewing content and billing the viewing, and a database function block 458.

The above-mentioned content obtaining function block 452 is composed of a content obtaining function block 461 fox actually obtaining content and a content storage function block 462 for storing content into a storage medium.

The use right purchasing function block 453 is composed of a purchase request generating function block 463 for generating a use right purchase request, a summarizing function block 464 for summarizing data such as the balance (point balance) of the use right of client (user) and a use record (point usage information), a use right installing function block 465 for installing each information as use right, and a use right receipt generating function block 467 for generating a use right receipt.

The content key and use condition obtaining function block 454 is composed of an obtain request generating function block 468 for generating a request for obtaining the content key and the use condition, a receiving function block 469 for receiving the content key and the use condition, and a receipt generating function block 470 for generating a receipt of the content key and the use condition.

The settlement procedure function block 455 is composed of a summarizing function block 471 for summarizing content use records (point usage information) and a completion notice receiving function block 472 for receiving a settlement procedure completion notice.

The user subscription support function block 456 is composed of a subscription application generating function block 473 for generating a subscription application, a client function installing function block 474 for installing the client function namely initializing the player 1 of the user, and a registration information generating function block 475 for generating registration information.

The content viewing billing function block 457 is composed of a content searching function block 476 for searching the storage medium for content, a use right confirming function block 477 for confirming use right, a simplified content viewing function block 478 for reproducing content in a simplified manner when selecting content, a billing function block 479 for managing billing information (point information), a content decoding function block 480 for decoding encoded content, a content decompressing function block 481 for decompressing compressed content, and a content viewer function block 482 for making recognizable the content stored in the storage medium for example.

The database function block 458 is composed of a use right database function block 483 for storing use right data, a content key and use condition database function block 484 for storing the content key and the use condition, a content use record database function block 485 for storing a content use record, and a user information database function block 486 for storing user information.

Figure 39:
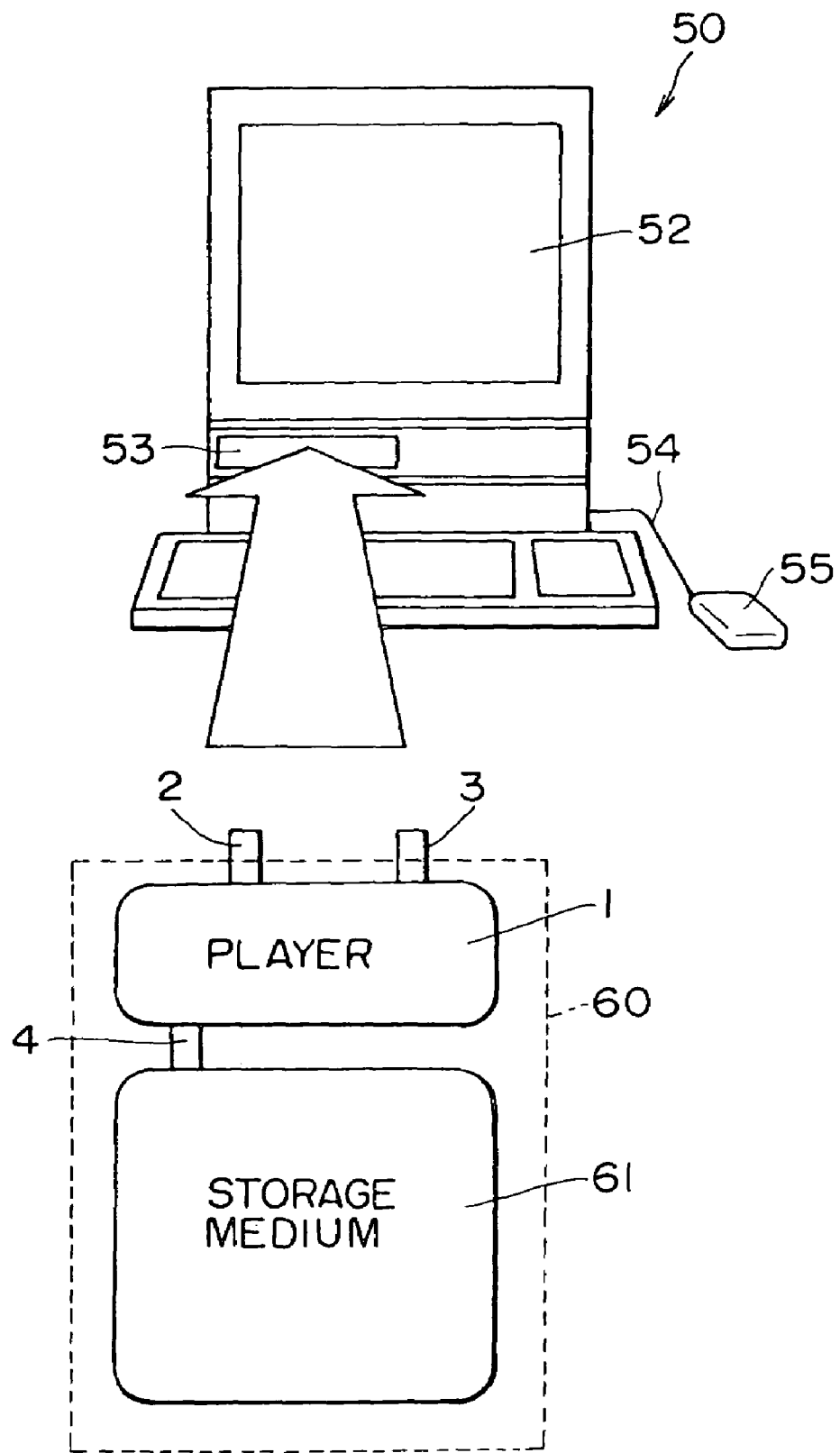
FIG. 39 is a diagram for describing one example of a specific usage form of the player and the user terminal.
Figure 40:
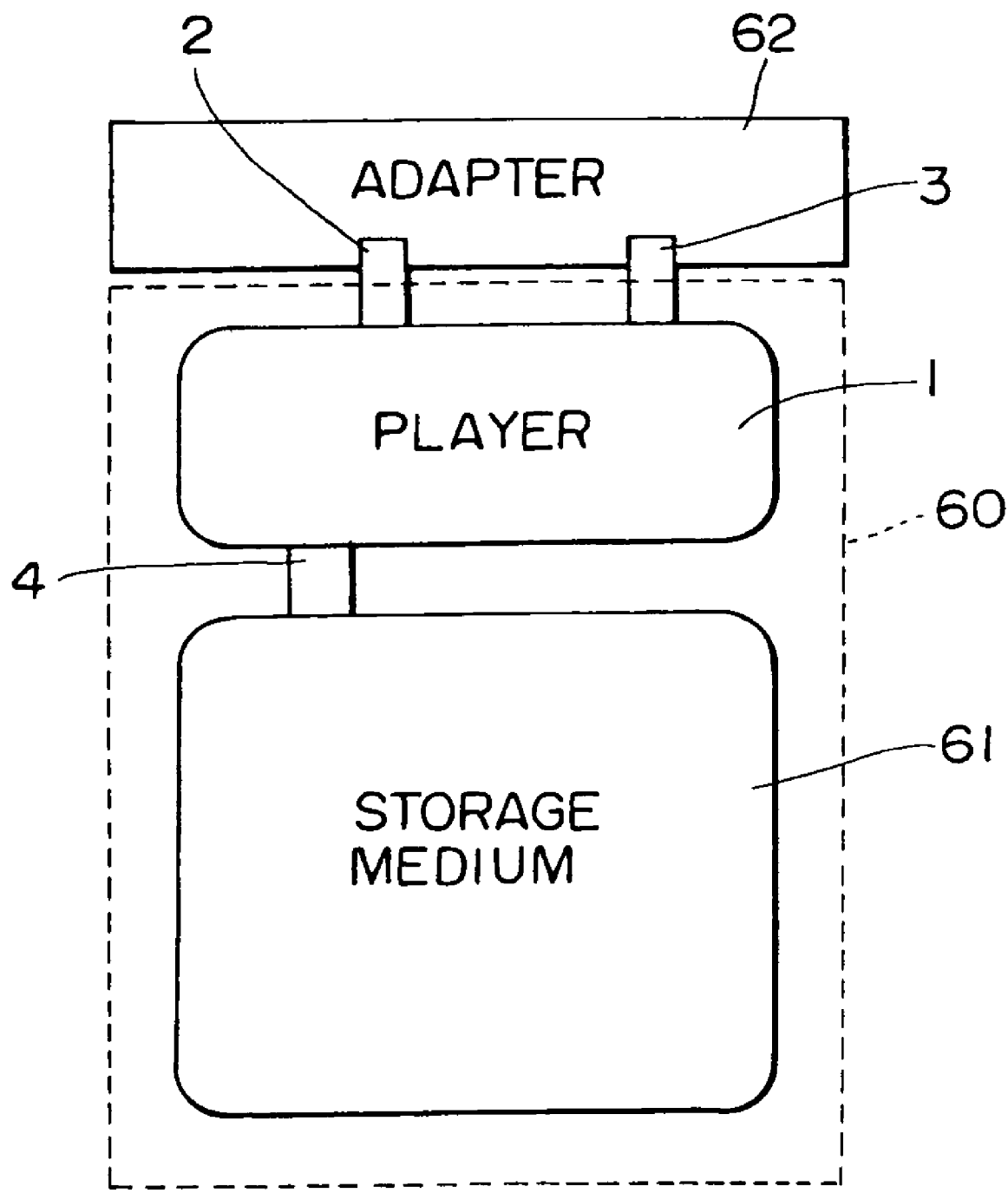
FIG. 40 is a diagram for describing another example of a specific usage form of the player and the user terminal.

The following describes specific use forms of the player 1 and the user terminal 50 in each of the above-mentioned embodiments with reference to FIGS. 39 and 40.

Referring to FIG. 39, the analog output terminal 2, the PC interface terminal 3, and the storage medium I/O terminal 4 are provided on the player 1 such that these terminals project out from the frame of the player 1. The storage medium I/O terminal 4 is adapted to connect to a storage medium 61. The player 1 and the storage medium 61 are formed accommodated in the case 60. The case 60 is arranged at one end thereof with the analog output terminal 2 and the PC interface terminal 3 of the player 1 for example.

The case 60 in which the player 1 and the storage medium 61 are accommodated is formed such that the case is inserted at the side arranged with the analog output terminal 2 and the PC interface terminal 3 into an input/output port 53 of a personal computer 50 working as the user terminal 50.

The personal computer 50 has a general constitution composed of a computer main body, a display device 52, a keyboard 54, and a mouse 55 for example. The input/output port 53 is internally formed with an interface corresponding to the analog output terminal 2 and the PC interface terminal 3 of the player 1. Therefore, simply inserting the case 60 accommodating the player 1 and the storage medium 61 into the input/output port 53 of the personal computer 50 connects the analog output terminal 2 and the PC interface terminal 3 to the personal computer 50.

In the example shown in FIG. 39, the interface corresponding to the analog output terminal 2 and the PC interface terminal 3 of the player 1 is formed in the input/output port 53 of the personal computer 50. Alternatively, as shown in FIG. 40, an adapter 62 compatible with the interface of a generalpurpose input/output port of the personal computer 50 may be arranged between the analog output terminal 2 and the PC interface terminal 3 of the player 1.

As described above and in the system according to each of the above-mentioned embodiments, digital content is encoded by a content key, which is a system common key, so that any user (the player 1) who has been registered in the embodied system can duplicate the encoded content without restraint and, if the content key is obtained, view the content. Therefore, this content (the encoded content) can be stored in the storage medium with ease. On the other hand, in a terminal device not complying with the embodied system, the encoded digital content cannot be decoded, so that the copyright of the content and the right of the proprietor of the content can be protected.

According to the system of the preferred embodiments of the invention, point information is replenished on a prepaid basis, the point information is decremented every time content is viewed, and the information about the use of the point is gathered, thereby allowing the proprietor (copyright holder and so on) having the right associated with the used points and the content stores to collect viewing fees.

Further, the point information and the point usage information are encoded before being transferred, thereby enhancing data security. For example, if an attempt is made to forge the completely same data as the previous one and steal the point information for billing, a random number (security ID) operatively associated between the system side and the player side is used and transaction is started only after matching is confirmed by both sides, thereby enhancing security still further.

The main components of the player are installed on one chip, thereby making it difficult to access the key information and decoded digital content from outside the chip. In addition, this player 1 has a tamper resistance capability on the player 1 itself to prevent the data from being intercepted by destruction of the player 1.

As described, according to the preferred embodiments of the present invention, the digital content distribution system significantly high in security protection is provided.

For the above-mentioned digital content, various types are available such as digital video data in addition to digital audio data. If moving picture data (including audio data) is used for the above-mentioned digital video data, compression techniques such as MPEG (Moving Picture Image Coding Experts Group) are available as the above-mentioned data compressing. MPEG, generic name for motion picture schemes, is composed of MPEG1, MPEG2, MPEG4, and so on, established at WG (Working Group) 11 in SC (Sub Committee) 29 of JTC (Joint Technical Committee) of ISO (International Standards Organization) and IEC (International Electrotechnical Commission).

For the above-mentioned encryption, DES (Data Encryption Standard) may also be used. DES is a standard encryption (encryption algorithm) made public by NIST (National Institute of Standards and Technology) of US. To be specific, data conversion is performed in units of 64-bit data blocks, repeating function-based conversion 16 times. The above-mentioned digital content and point information are encoded by so-called common-key encryption using DES. The above-mentioned common-key encryption uses the key data (encoding key data) for encoding and the key (decoding key data) for decoding that are identical.

For the common-key storage memory 22, the communication key storage memory 21, the point usage information storage memory 29, and the point information storage memory 28, all contained in the player 1, the EEPROM (Electrically Erasable Programmable ROM) for example may be used.

Other storage media available includes recording media such as a hard disk, a floppy disk, a magneto-optical disk, and phase-alternating magneto-optical disk, and storage media such as a semiconductor memories (IC card and so on).

In the above-mentioned preferred embodiments, the keyboard 54, the mouse 55, and the display device 52 of the user terminal 50 are used to select content or check content displayed in the virtual store 230. These keyboard, mouse, and display device may be simplified in function and installed on the player 1. Namely, the input section 6 and the display section 7 may be provided on the player 1.

As described and according to the invention, there is provided a portable terminal that can be carried about with ease for viewing digital content. Digital content to be transferred with other parties of communication is compressed and information such as content key, billing information, and content use information is all encoded before transfer. At the same time, on the side of reproducing digital content, necessary processing is all performed inside the single portable terminal. Consequently, the novel constitution can prevent digital content from illegal duplication or use and, at the same time, build an economical system.

While the preferred embodiments of the present invention have been described using specific terms, such description is for illustrative purposes only, and it is to be understood that changes and variations may be made without departing from the spirit or scope of the appended claims.

What is claimed is:

1. A method for distribution of content, the method comprising:

receiving, from a user terminal, a request that includes content specifying information which specifies the content desired by a user;

transmitting the content specifying information to a content provider;

obtaining the specified content from the content provider;

encrypting the specified content using a content key;

adding a content ID of the specified content to the encrypted content;

transmitting the encrypted content and the added content ID through the user terminal to a player apparatus;

generating a use condition associated with the content ID for specifying use of the specified content in accordance with the use condition; and at a time subsequent to the transmitting of the encrypted content and the added content ID through the user terminal to the player apparatus, receiving, in response to the user attempting to reproduce the encrypted content using the player apparatus, a request for the content key and the use condition from the player apparatus through the user terminal, the request including the content ID, in response thereto, transmitting the content key and the use condition through the user terminal to the player apparatus, receiving, from the player apparatus through the user terminal, an encoded message confirming that the player apparatus has received the content key and the use condition, and decoding the encoded message thereby confirming that the player apparatus has received the content key and the use condition.

2. The method according to claim 1, further comprising generating the content key.

3. The method according to claim 1, further comprising compressing the specified content.

4. The method according to claim 1, further comprising encrypting the content key prior to the transmitting of the content key so that an unauthorized apparatus is unable to decrypt the encrypted content.

5. The method according to claim 1, further comprising:
executing a process to share a session key with the user; and
encrypting the use condition using the session key prior to the transmitting of the use condition.

6. A system for administering distribution of content, the system comprising:
an administration center programmed to receive, from a user terminal, a request that includes content specifying information which specifies the content desired by a user transmit the content specifying information to a content provider, obtain the specified content from the content provider, encrypt the specified content using a content key, add a content ID of the specified content to the encrypted content, transmit the encrypted content and the added content ID through the user terminal to a player apparatus, and generate a use condition associated with the content ID for specifying use of the specified content in accordance with the use condition;
the administration center being further programmed to, at a time subsequent to the transmitting of the encrypted content and the added content ID through the user terminal to the player apparatus, receive a request for the content key and the use condition from the player apparatus through the user terminal, the request including the content ID when the user wishes to reproduce the encrypted content using the player apparatus, and in response thereto, transmit the content key and the use condition through the user terminal to the player apparatus, receive, from the player apparatus through the user terminal, an encoded message confirming that the player apparatus has received the content key and the use condition, and decode the encoded message thereby confirming that the player apparatus has received the content key and the use condition.

7. The system according to claim 6, wherein the administration center is further programmed to generate the content key.

8. The system according to claim 6, wherein the administration center further programmed to compress the specified content.

9. The system according to claim 6, wherein the administration center is further programmed to encrypt the content key before transmitting the content key so that an unauthorized apparatus is unable to decrypt the encrypted content.

10. The system according to claim 6, wherein the administration center is further programmed to execute a process to share a session key with the user, and encrypt the use condition using the session key before the transmitting unit transmits the use condition.

* * * * *